United States Patent
Li

(10) Patent No.: US 9,493,643 B2
(45) Date of Patent: Nov. 15, 2016

(54) THERMOSETTING SHAPE MEMORY POLYMERS WITH ABILITY TO PERFORM REPEATED MOLECULAR SCALE HEALING

(75) Inventor: Guoqiang Li, Baton Rouge, LA (US)

(73) Assignee: Board of Supervisors of Louisiana State University And Agricultural and Mechanical College, Baton Rouge, LA (US)

( * ) Notice: Subject to any disclaimer, the term of this patent is extended or adjusted under 35 U.S.C. 154(b) by 682 days.

(21) Appl. No.: 13/464,062

(22) Filed: May 4, 2012

(65) Prior Publication Data

US 2012/0303056 A1 Nov. 29, 2012

Related U.S. Application Data

(60) Provisional application No. 61/483,196, filed on May 6, 2011.

(51) Int. Cl.
| | | |
|---|---|---|
| *B29B 17/00* | (2006.01) | |
| *C08L 25/08* | (2006.01) | |
| *C08K 3/40* | (2006.01) | |

(52) U.S. Cl.
CPC .............. *C08L 25/08* (2013.01); *C08K 3/40* (2013.01); *C08L 2201/12* (2013.01); *C08L 2203/02* (2013.01); *C08L 2205/16* (2013.01); *C08L 2312/00* (2013.01)

(58) Field of Classification Search
CPC .............. C08L 25/08; C08L 2201/12; C08L 2203/02; C08K 3/40
USPC ......................................................... 264/345
See application file for complete search history.

(56) References Cited

U.S. PATENT DOCUMENTS

| | | | |
|---|---|---|---|
| 5,189,110 A | * | 2/1993 | Ikematu et al. ............... 525/314 |
| 6,759,481 B2 | | 7/2004 | Tong .............................. 525/241 |
| 8,039,572 B2 | | 10/2011 | Tong et al. ..................... 528/28 |
| 8,101,689 B2 | | 1/2012 | Tong et al. .................... 525/523 |
| 8,198,349 B2 | | 6/2012 | Xiao et al. ......................... 524/1 |
| 2003/0055198 A1 | * | 3/2003 | Langer et al. .................. 528/80 |
| 2004/0015187 A1 | * | 1/2004 | Lendlein et al. ............. 606/228 |
| 2004/0148901 A1 | * | 8/2004 | Cadogan et al. ............... 52/646 |
| 2009/0163664 A1 | * | 6/2009 | Lendlein et al. ............. 525/186 |
| 2010/0119704 A1 | | 5/2010 | Hemmelgarn et al. ....... 427/140 |

(Continued)

OTHER PUBLICATIONS

Guoqiang Li "A Self-Healing Smart Syntactic Foam" Poster presented at National Science Foundation CMMI Engineering Research and Innovation Conference 2012, Jul. 9-12, 2012 and available at eot.neeshub.org/CMMI/poster/show/519.*

(Continued)

*Primary Examiner* — Joseph S Del Sole
*Assistant Examiner* — John Robitaille
(74) *Attorney, Agent, or Firm* — Timothy J. Lithgow; John H. Runnels

(57) ABSTRACT

A composition comprising thermoset shape memory polymer and a composition for molecular scale healing is disclosed; the composition has the ability to resolve structural defects by a close-then-heal mechanism. In use the shape memory polymer serves to bring opposing surfaces in a structural defect into proximity, whereafter heating the molecular scale healing composition to a level at or above its melting point allows for molecular scale healing. The composition has the ability to close macroscopic defects, and to do so repeatedly even if another wound occurs in a previously healed area.

24 Claims, 43 Drawing Sheets

(56) References Cited

U.S. PATENT DOCUMENTS

| | | | |
|---|---|---|---|
| 2010/0127130 A1* | 5/2010 | Eisenraut et al. | 244/218 |
| 2010/0196705 A1 | 8/2010 | Hood et al. | 428/355 EP |
| 2011/0003159 A1 | 1/2011 | Mather et al. | 428/425.6 |

OTHER PUBLICATIONS

Hearon, Keith et al., "Porous Shape-Memory Polymers," Polymer Rev., vol. 53, pp. 41-75 (2013).

Hu, Jinlian et al., "Recent advances in shape-memory polymers: Structure, mechanism, functionality, modeling and applications," Prog. in Polymer Sci., vol. 37, pp. 1720-1763 (2012).

Pretsch, Thorsten, "Review on the Functional Determinants and Durability of Shape Memory Polymers," Polymers, vol. 2, pp. 120-158 (2010).

Yang, Ying et al., "Self-healing polymeric materials," Chem. Soc. Rev., vol. 42, pp. 7446-7467 (2013).

Bardella, L et al., "On the elastic behavior of syntactic foams," International Journal of Solids and Structures, vol. 38, pp. 7235-7260 (2001).

Beiermann, B.A. et al., "Self-healing flexible laminates for resealing of puncture damage," Smart Materials and Structures, vol. 18, No. 085001 (1-7) (2009).

Blaiszik, B.J. et al., "Microcapsules filled with reactive solutions for self-healing materials," Polymer, vol. 50, pp. 990-997 (2009).

Blaiszik, B.J. et al., "Self-Healing Polymers and Composites," Annu. Rev Mater Res, vol. 40, pp. 179-211 (2010).

Blaiszik, B.J. et al., "Nanocapsules for self-healing materials," Comp Sci Tech, vol. 68, Nos. 3-4, pp. 978-986 (2008).

Brown, E.N. et al., "Fracture testing of a self-healing polymer composite," Experim Mech, vol. 42, pp. 372-379 (2002).

Brown, E.N. et al., "Retardation and Repair of Fatigue Cracks in a Microcapsule Toughened Epoxy Composite—Part II: In situ self-healing," Compos Sci Technol, vol. 65, pp. 2474-2480 (2005).

Brown, E.N. et al., "Fatigue Crack Propagation in Microcapsule-toughened Epoxy," J Mater Sci, vol. 41, pp. 6266-6273 (2006).

Brown, E.N. et al., "Microcapsule induced toughening in a self-healing polymer composite," J Mater Sci, vol. 39, No. 5, pp. 1703-1710 (2004).

Brown, E.N., "Use of the tapered double-cantilever beam geometry for fracture toughness measurements and its application to the quantification of self-healing," The J. Strain Analy. Eng. Design, vol. 46, pp. 167-186 (2011).

Chen, X. et al., "New Thermally Remendable Highly Cross-Linked Polymeric Materials," Macromolecules, vol. 36, pp. 1802-1807 (2003).

Chen, X.X. et al., "A thermally re-mendable cross-linked polymeric material," Science, vol. 295, No. 5560, pp. 1698-1702 (2002).

Chipara, M. et al., "Molecular Self-Healing Processes in Polymers," Res Soc Symp, vol. 851, pp. 127-132 (2005) Abstract from 2004 MRS Fall Meeting.

Chung, C.M. et al., "Crack Healing in Polymeric Materials via Photochemical [2+2] Cycloaddition," Chem Mater, vol. 16, pp. 3982-3984 (2004).

Cordier P. et al., "Self-healing and thermoreversible rubber from supramolecular assembly," Nature, vol. 451, No. 7181, pp. 977-980 (2008).

De Gennes P.G., "Reptation of a Polymer Chain in the Presence of Fixed Obstacles," J Chem Phys, vol. 55, No. 2, pp. 572-579 (1971).

Doi, M. et al., "Dynamics of Concentrated Polymer Systems," J Chem Soc: Faradays Trans, vol. 2, pp. 1789-1801 (1978).

Dry, C.M., "Procedures developed for self-repair of polymer matrix composite materials," Compos Struct, vol. 35, No. 3, pp. 263-269 (1996).

Evans, A.G. et al., "Multifunctionality of cellular metal systems," Progress in Materials Science, vol. 43, pp. 171-221 (1998).

Gould, P., "Self-help for ailing structures," Materials Today, vol. 6, pp. 44-49 (2003).

Griffith, G., "Carbon foam: a next-generation structural material," Industrial Heating, vol. 69, pp. 47-52 (2002).

Hasebe, R.S. et al., "Performance of sandwich structures with composite reinforced core," Journal of Sandwich Structures and Materials, vol. 2, pp. 75-100 (2000).

Hasiotis, T. et al., "Application of Ultrasonic C-Scan Techniques for Tracing Defects in Laminated Composite Materials," Proc. 4th Int. Conf. on NDT (Greece) (2007).

Hayes, S.A. et al., "A self-healing thermosetting composite material," Composites A, vol. 38, No. 4, pp. 1116-1120 (2007).

Hosur, M.V. et al., "Manufacturing and low-velocity impact characterization of foam filled 3-D integrated core sandwich composites with hybrid face sheets," Composite Structures, vol. 69, pp. 167-181 (2005).

Huang, W.M. et al., "Thermomechanical behavior of a polyurethane shape memory polymer foam," Journal of Intelligent Material Systems and Structure, vol. 17, pp. 753-760 (2006).

John, M. et al., "Self-Healing of Sandwich Structures with Grid Stiffened Shape Memory Polymer Syntactic Foam Core," Smart Mater and Struct, vol. 19, No. 7, paper No. 075013 (2010).

Jud, K. et al., Load transfer through chain molecules after interpenetration at interfaces, Polym Bul, vol. 1, pp. 697-707 (1979).

Kalista, S.J. et al., "Thermal Characteristics of the Self-healing Response in Poly(ethylene-co-methacrylic acid) Copolymers," J R Soc Interface, vol. 4, pp. 405-411 (2007).

Kalista, S.J. et al., "Self-healing of poly(ethylene-comethacrylic acid) copolymers following projectile puncture," Mech Adv Mater Struct, vol. 15, No. 5, pp. 391-397 (2007).

Kausch, H.H. et al., "Molecular Aspects of Crack Formation and Healing in Glassy Polymers," Rubber Process Appl, vol. 2, pp. 265-268 (1982) Abstract.

Keller, M.W. et al., "Torsion fatigue response of self-healing poly (dimethylsiloxane) elastomers," Polymer, vol. 49, Nos. 13-14, pp. 3136-3145 (2008).

Kim, Y.H. et al., "A Theory of Healing at a Polymer-Polymer Interface," Macromolecules, vol. 16, pp. 1115-1120 (1983).

Kirkby, E.L. et al., "Performance of self-healing epoxy with microencapsulated healing agent and shape memory alloy wires," Polymer, vol. 50, pp. 5533-5538 (2009).

Li, G. et al., "A cement based syntactic foam," Materials Science and Engineering A, vol. 478, pp. 77-86 (2008).

Li, G. et al., "A crumb rubber modified syntactic foam," Materials Science and Engineering A, vol. 474, pp. 390-399 (2008).

Li, G. et al., "A self-healing smart syntactic foam under multiple impacts," Composites Science and Technology, vol. 68, pp. 3337-3343. [paper 7] (2008).

Li, G. et al., "Advanced Grid Stiffened Fiber Reinforced Plastic Tube Encased Concrete Cylinders," Journal of Composite Materials, vol. 41, No. 15, pp. 1803-1824 (2007).

Li, G. et al., "Development of rubberized syntactic foam Composites Part A-," Applied Science and Manufacturing, vol. 38, pp. 1483-1492 (2007).

Li, G. et al., "Elastic Modulus Prediction of Asphalt Concrete," ASCE Journal of Materials in Civil Engineering, vol. 11, pp. 236-241 (1999).

Li, G. et al., "Impact Characterization of Sandwich Structures with an Integrated Orthogrid Stiffened Syntactic Foam Core," Comp Sci Tech, vol. 68, No. 9, pp. 2078-2084 (2008).

Li, G. et al., "Isogrid stiffened syntactic foam cored sandwich structure under low velocity impact," Composites Part A: Applied Science and Manufacturing, vol. 41, No. 1, pp. 177-184 (2010).

Li, G. et al., "Shape memory polymer based self-healing syntactic foam: 3-D confined thermomechanical characterization," Comp Sci Tech, vol. 70, pp. 1419-1427 (2010).

Li, G. et al., "Thermomechanical characterization of a shape memory polymer based self-repairing syntactic foam," Polymer, vol. 51, pp. 755-762 (2009).

Li, Guoqiang et al., "Thermomechanical behavior of Thermoset Shape Memory Polymer Programmed by Cold-Compression: Testing and Constitutive Modeling," J. of Mech and Phys of Solids, vol. 59, pp. 1231-1250 (2011).

Liu, Y.L. et al., "Thermally reversible cross-linked polyamides with high toughness and self-repairing ability from maleimide and furan-

(56) References Cited

OTHER PUBLICATIONS functionalized aromatic polyamides," Macromolecular Chemistry and Physics, vol. 208, pp. 224-232 (2007).
McGarel, J.O. et al., "Craze growth and healing in polystyrene," J Polym Sci B, vol. 25, No. 12, pp. 2541-2560 (1987).
Montarnal, D. et al., "Versatile one-pot synthesis of supramolecular plastics and self-healing rubbers," J Am Chem Soc, vol. 131, No. 23, pp. 7966-7967 (2009).
Nettles, D, "Thermomechanical characterization of a shape memory polymer based syntactic foam," M.S. Thesis, Louisiana State University (2009).
Nji, J. et al., "A Biomimic Shape Memory Polymer Based Self-Healing Particulate Composite," Polymer, vol. 51, No. 25, pp. 6021-6029 (2010).
Nji, J. et al., "A CaO enhanced rubberized syntactic foam," Composites Part A: Applied Science and Manufacturing, vol. 39, pp. 1404-1411 (2008).
Nji, J. et al., "A self-healing 3D woven fabric reinforced shape memory polymer composite for impact Mitigation," Smart Mater Struct, vol. 19, No. 3 (1-9): paper No. 035007 (2010).
Nji J. et al., "Damage Healing Ability of a Shape Memory Polymer Based Particulate Composite with Small Thermoplastic Contents," Smart Materials and Structures, vol. 21, No. 2, paper No. 025011 (10 pages) (Feb. 2012).
NSF Award Abstract #0900064, A Self-Healing Smart Syntactic Foam, (Jul. 23, 2009).
Ouyang, Zhenyu et al., "On Approximately Realizing and Characterizing Pure Mode-I Interface Fracture between Bonded Dissimilar Materials," ASME Journal of Applied Mechanics, vol. 78, pp. 1-11 (2011).
Pang, J.W.C. et al., "A hollow fibre reinforced polymer composite encompassing self-healing and enhanced damage visibility," Comp Sci Tech, vol. 65, pp. 1791-1799 (2005).
Petrovic-Djakov, D.M. et al., "DSC Analysis of Compatibility of Poly(Phenyl Methacrylate) and Some Poly(Xylenyl Methacrylates)," J Therm Anal, vol. 40, pp. 741-746 (1993).
Plaisted, T.A. et al., "Quantitative evaluation of fracture, healing and rehealing of a reversibly cross-linked polymer," Acta Mater, vol. 55, No. 17, pp. 5684-5696 (2007).
Prager, S. et al., "The Healing Process at Polymer-Polymer Interfaces," J Chem Phys, vol. 75, pp. 5194-5198 (1981).
Takeda, K. et al., "Self-repairing mechanism of plastics," Sci Tech Adv Mater, vol. 4, pp. 435-444 (2003.
Tey, S.J. et al., "Influence of long term storage in cold hibernation on strain recovery and recovery stress of polyurethane shape memory polymer foam," Smart Materials and Structures, vol. 10, No. 2, pp. 321-325 (2001).
Toohey, K.S. et al., "Self-healing materials with microvascular networks," Nat Mater, vol. 6, No. 8, pp. 581-585 (2007).
Trask, R.S. et al., "Biomimetic self-healing of advanced composite structures using hollow glass fibres," Smart Materials and Structures, vol. 15, pp. 704-710 (2006).
Van Vuure, A.W., "Composite panels based on woven sandwich-fabric performs," Ph.D. Thesis, Katholieke Universiteit Leuven, Belgium (1997).
Varley, R.J. et al., "Towards an understanding of thermally activated self-healing of an ionomer system during ballistic penetration," Acta Materialia, vol. 56, No. 19, pp. 5737-5750 (2008).
Varley, R.J. et al., "The Effect of Cluster Plassticisation on the Self-Healing Behaviour of Ionomers," Polymer, vol. 51, pp. 679-686 (2010).
Vialle, G. et al., "Remote activation of nanomagnetite reinforced shape memory polymer foam," Smart Materials and Structures, vol. 18, No. 115014 (1-10) (2009).
White, S.R. et al., "Autonomic healing of polymer composites," Nature, vol. 409, No. 6822, pp. 794-797 (2001).
Williams, H.R. et al., "Self-healing composite sandwich structures," Smart Materials and Structures, vol. 16, pp. 1198-1207 (2007).
Williams, H.R. et al., "Self-healing Sandwich Panels: Restoration of Compressive Strength After Impact," Composites Science and Technology, vol. 48, pp. 3171-3177 (2008).
Williams, H.R. et al., "Biomimetic reliability strategies for self-healing vascular networks in engineering materials," J Royal Soc Interf, vol. 5, No. 24, pp. 735-747 (2008).
Wool, P.R. et al., "Craze Healing in Polymer Glasses," Polym Eng Sci, vol. 21, pp. 970-977 (1981).
Wool, R. et al., "Theory of crack healing in polymers," J Appl Phys, vol. 52, No. 10, pp. 5953-5963 (1981).
Wu, D.Y. et al., "Self-healing polymeric materials: A review of recent developments," Prog Polym Sci, vol. 33, pp. 479-522 (2008).
Xu, W. et al., "Constitutive modeling of shape memory polymer based self-healing syntactic foam," International Journal of Solids and Structures, vol. 47, No. 9, pp. 1306-1316 (2010).
Xu, Wei et al., "Finite Difference Three-Dimensional Solution of Stresses in Adhesively Bonded Composite Tubular Joint Subjected to Torsion," International Journal of Adhesion and Adhesives, vol. 30, No. 4, pp. 191-199 (2010).
Xu, Wei et al., "Thermoviscoplastic Modeling and Testing of Shape Memory Polymer Based Self-Healing Syntactic Foam Programmed at Glassy Temperature," J. of App. Mech., vol. 78, No. 6, p. 061017 (2011).
Yang, F. et al., "Healing of Thermoplastic Polymers at an Interface Under Nonisothermal Conditions," Macromolecules, vol. 35, pp. 3213-3 (Mar. 15, 2002).
Yuan, Y.C. et al., "Self healing in polymers and polymer composites, Concepts, realization and outlook: A review," Express Polym Lett, vol. 2, No. 4, pp. 238-250 (2008).
Yuan, Y.C. et al., "Study of Factors Related to Performance Improvement of Self-Healing Epoxy Based on Dual Encapsulated Healant," Polymer, vol. 50, pp. 5771-5781 (2009) 224 (2002).
Zako, M. et al., "Intelligent material systems using epoxy particles to repair microcracks and delamination damage in GFRP," Journal of Intelligent Material Systems and Structures, vol. 10, pp. 836-841 (1999.

* cited by examiner

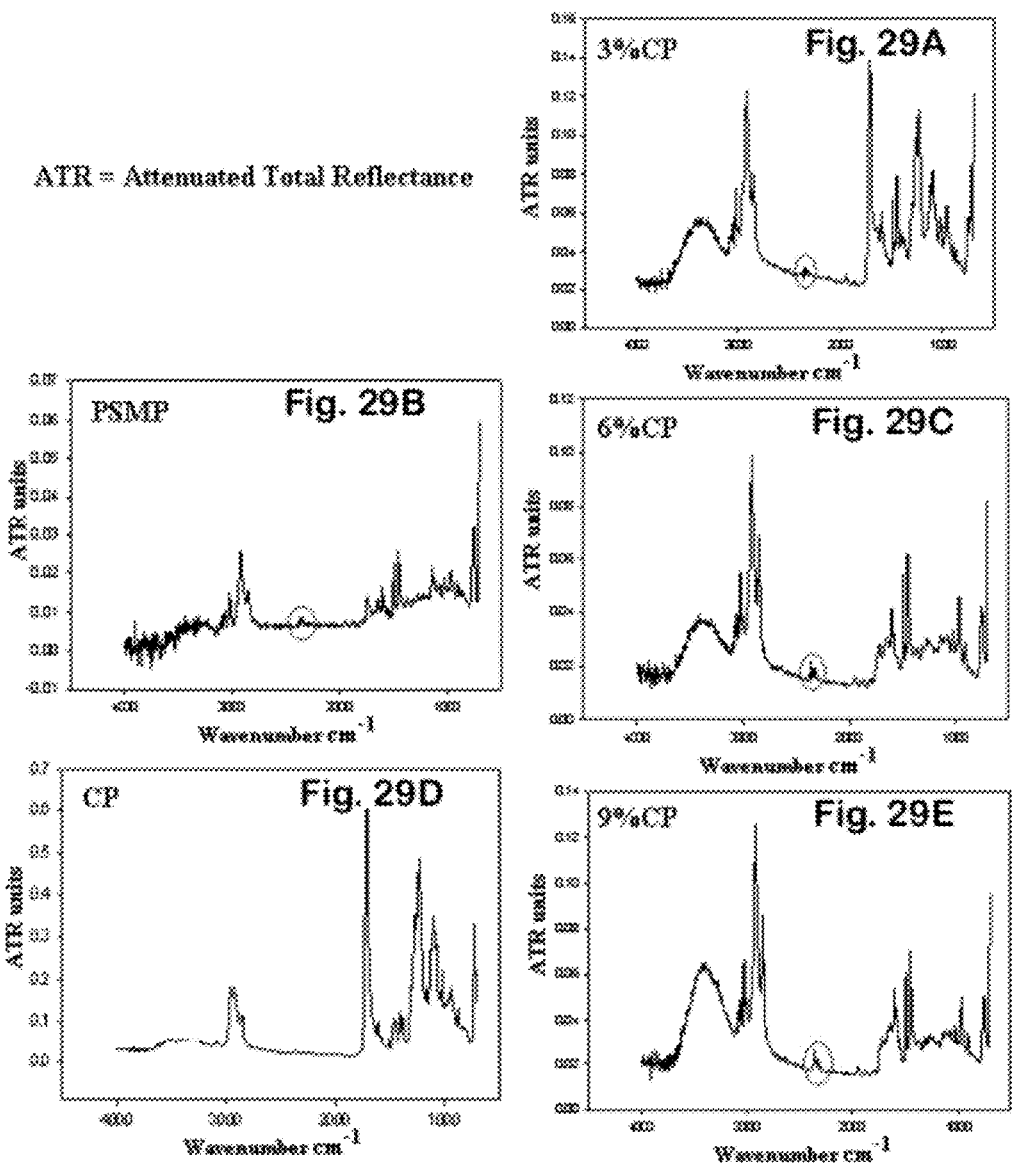

THERMOSETTING SHAPE MEMORY POLYMERS WITH ABILITY TO PERFORM REPEATED MOLECULAR SCALE HEALING

CROSS-REFERENCE TO RELATED APPLICATIONS

This application claims priority under 35 U.S.C. §119(e) from U.S. Provisional Application Ser. No. 61/483,196, filed 6 May 2011, entitled "Biomimetic Self-Healing Composite," the contents of which are fully incorporated by reference herein. This application is related to co-pending application U.S. Ser. No. (to be assigned) entitled "Compression Programming of Shape Memory Polymers Below the Glass Transition Temperature" in the name of Li, filed concurrently herewith.

STATEMENT REGARDING FEDERALLY SPONSORED RESEARCH OR DEVELOPMENT

This invention was made with government support under grant numbers CMMI 0900064 and CMMI 0946740 awarded by the National Science Foundation, and under grant number NNX07AT67A awarded by the National Aeronautics and Space Administration. The United States Government has certain rights in this invention.

BACKGROUND OF THE INVENTION

Field of the Invention

This invention relates to polymeric materials, more particularly it relates to thermosetting polymers, and more particularly it relates to thermosetting shape memory polymer matrices that comprise particles of thermoplastic polymer dispersed therein, allowing the material to have repeatable, self-healing properties.

Description of Related Art

A polymer is a large molecule (macromolecule) composed of repeating structural units. These sub-units are typically connected by covalent chemical bonds. The term polymer encompasses a large class of compounds comprising both natural and synthetic materials with a wide variety of properties. Because of the extraordinary range of properties of polymeric materials, they play essential and ubiquitous roles in everyday life. These roles range from familiar synthetic plastics and elastomers to natural biopolymers such as nucleic acids and proteins that are essential for life.

A plastic material is any of a wide range of synthetic or semi-synthetic organic solids that are moldable. Plastics are typically organic polymers of high molecular mass, but they often contain other substances.

There are two types of plastics: thermoplastic polymers and thermosetting polymers. Thermoplastics are the plastics that do not undergo chemical change in their composition when heated and can be molded again and again. Examples include polyethylene, polypropylene, polystyrene, polyvinyl chloride, and polytetrafluoroethylene (PTFE). Common thermoplastics range from 20,000 to 500,000 amu.

In contrast, thermosets are assumed to have an effectively infinite molecular weight. These chains are made up of many repeating molecular units, known as repeat units, derived from monomers; each polymer chain will have several thousand repeating units. Thermosets can melt and take shape once; after they have solidified, they stay solid. In the thermosetting process, a chemical reaction occurs that is irreversible. According to an IUPAC-recommended definition, a thermosetting polymer is a prepolymer in a soft solid or viscous state that changes irreversibly into an infusible, insoluble polymer network by curing. The cure may be done through heat (generally above 200° C. (392° F.)), through a chemical reaction (two-part epoxy, for example), or irradiation such as electron beam processing. A cured thermosetting polymer is often called a thermoset.

Thermoset materials are usually liquid or malleable prior to curing and designed to be molded into their final form, or used as adhesives. Others are solids like that of the molding compound used in semiconductors and integrated circuits (IC). In contrast to thermoplastic polymers, once hardened a thermoset resin cannot be reheated and melted back to a liquid form.

The curing process transforms the thermosetting resin into a plastic or rubber by a cross-linking process. Energy and/or catalysts are added that cause the molecular chains to react at chemically active sites (unsaturated or epoxy sites, for example), linking into a rigid, 3-D structure. The cross-linking process forms a molecule with a larger molecular weight, resulting in a material with a heightened melting point. During the curing reaction, the molecular weight has increased to a point so that the melting point is higher than the surrounding ambient temperature, the material forms into a solid material.

However, uncontrolled heating of the material results in reaching the decomposition temperature before the melting point is obtained. Thermosets never melt. A thermoset material cannot be melted and re-shaped after it is cured. A consequence of this is that thermosets generally cannot be recycled, except as filler material.

Thermoset materials are generally stronger than thermoplastic materials due to their three dimensional network of bonds (cross-linking). Thermosets are also better suited to high-temperature applications (up to their decomposition temperature). However, they are more brittle. Because of their brittleness, thermoset is vulnerable to high strain rate loading such as impact damage. Since a lot of lightweight structures use fiber reinforced thermoset composites, impact damage, if not healed properly and timely, may lead to catastrophic structural failure.

Thermoplastic, also known as a thermosoftening plastic, is a polymer that turns to a viscous liquid when heated and freezes to a rigid state when cooled sufficiently. Most thermoplastics are high-molecular-weight polymers whose chains associate through weak van der Waals forces (polyethylene); stronger dipole-dipole interactions and hydrogen bonding (nylon); or even stacking of aromatic rings (polystyrene). As noted herein, thermoplastic polymers differ from thermosetting polymers (e.g. phenolics, epoxies) in that they can be remelted and remolded.

Many examples of thermoplastic polymers are known in the art, including Acrylonitrile butadiene styrene, Acrylic (e.g., PMMA), Celluloid, Cellulose acetate, Cyclic Olefin Copolymer, Ethylene-Vinyl Acetate, Ethylene vinyl alcohol, Fluoroplastics (e.g., PTFE, FEP, PFA, CTFE, ECTFE, ETFE), Ionomers, Polyoxymethylene (POM or Acetal), Polyacrylates, Polyacrylonitrile, Polyamide (e.g., Nylon), Polyamide-imide, Polyaryletherketone, Polybutadiene, Polybutylene, Polybutylene terephthalate, Polycaprolactone, Polychlorotrifluoroethylene, Polyethylene terephthalate, Polycyclohexylene dimethylene terephthalate, Polycarbonate, Polyhydroxyalkanoates, Polyketones, Polyesters, Polyethylenes, Polyetheretherketone, Polyetherketoneketone, Polyetherimide, Polyethersulfone, Chlorinated Polyethylene, Polyimide, Polylactic acid (PLA), Polymethylpentene, Polyphenylene oxide, Polyphenylene sulfide, Polyphthalamide, Polypropylene, Polystyrene, Polysulfone, Polytrimethylene terephthalate, Polyurethane, Polyvinyl acetate, Polyvinyl chloride, Polyvinylidene chloride, and Styrene-acrylonitrile copolymer.

Thermoplastics can go through melting/freezing cycles repeatedly and the fact that they can be reshaped upon reheating gives them their name. However, this very characteristic of reshapability also limits the applicability of thermoplastics for many industrial applications, because a thermoplastic material will begin to change shape upon being heated above its $T_g$ and $T_m$.

Initiation of cracks and other types of damage on a microscopic level has been shown to change thermal, electrical, and acoustical properties, and eventually lead to wholesale failure of the material. From a macromolecular perspective, stress induced damage at the molecular level leads to larger scale damage called microcracks. A microcrack is formed where neighboring polymer chains have been damaged in close proximity, ultimately leading to the weakening of the fiber as a whole. In view of the diverse use of polymers in industry, it is self-evident that failure of safety-critical polymer components such as brittle thermoset polymers is a serious problem; failure of these materials can lead to serious even catastrophic accidents.

For thermoset polymers that have developed cracks, unfortunately there are only two fundamental choices, attempt to repair the crack or entirely remove and replace the component that contains the damaged material. Usually, cracks are mended by hand, which is difficult because cracks are often hard to detect. A polymeric material that can intrinsically correct damage caused by normal usage could lower production costs through longer part lifetime, reduction of inefficiency over time caused by degradation of the part, as well as prevent costs incurred by material failure.

Since its introduction in the 1980s in an attempt to heal damage, restore mechanical properties and extend the service life of polymers, the concept of crack healing in polymeric materials has been widely investigated [201-215]. In thermoplastic polymers, the most widely studied and reported mechanism for self-healing is the molecular inter diffusion mechanism. It has been reported [201] that when two pieces of the same polymer are brought into contact at a temperature above its glass transition temperature ($T_g$), the interface gradually disappears and the mechanical strength at the polymer-polymer interface increases as the crack heals due to molecular diffusion across the interface. To better explain the process of crack healing by this mechanism, various models have been proposed [202-204, 216]. In particular, Wool and O'Connor [216] suggested a five stage model to explain the crack healing process in terms of surface rearrangement, surface approaching, wetting, diffusion and randomization. Kim and Wool [206] also presented a microscopic theory for the diffusion and randomization stages. In another study [207], it was observed that the development of mechanical strength during the crack healing process of polymers is related to interdiffusion of the molecular chains and subsequent formation of molecular entanglements. Other reported healing mechanisms in thermoplastic polymers include photoinduced healing, recombination of chain ends, self-healing via reversible bond formation, and via nanoparticles [217].

In thermoset polymers, self-healing mechanisms acting through the incorporation of external healing agents such as liquid healing agent (monomer) encased in hollow fibers [218, 219], micro-capsules [220, 221], and solid healing agent (thermoplastic particles) dispersed in the thermoset matrix [217, 222], have been proposed and tested. However, the different physical and behavioral characteristics of thermoset SMPs relative to standard thermosets make the applicability or suitability of a component on one type of the thermosets of uncertain relevance to others. For example, with regular thermosets suitability of an additional component depends on the chemical compatibility, viscosity of the molten thermoplastic, and the concentration gradient, whereas for thermoset SMPs, suitability of an additional component also depends on diffusion under the recovery force. Some polymers by themselves possess the self-healing capability such as thermally reversible crosslinked polymers [223] and ionomers [224]. Although these systems are very successful in healing micro-length scale damage, they face tremendous challenge when they are used to repair large, macroscopic, structural-length scale damage, which are visible to the naked eye [225-227].

Self-healing of structural damage has been a tremendous interest in the scientific community recently. A true challenge is to mimic biological systems and repair the internal damage autonomously, repeatedly, efficiently, and at molecular-length scale. The state-of-the-art self-repair of thermosetting polymers and their composites includes: (1) use of hollow fibers/microcapsules to release polymeric resin when ruptured, and heal the crack through in-situ polymerization triggered by a catalyst contained in the polymer matrix; (2) use of thermoplastic particles to flow into the crack when heated up and glue the crack when cooled down; and (3) use of thermo-reversible covalent bonds via a retro-Diels-Alder (DA) reaction. Despite the significant advancements made using a bio-mimetic approach, there is still a long way to go before even the simplest biological healing mechanism can be replicated with synthetic materials. One major difference between biological and prior synthetic healing mechanisms is that biological systems involve multiple-step healing solutions. For example, mammalian healing processes rely on fast forming patches to seal and protect damaged skin before the slow regeneration of the final repair tissue.

Several self-healing schemes have been reported in the literature primarily for healing microcracks, including incorporation of external healing agents such as liquid healing agent in microcapsules, hollow fibers, and microvascular networks, and solid healing agent such as embedded thermoplastic particles. Some polymers by themselves possess self-healing capabilities, including ionomers, which consist of over 15% of ionic groups, and a highly cross-linked polymer, which is synthesized via the Diels-Alder (DA) cycloaddition of furan and maleimide moieties, and the thermal reversibility of the chemical bonds is accomplished via the retro-DA reaction. A combination of microcapsule and shape memory alloy (SMA) wire has also been studied. Because damage is usually in structural-length scale, the challenge is how to heal macrocracks. However, the existing systems are unable to very effectively heal macroscopic damage. For instance, in order to heal macrocracks, a large amount of healing agent is needed. However, incorporation of a large amount of healing agent will significantly alter the physical/mechanical properties of the host structure. Also, large capsules/thick hollow fibers themselves may become potential defects when the encased healing agent is released. A major challenge is how to heal structural-length scale damage such as impact damage autonomously, repeatedly, efficiently, timely, and at the molecular-length scale. Recently, shape memory polymer (SMP) has emerged as a new type of smart material. Various types of applications have been studied, particularly in lightweight structure applications. Tey et. al [426] studied the shape memory functionality of a polyurethane (PU) based SMP foam by performing the conventional thermomechanical programming cycle and recommended those PU based foams be used in foldable space vehicles and quick molding devices. Huang et. al [427] studied the influence of cold hibernation on the shape memory properties of PU based SMP foams. They concluded that the cold hibernation process did not affect the shape memory properties in spite of keeping them in a compacted state for a prolonged period.

A number of types of shape memory polymers are known in the art. Shape memory can be engineered into a number of polymers, including block copolymers such as those containing polyurethanes; polyurethanes with ionic or mesogenic components; polyurethanes crosslinked with glycerin or trimethylol propane; block copolymer of polyethylene terephthalate (PET) and polyethyleneoxide (PEO); block copolymers containing polystyrene and poly(1,4-butadiene); ABA triblock copolymer made from poly(2-methyl-2-oxazoline) and polytetrahydrofuran; PEO-PET block copolymers crosslinked with maleic anhydride, glycerin or dimethyl 5-isopthalates; AA/MAA copolymer crosslinked with N,N'-methylene-bis-acrylamide; MAA/N-vinyl-2-pyrrolidone copolymer crosslinked with ethyleneglycol dimethacrylate; PMMA/N-vinyl-2-pyrrolidone crosslinked with ethyleneglycol dimethacrylate; styrene acrylate; cyanate ester; and epoxy polymer. The "memory," or recovery, quality comes from the stored mechanical energy attained during the reconfiguration and cooling of the material. Above its transition temperature, an SMP goes from a rigid, plastic state to a flexible, elastic state. When cooled, it becomes rigid again and can be constrained in its new shape configuration. Shape memory characteristics can be engineered into different types of polymers.

The shape memory effect involves two components: Cross-linkers, which determine the "permanent" shape, and "switching segments," which maintain a temporary shape. Above the glass transition temperature a shape memory polymer will be in its "permanent" or "memory" shape, in the absence of a load. It can be deformed at the elevated temperature into another shape, and then cooled to lock in the deformed or "temporary" shape. Upon re-heating above the glass transition temperature, the polymer returns to its memory shape. This cycle can be repeated many times without degradation.

One problem with existing self-healing systems is the presence of voids after the healing process. For example, a polymeric material will contain microcapsules of monomer throughout, and similarly an initiator/catalyst would be uniformly present throughout the material. When a crack occurs, the monomer-bearing capsules at the site of the crack would rupture, disgorge monomer and polymerization would result because of the presence of the initiator. Prior to polymerization, the capillary forces at the crack face would encourage even flow of monomer, resulting in an evenly-healed crack. However, after the crack has healed the material now has voids where the monomer capsules used to be. These voids can have an adverse effect upon the material's mechanical properties. Moreover, this self-healing process is available for only one time in the area of the healed crack.

In a previous study, it was shown that the stress-controlled programming and partially confined shape recovery of a SMP based syntactic foam was able to close impact damage repeatedly, efficiently, and almost autonomously (the only human intervention is by heating) [7]. It was found that the key to using a shape memory effect for self-closing of cracks depended on both the reduction of structure volume during programming, and the external confinement of the structure during shape recovery. This is because once damage is created in a programmed structure that has a reduced volume, the structure tends to recover its original, larger volume during the heating or shape recovery process, due to its shape memory functionality. If the expansion in volume was resisted by external confinement, the material will be pushed towards internal open spaces such as cracks, achieving the self-closing purposes. Therefore, compression programming was required. Repeatability in self-closing (up to 7 cycles [7]) comes from the fact that each round of confined shape recovery served dual purposes: one for self-closing internal cracks, and the other for completing a new round of compression programming.

This combination of closing and reprogramming is achieved because the confined shape recovery came about by heating the foam above the $T_g$, applying a certain compressive stress to the foam due to confinement, and cooling down below $T_g$ while maintaining the prestrain, which is typical for strain-controlled programming. In other words, strain-controlled programming was coupled with confined shape recovery. Therefore, although it may seem as if only one programming was conducted at the very beginning of the repeated impact/closing cycles [7], each shape recovery actually had one prior programming to supply the energy. The subsequent programmings were automatically performed by being coupled with each confined shape recovery. Therefore, one "nominal" programming led to several cycles of shape recovery [7]. Of note, the method of [7] although referred to as "healing" was only a closing of the polymer defect; no molecular scale healing was achieved. The approach of [7] had disadvantages, it lacked the ability to regain a substantial amount of the original integrity as the two sides of a crack were brought back into contact with each other, but were not reconnected in a "healing" manner one to the other.

Fiber reinforced polymer composite sandwich structures have been used in various engineering structures. Damage due to transverse impact loads has been a critical problem for composite sandwich structures. In a composite sandwich structure, the core is primarily responsible for dissipating impact energy in addition to providing transverse shear resistance. Various types of core materials have been studied such as foam core (polymeric foam, metallic foam, ceramic foam, balsa wood, syntactic foam, etc.) [401, 402], web core (truss, honeycomb, etc.) [403], 3-D integrated core [404, 405], foam filled web core [405, 406], and laminated composite reinforced core [407]. However, these core materials are limited in one way or another. For example, brittle syntactic foam cores absorb impact energy primarily through macro-length scale damage, significantly sacrificing residual strength [408-411]; web cores lack bonding with the skin and also have impact windows (small regions in the core that are not filled with the foam, resulting in complete perforation of the sandwich under impact) [405, 406]; 3-D integrated core suffers from pile buckling [405], etc.

Li and Muthyala 2008 [412] and Li and Chakka [413] disclosed a sandwich structure with an integrated grid stiffened syntactic foam core. It is found that this sandwich develops synergy between the grid skeleton and the filled foam, and between the core and the skin, leading to a much higher post-impact residual in-plane compressive strength than the traditional laminated composite with the same amount of raw materials. However, the residual strength is still very low as compared to the intact sandwich. It is desired to maintain the post-impact structural strength through damage self-healing so that the impact damaged sandwich can be continuously used in service.

Thus, prior to the disclosure of the present invention, there has been a need in the art for a SMP self-closing mechanism that not only closes defects, but allows for molecular scale healing of the defect; in particular there is a need for such healing that can be performed on a repeated basis at or near the site of a prior wound.

BRIEF SUMMARY OF THE INVENTION

I have discovered a polymeric composition which can achieve a two-step healing process which mimics the biological healing process of human skin, e.g., an initial closing of a wound by bleeding and clotting (or suturing) followed by a step of healing where new cells gradually grow and heal a wound. This healing approach is referred to as a close then heal (CTH) process. In such a two-step process as disclosed herein, the confined shape recovery of shape memory polymers (SMPs) is used for the purpose of narrowing and/or closing the macroscopic crack (Step 1), and then molten thermoplastic particles are used for healing on a molecular scale (Step 2). The novel CTH scheme is schematically shown in FIG. 1.

Products produced by the methods and with the compositions of the invention can be used for protecting civilian structures, as well as law enforcement and military equipment and personnel from impact damage or injury. The invention can also be used to help seal defects/cracks/wounds in any structures such as aircraft, ship, auto, train, piping, pressure vessel that is constructed with a composition in accordance with the invention. The invention also is used for materials such as self-healing cement, concrete, and asphalt concrete for construction.

Methods and compositions in accordance with the invention rely upon a characteristic of shape memory polymers in which their volume is initially reduced through programming or training, e.g., either the more traditional heat-based or cold compression. When subsequently stimulated by heating above its glass transition temperature, the programmed thermoset SMP remembers its original shape and reverts in volume. However, this regrowth is limited by external confinements which direct the SMP towards internal open defects thereby narrowing or closing the defects (Step 1, the closing step). Additional heating above the melting point of the thermoplastic particles allows the molten thermoplastic molecules to be sucked into the now narrowed defect by capillary forces; these molten molecules also diffuse into the fractured SMP driven by concentration gradient and recovery force. Upon cooling, the thermoplastic hardens thereby "gluing" the crack at a molecular scale (step 2, the healing step). This sequence completes one autonomous and molecular damage-healing cycle.

Moreover, because each round of a confined SMP shape recovery process represents a new compression training cycle to the SMP, this means that only one initial external programming is required. Subsequent programming is autonomous by coupling with shape recovery (healing) of the SMP. Together with the fact that the thermoplastic particles can also be repeatedly melted and hardened, the damage-healing cycle is repeatable.

Therefore, structural-length scale damage was shown to be healed repeatedly and molecularly. Of note, the present invention does not require new polymerization, such as occurs when monomers are released from fractured or melted containers within a matrix.

Further embodiments disclosed herein comprise lightweight and self-healing SMP-cored sandwich structures.

In a two-step close-then-heal (CTH) process of the invention, programming or training to reduce the volume of the shape memory polymer (SMP) matrix is a preferred step. Such programming may occur by the traditional method of programming or the recent isothermal programming which takes place without the need to raise the SMP's temperature above its $T_g$. In the literature, programming a shape for thermosetting SMPs required an initial heating above the glass transition temperature (Tg), applying prestress or prestrain, subsequent cooling below Tg while holding the stress or strain constant, and removal of the applied load. This process is a very time-consuming, low-efficiency, and cost-ineffective process. Based on the concept of structural and stress relaxation, one embodiment for a novel system where thermosetting SMPs can be programmed or trained at temperatures well below Tg has been developed, see, e.g., co-pending application U.S. Ser. No. (to be assigned) entitled "Compression Programming of Shape Memory Polymers at Temperatures Below the Glass Transition" in the name of Li, filed concurrently herewith, which is incorporated by reference herein for all purposes. Cold-compression programming of a thermosetting SMP and of SMP based syntactic foam has been performed. It was found that, as long as the prestrain is higher than the yielding strain of the SMP, programming could be conducted at a glassy temperature, i.e., below $T_g$. The effect of prestrain level, loading rate, and stress relaxation time on the shape fixity and shape recovery ratios has been determined through both experimental testing and theoretical modeling. It was shown that this is a very fast and efficient way of educating SMPs and their composites. Accordingly, cold compression programming is one embodiment for training SMPs for the CTH self-healing system.

The following terms are used herein:

Glass transition temperature ($T_g$) describes the temperature at which amorphous polymers undergo a transition from a rubbery, viscous amorphous liquid ($T>T_g$), to a brittle, glassy amorphous solid ($T<T_g$). This liquid-to-glass transition (or glass transition for short) is a reversible transition. The glass transition temperature $T_g$ is always lower than the melting temperature, $T_m$, of the crystalline state of the material, if one exists. An amorphous solid that exhibits a glass transition is called a glass. Supercooling a viscous liquid into the glass state is called vitrification.

Melting point ($T_m$): when applied to polymers, is not used to suggest a solid-liquid phase transition but a transition from a solid crystalline (or semi-crystalline) phase to a still solid amorphous phase. The phenomenon is more properly called the crystalline melting temperature. Among synthetic polymers, crystalline melting is only discussed with regards to thermoplastics, as thermosetting polymers decompose at high temperatures rather than melt. Consequently, thermosets do not melt and thus have no $T_m$.

Healing Temperature ($T_h$) is a preferred temperature above the melting temperature where the thermoplastic molecules further overcome intermolecular barriers and are able to gain mobility and to more effectively diffuse.

Decomposition Temperature ($T_D$) is a temperature at which chemical bonds are broken or violent oxidation occurs whereby a material may catch fire.

In certain embodiments the invention comprises a thermoset shape memory polymer composite comprising self-healing ability, the composite comprising: a matrix of thermoset shape memory polymer, and self-healing compositions dispersed throughout said matrix. The self-healing may be termed an autologous or integral self-healing ability, in that such healing is obtainable without additional materials, and only thermal energy need to be added to accomplish the healing. The self-healing compositions can comprise thermoplastic polymer; in addition to thermoplastic particles, milled thermoplastic fibers can also be used; such fibers may serve two purposes (1) further reinforcing the SMP matrix and (2) provide molecular healing per CTH process. Preferably, the melting temperature of the thermoplastic polymer is lower than the decomposition temperature of the thermoset matrix. The shape memory polymer can be programmed to a volume less than a native expanded volume of the polymer by either cold compression at a temperature below the glass transition temperature of the thermoset polymer, or programmed at a temperature above the glass transition temperature of the thermoset polymer. The thermoset shape memory polymer can be, e.g., a polystyrene shape memory polymer or a shape memory epoxy. In certain embodiments, the thermoplastic polymer is 25% or less, 20% or less, 15% or less, 10% or less, 9% or less, 8% or less, 7% or less, 6% or less, 5% or less, 4% or less, 3% or less, or, 2% or less of the volume of the composition.

Certain embodiments include a method for closing and healing a wound with a composite of the invention which has been programmed to a volume less than a native expanded volume of the composition, said method comprising the steps of: heating an area comprising the wound to a temperature above the glass transition temperature of the thermoset material, whereby the thermoset material expands and achieves some closure of the wound; heating an area comprising the wound to a temperature above the melting temperature of the thermoplastic material, whereby molten thermoplastic material flows into the wound after heating, and cooling the structure below the melting temperature of the thermoplastic, whereby the thermoplastic hardens and heals the wound at a molecular scale. The heating steps can take place concurrently. Heating is preferably below the decomposition temperature of the thermoset material. The heating may be above the healing temperature ($T_h$) of the thermoplastic material.

BRIEF DESCRIPTION OF THE DRAWINGS

FIG. 29: FTIR spectra of the pure CP, pure PSMP, and their composites.

DETAILED DESCRIPTION OF THE INVENTION

Figure 1:
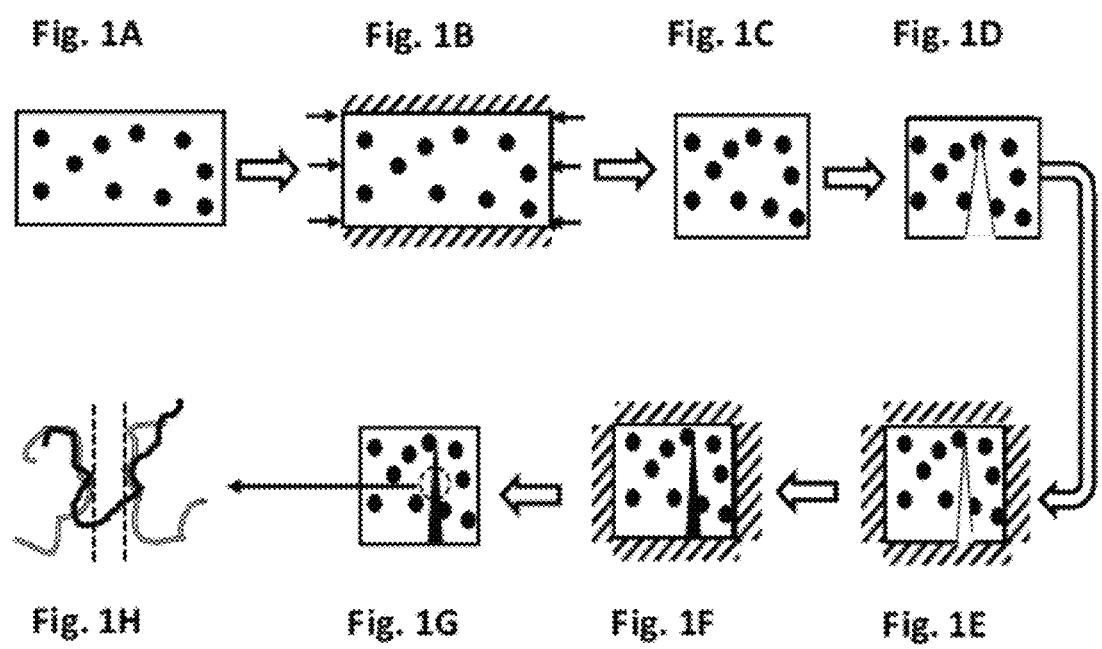
FIG. 1: Schematic of the CTH scheme of the smart foam ((a)-(e) complete closing and (f)-(h) ensure healing) (Tgp>Tgs)

As set forth herein, a sequential two-step process for healing thermoset SMP polymers is disclosed. This healing process mimics biological healing processes such as those in human skin. This healing process for polymers is referred to herein as close-then-heal (CTH). In CTH, the structural scale crack will be first sealed or closed by a certain mechanism before molecular scale self-healing mechanisms such as molten thermoplastic particles can take effect. Thermally activated shape memory polymers (SMPs), if properly programmed or educated, can recover original shape upon heating above the glass transition temperature ($T_g$), by an autonomous, conformational entropy driven shape recovery mechanism. As set forth herein, the shape recovery functionality can be utilized to achieve the self-closing purposes in CTH.

For a pair of thermoset SMP and thermoplastic materials, following are preferred aspects of the CTH process:

(1) For this discussion $T_c$, $T_{g\text{-}ts}$, and $T_{d\text{-}ts}$ are designated as the curing temperature, glass transition temperature, and degradation temperature of the thermoset SMP, and $T_{g\text{-}tp}$, $T_{m\text{-}tp}$, and $T_{h\text{-}tp}$ as the glass transition temperature of amorphous thermoplastic, melting temperature of crystalline thermoplastic, and healing temperatures of either amorphous or crystalline thermoplastic (2) The following thermal property relationships are preferred in the context of materials used in the invention For an amorphous thermoplastic: $T_{g\text{-}ts} < T_{g\text{-}tp} < T_{h\text{-}tp} < T_{d\text{-}ts}$
For a crystalline thermoplastic: $T_{g\text{-}ts} < T_{m\text{-}tp} < T_{h\text{-}tp} < T_{d\text{-}ts}$ (3) For SMP programming, in certain embodiments the temperature at which compression programming (P) occurs for the thermoset is as follows:

For an amorphous thermoplastic: $T_{g\text{-}ts} < P < T_{g\text{-}tp} < T_{h\text{-}tp} < T_{d\text{-}ts}$
For a crystalline thermoplastic: $T_{g\text{-}ts} < P < T_{m\text{-}tp} < T_{h\text{-}tp} < T_{d\text{-}ts}$ (4) For SMP programming, in certain embodiments curing (C) of programmed thermoset is as follows:

$$C < T_{g\text{-}ts}$$

$$T_{g\text{-}ts} < C < T_{g\text{-}tp}$$

$$T_{g\text{-}ts} < C < T_{m\text{-}tp}$$

(5) For a CTH repair, in certain embodiments heating (H) is as follows:

For an amorphous thermoplastic: $T_{g\text{-}ts} < T_{g\text{-}tp} < H < T_{h\text{-}tp} < T_{d\text{-}ts}$
For a crystalline thermoplastic: $T_{g\text{-}ts} < T_{m\text{-}tp} < H < T_{h\text{-}tp} < T_{d\text{-}ts}$ (6) For a CTH repair, in alternative embodiments heating (H) is as follows:

For an amorphous thermoplastic: $T_{g\text{-}ts} < T_{g\text{-}tp} < T_{h\text{-}tp} < H < T_{d\text{-}ts}$
For a crystalline thermoplastic: $T_{g\text{-}ts} < T_{m\text{-}tp} < T_{h\text{-}tp} < H < T_{d\text{-}ts}$ Self-closing is facilitated by use of external confinements such that a return of the SMP to its expanded native state has as much growth as possible directed toward any polymer defect, minimizing growth forces outward. In certain embodiments of the invention, external confinement can be achieved by architectural design of structures. Thus, a grid skeleton as proposed by Li and Muthyala 2008 [412] can provide in-plane confinement to the filled foam naturally. It is envisioned that the conventional syntactic foam in [412] is replaced by the SMP based syntactic foam such as set forth in [422, 423]. As set forth herein, a new sandwich structure maintain all the advantages in [412] with additional advantages of self-healing impact damage repeatedly, efficiently, and almost autonomously. In one embodiment, external confinement is obtained by mechanisms such as a sandwich structure with a hybrid grid stiffened syntactic foam core [8, 9]. It is found that this new sandwich responds to impact quasi-statically, develops synergy between the grid skeleton and the foam, as well as between the core and the skin, and leads to a much improved post-impact residual load carrying capacity. In accordance with the present invention, the conventional epoxy based syntactic foam of [8, 9] is replaced by a self-closing foam. The new sandwich structure displays self-closing capabilities, in addition to the advantages demonstrated in [8, 9]. The reason for this is that the SMP based foam will be confined by the grid skeleton in the in-plane direction and by the skin in the transverse direction. If shape memory polymer or shape memory alloy z-pins are used, a much stronger transverse confinement will also be created; in other words, 3-D compression confinement will be created for the foam. Also, it has been established that 3-D confinement can significantly increase the compressive strength of the materials [10]. This is particularly helpful for an SMP based foam because its compressive strength is typically low [7].

Thermoset shape memory polymer:

As used herein, a thermoset shape memory polymer is a chemically cross-linked polymer with a suitable cross-link density, or proper number of segments between two cross-linking points, that permits the material to have shape memory characteristics. If the cross-link density is too high, the polymer becomes a regular thermoset polymer; if the cross-link density is too low, it becomes an elastomer or rubber. Therefore, a thermoset shape memory polymer depends on both composition and morphology. When a thermoset is deformed, it first responds elastically by chemical bond stretching (i.e., the chemical bond returns to its equilibrium position when the load is removed); further loading overcomes the intermolecular segmental rotation resistance, leading to yielding and plastic deformation. Usually, following the yielding, the polymer responds first by strain softening (similar to dynamic frictional force being smaller than the maximum static friction force), and then strain hardening occurs which is due to network stretching resistance. Finally, the network is fractured and the material fails. For regular thermoset polymer, yielding does not lead to shape memory. The reason is that the number of segments between the crosslinking points is too small and the energy stored in the amorphous segments is too small. Therefore, shape memory is negligible. Also, for regular thermoset, programming at temperature above Tg does not lead to shape memory. The reason is again due to the fact that not much energy is stored in the amorphous segments and shape recovery can be neglected. A rubber only responds to a load elastically, and does not possess the shape memory effect.

When a thermoset SMP is programmed at temperature above Tg, the intermolecular rotation resistance is very small so that only a small stress is needed to program. However, the load must be maintained all the way to a temperature below Tg. Otherwise, removal of the load will lead to immediate rebound because the material is rubbery at temperature above Tg.

Composition for Molecular scale healing: As used herein a composition for molecular scale healing can be a thermoplastic. In certain embodiments the thermoplastic is particulate. In certain embodiments the thermoplastic is in fibrous or matrix form. In certain embodiments, the composition for molecular scale healing is not a thermoplastic, yet in such situations the healing composition still preferably has the relevant physical properties, such as glass transition or melting disclosed herein with regard to suitable thermoplastic materials.

EXAMPLES

Example 1

Shape Memory Polymer Based Self-Healing Syntactic Foam: 3-D Confined Thermomechanical Characterization In this example, the thermomechanical behavior of a shape memory polymer (SMP) based syntactic foam under three-dimensional (3-D) confinement was investigated through strain-controlled programming and fully confined shape recovery tests. The 3-D confinement was created by encasing the foam in circular confining tubes and subjecting the foam cylinder to uniaxial compression. The parameters investigated included two programming temperatures, three types of confining tubes with varying lateral confinements, three prestrain levels, and one fully-confined recovery condition. A three-layer plane-stress analytical model was also developed to estimate the volume change of the specimen by prestressing.

It was found that the stress recovery ratio was the highest with rubber liner and the recovered stress was the highest with nylon liner. The stress recovered in the foam specimen which was confined by the nylon liner is as high as 26 MPa, making an embodiment of the invention useful as an actuator where, e.g., a switch needs external force to occur in a controlled manner; in such an embodiment self-healing SMP can provide this force when it recovers.

While volume reduction during programming helps the foam to self-close cracks, the volume reduction ideally stays within certain limits; otherwise, the foam loses its shape memory functionality.

The thermomechanical behavior of the SMP based syntactic foam developed by Li and John [7] was investigated by encasing the foam into various confining tubes. Through testing of fiber reinforced polymer tube encased concrete cylinders, it has been demonstrated that uniaxial compression of the concrete core produces 3-D compressive stress conditions in the concrete core, and lateral confinement can be controlled by adjusting the confining tubes [10]. In this study, double-walled confining tubes were used. By adjusting the materials used for the inner tube or liner, varying lateral confinements were created. A systematic test program including a combination of two programming temperatures, three prestrain magnitudes, three lateral confinement levels, and one recovery condition was implemented. A three-layer plane-stress analytical model was developed to estimate the volume reduction under the programming stress. The shape recovery or self-closing functionality under these test conditions was determined Based on the data from this example, the following conclusions were reached:

a) Under 3-D compressive confinement, the strain-controlled programming can typically be represented by two steps, instead of three steps. The cooling and unloading are integrated into one step.

b) The stress recovery ratio and recovered stress depend on the type of liners, the programming temperatures, and the prestrain levels. For the parameters investigated in this study, a rubber liner leads to the highest stress recovery ratio and nylon liner leads to the highest recovered stress. Higher prestrain leads to higher recovered stress, regardless of the liner types and programming temperatures.

c) The foam programmed by the nylon liner has a potential to be used as a 1-D actuator due to the considerably higher stress recovered.

d) It is found that while volume reduction during programming helps the foam to have self-closing functionality, the volume reduction should be within a certain limits (e.g., about 54.34% in this study) in order to avoid the foam losing its shape memory functionality and the capability for self-closing cracks.

Experimental Protocols
Raw Materials

The same raw materials used in [7] were used in this study. The shape memory polymer (Veriflex polystyrene, CRG Industries) has a $T_g$ (glass transition temperature) of 62° C., tensile strength of 23 MPa and modulus of elasticity of 1.24 GPa at room temperature. The glass microballoons (Potters Industries Q-cel 6014) have a bulk density of 0.08 g/cm$^3$, effective density of 0.14 g/cm$^3$, particle diameter range of 5-200 μm, average outer diameter of 85 μm, average wall thickness of 0.8 μm, and crushing strength of 1.72 MPa. The multi-walled carbon nanotubes (Cheap Tubes Inc) have a density of 2.1 g/cm$^3$, diameter of 20-30 nm, and length of 20-30 μm.

Syntactic Foam Fabrication and Specimen Preparation

The foam was fabricated by dispersing 40% by volume of microballoons and 0.15% by volume of multiwalled carbon nanotubes into the polymer matrix. Similar to [7], a two-step procedure was used to prepare the syntactic foam. First, the carbon nanotubes were added to the polymer matrix. The mixture was mixed with the assistance of an ultrasound mixer for 30 minutes at a frequency of 20 kHz (Sonics Vibracell VC 750 W) and a three-roll mill for one pass (NETZSCH type 50).

Second, microballoons and hardener were added to the carbon nanotube/polymer mixture and mixed with a spatula for 15 minutes. It was then poured into an aluminum mold of 304.8 mm by 304.8 mm by 12.7 mm for curing. The process started with 24 hours of room temperature curing, followed by post-curing at 75° C. for 24 hours, 90° C. for 3 hours and 100° C. for 9 hours in an oven. The curing at 100° C. for 9 hours instead of 3 hours was based on the findings in [7] to eliminate the post-curing effect. After curing, the SMP foam slab was brought to a drilling machine for machining. The drilling direction was perpendicular to the thickness direction of the panel. The specimens were cylinders with a diameter of 12.7 mm and a height of 25.4 mm.

Confining Tube Preparation

The confining tubes were double-walled tubes. The outer-tube was made of medium carbon steel with a height of 25.4 mm, inner diameter of 25.4 mm, and wall thickness of 12.7 mm, so that it can serve as a "rigid" confining tube. Three types of inner tubes (or liners) were used. All of them had the same dimension: height of 25.4 mm, inner diameter of 12.7 mm and outer diameter of 25.4 mm. Such a dimension ensures that the outer tube and the inner tube make a perfect double-walled tube.

The difference between the three types of inner tubes was the materials used. The first one was medium carbon steel to provide "rigid" confinement; the second was nylon to provide "intermediate" confinement; and the third one was rubber to provide "weak" confinement. The mechanical properties of the three types of liner materials are summarized in Table 1.

Strain-Controlled Programming

Strain-controlled programming was conducted. With stress-controlled programming, the stress is maintained constant during the programming while strain-controlled indicates that the strain is constant. The advantage of using strain controlled programming instead of stress controlled programming is that the geometry or dimensional stability of the specimen is maintained, which is critical for many actual structures. In order to investigate the effect of programming temperature on the thermomechanical behavior of the foam, two temperatures, 71° C. and 79° C., were used. Based on the DSC test results, the glass transition temperature ($T_g$) of the foam was about 62° C. [7]. Therefore, 79° C. was well above the $T_g$. 71° C. was also used for the purposes of evaluating if a programming temperature that was slightly above or close to the glass transition region could fix the shape and recover the stress or not.

From the room temperature compressive stress-strain test, see, e.g., co-pending application U.S. Ser. No. (to be assigned) entitled "Compression Programming of Shape Memory Polymers Below the Glass Transition Temperature" in the name of Li, filed concurrently herewith which is fully incorporated by reference. The foam exhibited three-regions: elastic region (strain between 0-7%), densification region (strain between 7-50%), and solidification region (strain above 50%) [7].

In order to evaluate the effect of the three regions on the thermomechanical performance, three prestrain levels, corresponding to these three regions, were selected. They were 5%, 30%, and 60%. It is noted that 60% compressive strain is extremely large for most polymers. For the foam, the deformation comes from two components, the SMP matrix and the microballoon. In order to investigate the maximum volume reduction of the SMP matrix without damaging the shape memory functionality, neat SMP specimens were compressed to failure under a "rigid" confinement condition at 79° C. It was found that the maximum volume reduction of the SMP matrix was 17.0% at a failure axial strain of 18.3%.

For each prestrain level and each temperature, the foam cylinder was first inserted into the double-walled confining tube. After that, the confined specimen was put into a temperature controlled chamber (ATS heating chamber) in a gear-driven MTS Q-Test 150 machine. The temperature was gradually raised at a rate of 1° C./min until the designed temperature (71° C. or 79° C.) was reached. Then, the temperature was maintained for 30 minutes to achieve uniformity in the cylinder. After that, the programming started.

Programming consisted of two steps. Step 1 (prestressing): the loading rig was brought to contact with a cylindrical steel plug (with a diameter of 12.7 mm and height of 25.4 mm) and started to load the specimen at a rate of 1.3 mm/min. Once the designed prestrain level (5%, 30%, or 60%) was reached, the loading was stopped and the prestrain was maintained constant for 20 minutes. Step 2 (cooling and unloading): The chamber was kept closed and natural cooling occurred. Depending on the prestrain level and starting temperature, the cooling process took up to 6 hours. Because of stress relaxation and contraction during cooling, the stress was continuously reduced to zero, suggesting separation of the specimen from the loading rig. Once the stress became zero, the programming process or shape fixity process was completed.

Strain-Controlled Shape Recovery Test

Strain-controlled or fully-confined recovery tests were conducted. It started immediately after the completion of the programming with the same loading device and environmental chamber. The chamber was heated up at a ramp rate of 0.6° C./min. The heating was continued until the programmed temperature (71° C. or 79° C.) was reached. After that, the temperature was maintained constant for several hours and the stress was continuously recorded. This process was stopped when further stress recovery was negligible.

Figure 2:
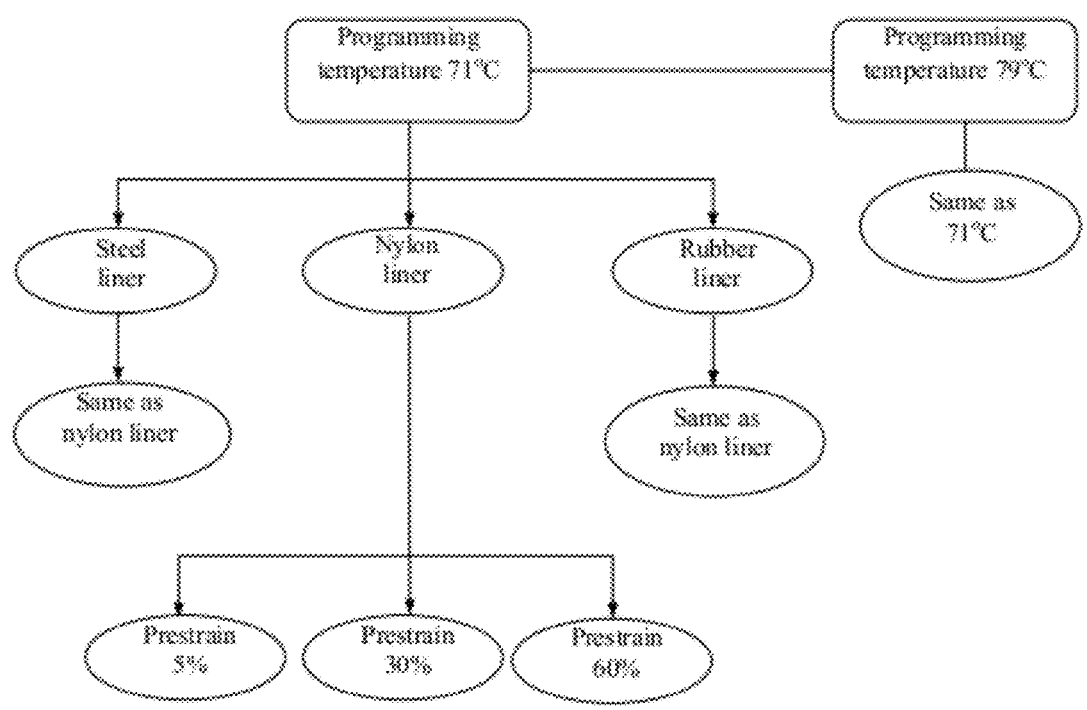
FIG. 2: Flowchart of the experimental design.

A flowchart of the experimental design is schematically shown in FIG. 2. There were 18 combinations (2 temperatures (71° C. and 79° C.)×3 inner tube materials (steel, nylon, and rubber)×3 prestrain levels (5%, 30%, and 60%)). At least 3 specimens were tested at each combination. The total number of specimens in this study was 54.

Results

Figure 3:
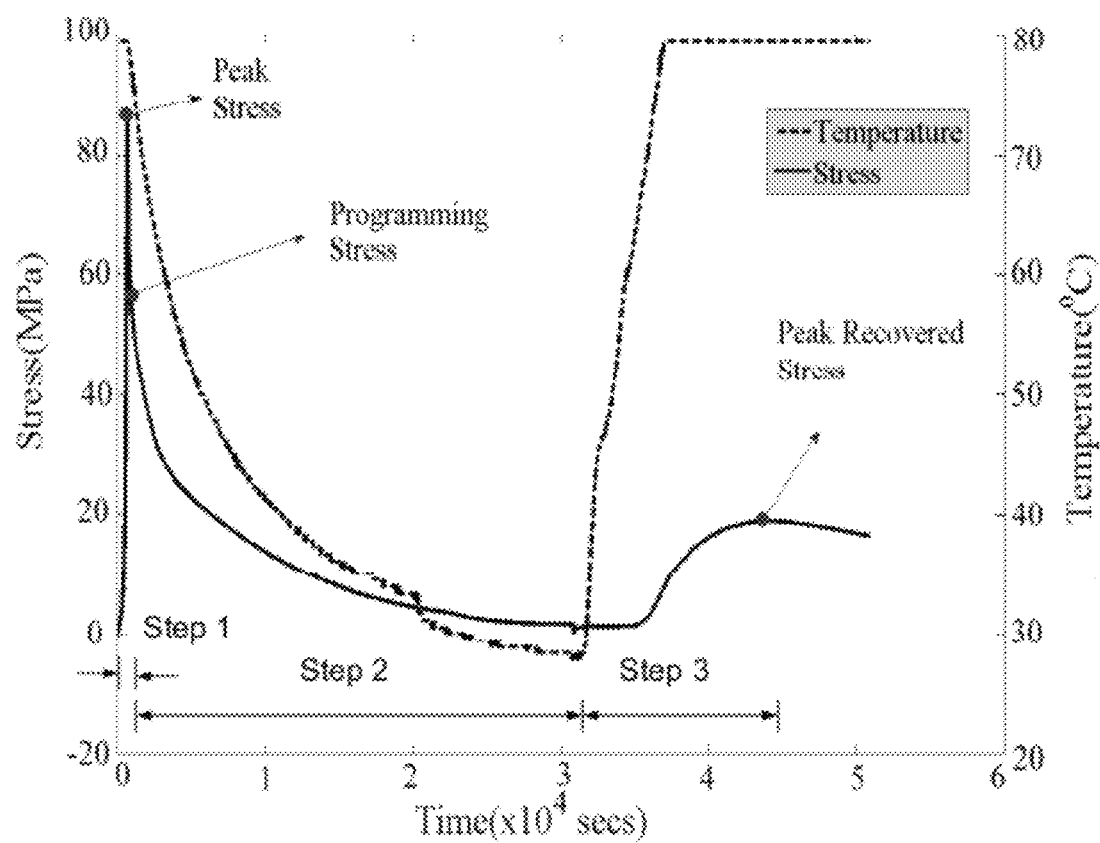
FIG. 3: Axial stress-time and temperature-time behavior of the SMP foam with nylon liner at a programming temperature of 79° C. and prestrain level of 60%. The three steps (Step 1: prestressing, Step 2: cooling and unloading, and Step 3: stress recovery) are shown by the three regions and the peak stress, programming stress, and peak recovered stress are indicated by dots.

In order to better understand the thermomechanical cycle of the syntactic foam under different test conditions, the test results are presented in both 3-D and 2-D format. Typical 2-D axial stress-time and temperature-time curves for the foam confined by nylon liner, programmed at 79° C. and under 60% prestrain level, and fully confined shape recovery are shown in FIG. 3.

Figure 4:
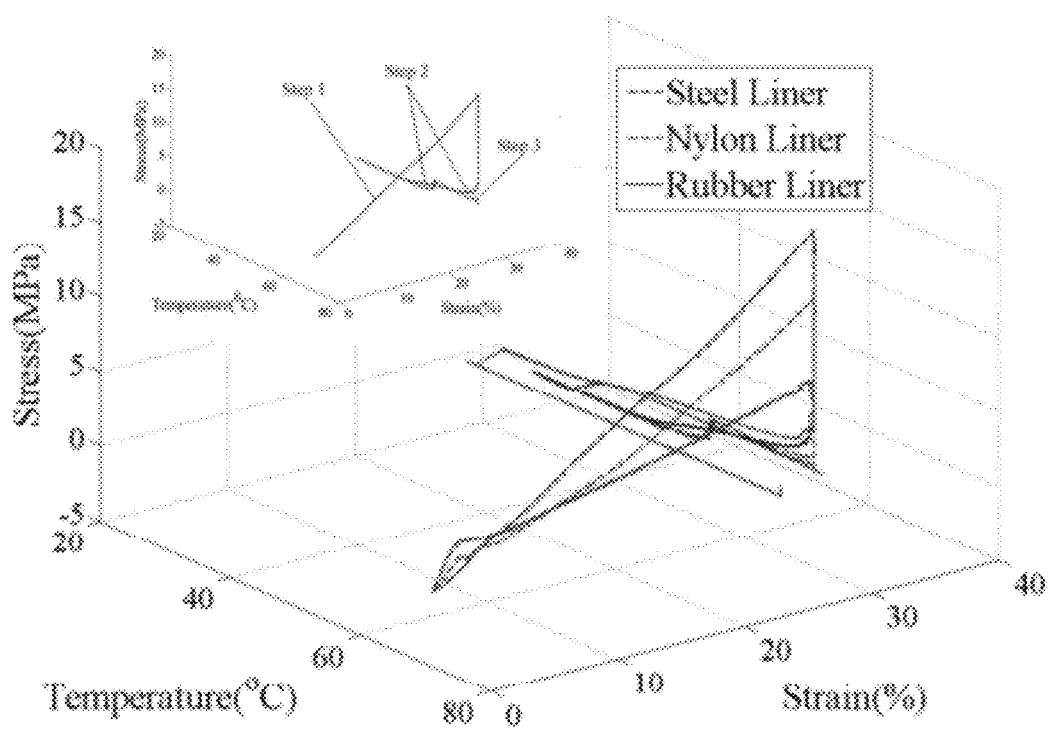
FIG. 4: Axial stress-temperature-axial strain thermomechanical cycle at a programming temperature of 71° C. and prestrain level of 30%. The subplot shows the three-step thermal mechanical cycle of a specimen confined by steel liner (Step 1 (prestressing) and Step 2 (cooling and unloading) represent programming and Step 3 represents stress recovery)

Typical 3-D axial stress-axial strain-temperature thermomechanical cycles for the syntactic foam at a programming temperature of 71° C., prestrain level of 30%, and fully confined shape recovery are shown in FIG. 4.

Figure 5:
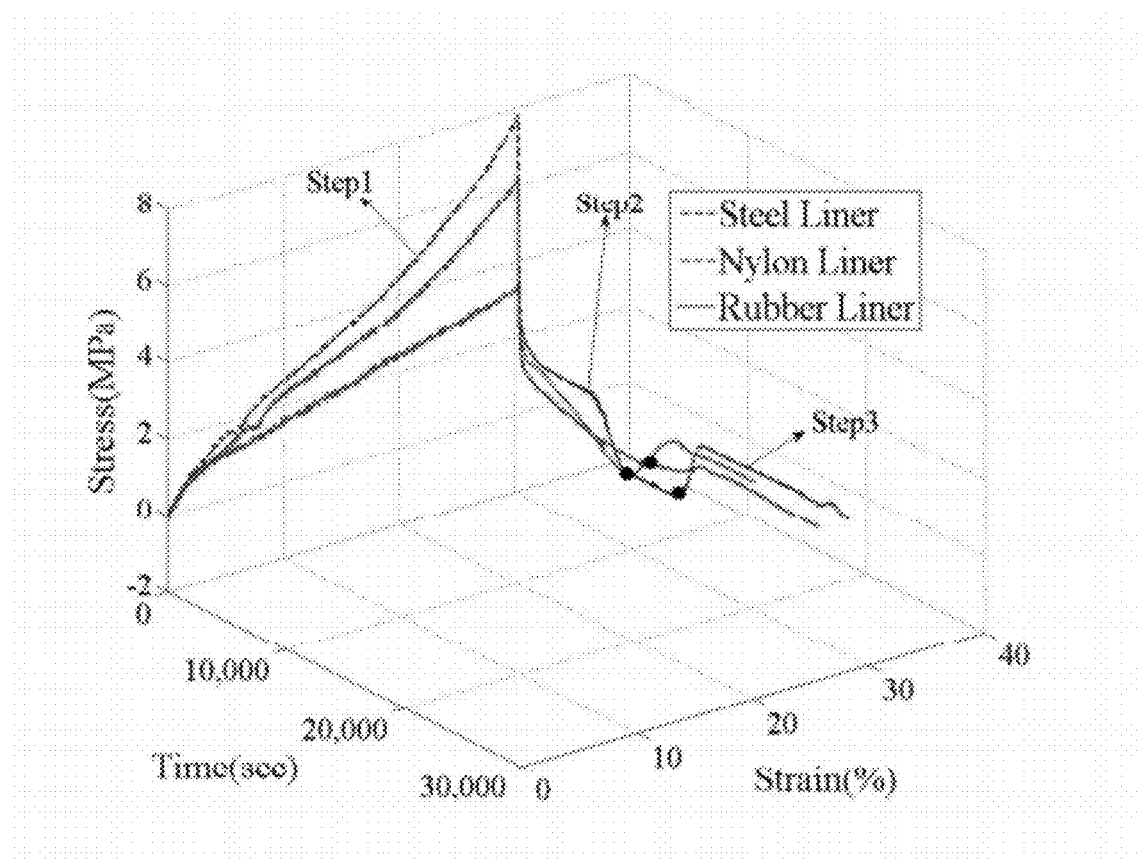
FIG. 5: Axial stress-time-axial strain representation of the thermomechanical cycle of the foam at a programming temperature of 79° C. and prestrain level of 30%. The dots indicate the end of step 2 and start of step 3 (Step 1: prestressing, Step 2: cooling and unloading, and Step 3: stress recovery).

Typical 3-D axial stress-axial strain-time behaviors at programming temperature of 79° C., prestrain level of 30%, and fully confined shape recovery are shown in FIG. 5.

Thermomechanical Behavior

Thermomechanical Cycle in Terms of 2-D Stress-Time and Temperature-Time Behavior FIG. 3 gives one perspective of analyzing the thermomechanical behavior of the SMP based syntactic foam. Here we can observe Step 1 loading, Step 2 cooling and unloading, and Step 3 stress recovery with respect to time. As shown in FIG. 3, the programming stress, which corresponds to the start of temperature drop, is shown with a dot. From FIG. 3, the stress experiences a significant change in Step 1. The stress starts from zero until the programming strain is achieved, which leads to the peak stress. Because the machine needs to be stopped in a very short time period, it leads to an instant drop in the peak stress. As the holding time period proceeds, the stress is further reduced due to stress relaxation. In Step 2, the stress still shows a certain relaxation when the temperature is within the $T_g$ region. When the temperature drops below $T_g$, the specimen further shortens due to thermal contraction, leading to an almost linear curve. There were two competing tendencies in the specimen. One was due to thermal contraction, which shortened the specimen; the other was spring-back due to unloading, which lengthened the specimen. This competition continued until the contraction exceeded the spring-back, which led to the full unloading or separation of the loading rig from the specimen, indicating the end of Step 2 or end of programming.

When the temperature rises, the Step 3 starts. The stress begins to build up, first due to the thermal stress by thermal expansion, followed by the shape recovery effect in the $T_g$ region. In this study, we define the appearance of the peak recovered stress as the end of Step 3. Further holding the specimen at the programming temperature leads to a very small but gradual reduction in the stress, again due to stress relaxation. It is noticed that the development of the recovery stress in Step 3 is delayed as compared to the temperature curve. This is because the temperature shown in FIG. 3 is the "nominal" temperature of the chamber. The temperature within the specimen needs more time to become uniform. Using slower heating rate can minimize the delay. Based on [13], a heating rate of 0.2° C./min may minimize the delay.

Thermomechanical Behavior in Terms of 3-D Stress-Strain-Temperature Curves

During Step 1, it can be visualized from FIG. 4 that the specimen that was confined by the steel liner experienced the maximum stress, followed by nylon liner and rubber liner. This is because of the rigid confinement, intermediate confinement and weak confinement provided by the steel liner, nylon liner, and rubber liner, respectively. Transverse confinement resists the lateral expansion of the foam specimen, leading to lateral compressive stress to the specimen. Of course, the stiffer the lateral confinement, the higher the lateral compressive stress to the specimen, and thus the higher the axial stress needed to achieve the same axial strain.

Similar to FIG. 3, it is seen that around the $T_g$ region of the foam (about 62° C.), the stress experienced relaxation in Step 1 and Step 2 of the programming. This is because strain-controlled programming is a loading mode that is the same as stress relaxation test.

Obviously, as compared to the stress-controlled three-step programming [7], this strain-controlled programming has two steps only. The cooling and unloading steps were integrated into Step 2 in this study. Of course, as long as the temperature at which the load became zero was below the $T_g$, which was the case for all specimens, the shape fixity was still considerable. In Step 3 fully confined shape recovery of the sample took place, leading to stress recovery.

Thermomechanical Behavior in Terms of 3-D Stress-Strain-Time Curves

FIG. 5 shows a typical three-step axial stress-axial strain-time behavior. Once the strain reaches the designed prestrain level, it is maintained constant during the entire thermomechanical cycle. It is seen that the nylon liner confined specimen reaches the end of Step 2 (circle in FIG. 5) earlier than the rubber liner, and the last was the steel liner. Based on the liner stiffness, the steel is the highest, followed by the nylon liner, and the softest is the rubber liner. However, the time required to come to the end of Step 2 does not follow the same order as the stiffness of the liners. This is because the coefficient of thermal expansion (CTE) of the rubber liner is about ten times that of the nylon liner and it is also larger than that of the foam ($1.72 \times 10^{-1}$/° C. [11]). As a result, the rubber liner contracts more than the nylon liner during cooling and always contacts with the foam cylinder, which applies a transverse compressive stress to the specimen, and it thus tends to take a little bit longer time to separate the specimen from the loading rig. The steel liner needs a significant contraction to unload the specimen because the programming stress is very high, resulting in the longest time to complete Step 2. Therefore, the confinement efficiency of the three liners depends not only on their stiffness, but also on their CTE.

Stress Recovery Ratio and Recovered Stress

The constrained stress recovery ratio (defined as the ratio of the recovered stress over the programming stress in FIG. 3) and the recovered stress for each combination of test parameters are summarized in Table 2.

For the programming temperature of 71° C., it is seen that as the prestrain level increases, the confined stress recovery ratio decreases. This is because as prestrain level increases, the programming stress also increases, which may cause more microballoon crushing. Because the crushed microballoons cannot be recovered, it leads to a reduction in stress recovery ratio. As the confinement increases, the stress recovery ratio depends on the prestrain level. At 5% and 30% prestrain, the stress recovery ratio is the highest for rubber liner, followed by steel liner, and the least is for nylon liner. This may be due to the combined effect of programming stress level and the permanent dimension of the specimen at the programming temperature which depends on the stiffness and CTE of the liner. At the prestrain level of 60%, the stress recovery ratio is still the highest for the rubber liner; however it is followed by the nylon liner, instead of the steel liner. This is caused by the unrecovered damage because the steel liner created the largest amount of unrecoverable damage.

Thus, this data indicates that when we provide external confinement during programming, a suitable match of external confinement is advantageous. Too strong a confinement leads to damage, and too weak confinement may not allow for fixing of a temporary shape. For the programming temperature 79° C., the stress recovery ratio is the highest for 30% prestrain, followed by 5% prestrain, and the least is for 60% prestrain. It was interesting that 30% prestrain led to higher stress recovery ratio than that of the 5% prestrain. A reason may be that, at 5% prestrain, the prestress is very small because the specimen is very soft at 79° C. As a result, when the temperature drops, the test specimen is unloaded in a very short time period and at a relatively higher temperature. Therefore, the entropic strain does not have sufficient time to be fixed, leading to smaller stress recovery ratio. For the 60% prestrain, the lower recovery ratio is due to the increased unrecoverable damage or loss of shape memory functionality. For the three liners, the steel liner leads to a slightly higher recovery ratio at 5% and 30% prestrain than the nylon liner and rubber liner. The reason for this may be the larger diameter of the specimens for steel liner immediately before programming at 79° C.; see Table 3. The larger diameter immediately before programming suggests that the foam specimen has a larger volume or less stiffness. Therefore, the programming stress by steel liner is reduced, close to that for nylon and rubber liners. At 60% prestrain, the recovery ratio is the highest for rubber liner, followed by nylon liner, and the least for steel liner. Again, this is related to the amount of unrecoverable damage produced by the three liners.

The recovered stress depends on both stress recovery ratio and the programming stress. For the programming stress, the higher the prestrain level, the higher the programming stress; and the stiffer the liner, the higher the programming stress. However, the stress recovery ratio does not follow such a simple tendency. Therefore, the recovered stress has a more complex relationship with the test parameters. From Table 2, it is seen that the recovered stress increases as the prestrain level increases, regardless of the types of liners and programming temperatures. This is understandable because as the prestrain level increases, the programming stress also increases. For the 60% prestrain level, although the stress recovery ratio is very small for the steel liner, its very large programming stress led to a recovered stress that makes the steel liner maintain the same tendency. It is noted that the recovered stress is the highest with nylon liner, in particular with 60% prestrain level (26 MPa). Again, the data indicate that external confinement is preferred for an SMP to have enhanced crack-closing capability. The modeling described below allows one to identify certain levels of external confinement that may be advantageous. Therefore, it is concluded that the recovered stress ideally has a proper combination of stiffness and CTE of the confining device (the stiffness and coefficient of thermal expansion (CTE) of the nylon liner are between those of the steel liner and rubber liner; see Table 1). Because the recovered stress by the nylon liner is as high as 26 MPa, it is recommended that SMP may be used as actuators if proper 3-D confined programming is conducted. This is not insignificant because SMP has been cited as unable to serve as actuators due to its small recovered stress.

Volume Change by Prestressing

A condition that helps the foam to self-close a crack is to reduce its volume during programming and to provide external confinement during shape recovery; see FIG. 1. Therefore, we investigated the volume change of the foam during programming The following model helps provide guidance on two aspects relevant to close then heal self-healing compositions: (1) how much volume reduction can be obtained; (2) what is a proper level of external confinement during programming. Because it is difficult to directly measure the volume change during programming, we used an analytical model to estimate the volume change. Owing to the strain-controlled programming and strain-controlled shape recovery, the height of the foam cylinder is the same at the start of Step 2 and the end of Step 3 (they are at the same temperature). The foam cylinder might experience a reduction in diameter in Step 2 and an expansion in diameter in Step 3. Assuming that the reduction in diameter in Step 2 (cooling) was reversed by the expansion in diameter in Step 3 (heating), the volume of the foam cylinder at the beginning of Step 2 is the same as that at the end of Step 3. Therefore, we only need to focus on the volume change in Step 1, i.e., the volume of the foam cylinder immediately before Step 1 and the volume at the end of Step 1. The difference between these two numbers is the volume change due to programming.

Figures 6A, 6B, 6C, 6D:
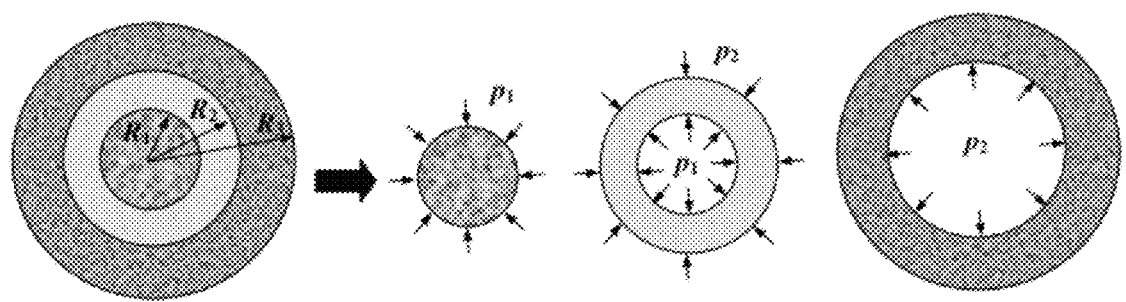
FIG. 6: A schematic of the three-layer model. R1, R2, and R3 are the outer radius of the foam cylinder, liner, and steel confining tube at room temperature, respectively; p1 and p2 are the interfacial pressures to enforce system compatibility. (a) Schematic model (b) Foam cylinder (c) Liner layer (d) Steel confining tube
Figure 7A:
FIG. 7: SEM observation of the original microstructure of the foam ((a)), the effect of programming on changing the microstructure ((b), (d) and (e)), and the effect of shape memory on recovering the microstructure ((c)).
Figure 7B:
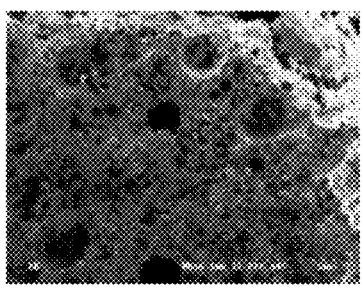
Figure 7C:
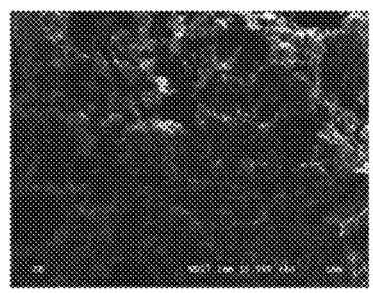
Figure 7D:
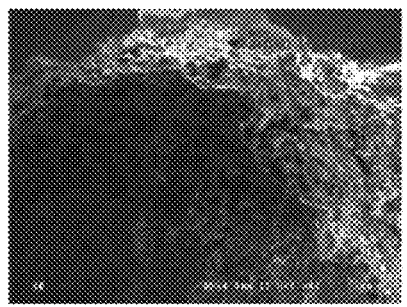
Figure 7E:
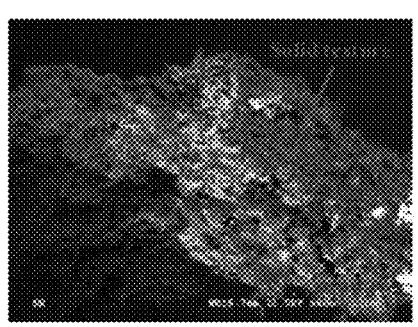

We treated the system as a thick-walled three-layer plane-stress tube (foam, liner, and the outer steel confining tube) and each layer is linearly elastic; see a schematic in FIG. 6. In order to determine the radius of the foam cylinder immediately before programming, we first calculated the radius of each layer under free expansion when the temperature is raised from room temperature (20° C.) to the programming temperature (71° C. or 79° C.), which is equal to $R(1+a\Delta T)$, in which R is the radius at room temperature, a is the CTE, and $\Delta T$ is the temperature rising. Of course, the three layers experience different radius expansion and they lose compatibility at the interfaces. In order to ensure compatibility, they can be forced to match, which produces an interfacial pressure $p_1$ at the foam/liner interface and $p_2$ at the liner/confining steel tube interface; see FIG. 6. Based on a previous study, the radial displacement of a circular plane-stress layer subjected to an inner pressure $p_1$ and outer pressure $p_2$ can be expressed as [12]:

$$u_r = \frac{1}{E}\left[-(1+v)\frac{r_1^2 r_2^2 (p_2-p_1)}{r_2^2 - r_1^2}\frac{1}{r} + (1-v)\frac{r_1^2 p_1 - r_2^2 p_2}{r_2^2 - r_1^2}r\right] \quad (1)$$

where $u_r$ is the radial displacement at radius r; E, v, $r_1$, and $r_2$ are the Young's modulus, Poisson's ratio, inner radius, and outer radius of the layer, respectively.

The interfacial compatibility requires that the outer radius of the foam cylinder be equal to the inner radius of the liner, and the outer radius of the liner be equal to the inner radius of the steel confining tube:

$$\begin{cases} a + u_{rf}(r=a) = b + u_{rl}(r=b) \\ c + u_{rl}(r=c) = d + u_{rs}(r=d) \end{cases} \quad (2)$$

where subscripts f, l, and s represent the foam, the liner, and the outer steel confining tube, respectively; $a=R_1(1+\alpha_1\Delta T)$, $b=R_1(1+\alpha_2\Delta T)$, $c=R_2(1+\alpha_2\Delta T)$, and $d=R_2(1+\alpha_3\Delta T)$, respectively; $R_1$=6.35 mm and $R_2$=12.7 mm are the outer radius of the foam cylinder and the outer radius of the liner at room temperature, respectively; and $\alpha_1$, $\alpha_2$, and $\alpha_3$ are the CTEs of the foam, the liner, and the outer confining tube, respectively. $\alpha_2$ and $\alpha_3$ have been given in Table 1; for the foam, $\alpha_1=1.72\times10^{-4}/°$ C. per [11]. $\Delta T$ is the difference between the programming temperature and room temperature. In this study, room temperature was 20° C. Therefore, $\Delta T=51°$ C. when the programming temperature was 71° C. and $\Delta T=59°$ C. when the programming temperature was 79° C.

Combining Eq. (1) and Eq. (2) and solving the simultaneous equations, the interfacial pressure $p_1$ and $p_2$ can be found. Once they are found, the radius of the foam cylinder immediately before programming is [12]:

$$a_1 = a\left(1 - \frac{1-v_f}{E_f}p_1\right) \quad (3)$$

where $E_f$ and $v_f$ are the Young's modulus and Poisson's ratio of the foam at the programming temperature.

In Step 1 of the programming, the volume of the foam cylinder is reduced by the applied stress. Again, we use two stages to find the radius of the foam cylinder at the end of Step 1. First we assume that the foam is uniaxially compressed without lateral confinement and that the volume of the foam is constant under this 1-D compressive stress. This suggests that $\pi a_1^2 h = \pi a_2^2 (1-\epsilon) h$, where h is the original height of the foam cylinder at the programming temperature before applying the load, and $\epsilon$ is the prestrain (5%, 30%, and 60% in this study). Therefore, we can find the radius of the foam cylinder immediately after compression to be:

$$a_2 = a_1 \sqrt{\frac{1}{1-\epsilon}} \quad (4)$$

where $a_2$ is the radius of the foam at the end of the 1-D uniaxial compression programming. In this study, the foam is laterally confined. Therefore, $a_2$ will cause mismatch at the foam/liner interface. Similar to Eq. (2), in order to force the compatibility, an interfacial pressure $p_3$ at the foam/liner interface and $p_4$ at the liner/confining steel tube interface are produced and the compatibility requirement (the outer radius of the foam cylinder is equal to the inner radius of the liner and the outer radius of the liner is equal to the inner radius of the steel confining tube) becomes:

$$\begin{cases} a_2 + u_{rf}(r=a_2) = b_1 + u_{rl}(r=b_1) \\ c_1 + u_{rl}(r=c_1) = d_1 + u_{rs}(r=d_1) \end{cases} \quad (5)$$

where $b_1 = b + u_{rl}(r=b)$, $c_1 = c + u_{rl}(r=c)$, and $d_1 = d + u_{rs}(r=d)$ are respectively the inner radius and outer radius of the liner, and the inner radius of the steel confining tube at the programming temperature before prestressing.

Combining Eq. (1) and Eq. (5), $p_3$ and $p_4$ can be found. The radius of the foam cylinder at the end of Step 1 is [12]:

$$a_3 = a_2 \left(1 - \frac{1-v_{fp}}{E_{fp}} p_3 \right) \quad (6)$$

where $a_3$ is the radius of the foam cylinder at the end of Step 1; $E_{fp}$, and $v_{fp}$ are the Young's modulus and Poisson's ratio of the foam corresponding to the programming stress at the programming temperature.

The percentage volume change of the foam cylinder in Step 1 is thus:

$$\Delta V = \frac{\pi a_1^2 h - \pi a_3^2 (1-\epsilon) h}{\pi a_1^2 h} \times 100\% = \frac{a_1^2 - a_3^2(1-\epsilon)}{a_1^2} \times 100\% \quad (7)$$

where $\Delta V$ is the volume reduction.

The parameters for the liner layer and the confining steel layer are given in Table 1. For the foam, $\alpha_1 = 1.72 \times 10^{-4}/°C$ per [11]. $E_f$ can be determined by the slope of the initial linear portion of the stress-strain curve in Step 1 for each test combination at the programming temperature. $E_{fp}$ is the slope of the stress-strain curve at the programming stress in Step 1. $v_f$ can be assumed to be 0.5 because the foam is assumed to be rubbery at the programming temperature at a low stress level. $v_{fp}$ can be estimated by the rule-of-mixtures method. Assuming the Poisson's ratio of the SMP matrix is 0.5 (rubbery) and the Poisson's ratio of the glass microballoon is 0.2 [14], and neglecting the trace amount of carbon nanotubes, the Poisson's ratio of the foam corresponding to the programming stress (at the end of Step 1 in FIG. 5) is 0.5×59.85%+0.2×40%=0.38.

The $a_1$, $a_3$, and volume change $\Delta V$ of the foam cylinder at both programming temperatures and under a prestrain level of 60% are given in Table 3. Obviously, the volume reduction is higher by the steel liner than that by the nylon liner, and the least by the rubber liner. This is due to the dominating effect of the stiffness of the liner during prestressing in Step 1. The higher stiffness of the steel liner more efficiently resists the lateral expansion of the foam cylinder at the programming stress. At the programming temperature of 79° C., the volume reduction increases, regardless of the types of liners. As compared to the radius of the foam cylinder at room temperature (6.35 mm), the $a_1$ increases for the steel liner confined specimen but reduces for the nylon liner and rubber liner confined counterparts. This is as a result of the difference between the CTE and stiffness of these liners. For the $a_3$, it decreases as the programming temperature increases for each liner, possibly due to lower pressure ($p_3$) produced at the foam/liner interface at the higher temperature. Also, $a_3$ is always greater than $a_1$, regardless of the liner type and programming temperature, suggesting that the shape of the foam cylinder is "shorter" and "fatter" after prestressing and tends to become "taller" and "skinner" when recovers.

As given previously, the maximum allowable volume reduction by the pure SMP is 17.0%. Based on the average outer diameter of 85 μm and wall thickness of 0.8 μm, the porosity of the microballoons is $(85 \mu m - 2 \times 0.8 \mu m)^3/(85 \mu m)^3 = 94.5\%$. Based on the volume fraction and density of each constituent in the foam (microballoon: 40% and 0.14 g/cm³, carbon nanotubes: 0.15% and 2.1 g/cm³, and SMP: 59.85% and 0.93 g/cm³), it is found that the theoretical density of the foam is 0.63 g/cm³ by the rule-of-mixtures method. The actual density of the foam per ASTM D 792-00 is 0.59 g/cm³. Therefore, additional porosity introduced into the foam due to air bubbles by mixing is found to be (0.63−0.59)/0.63=6.34%. Hence, using the rule-of-mixtures method, the theoretical maximum volume reduction without damaging the polymer chains is 0.5985×17.00%+0.40× 94.50%+6.34%=54.34%. From Table 3, the volume reduction by the steel liner is 3.83% (at 71° C.) and 4.76% (at 79° C.) greater than this upper bound (54.34%). Therefore, it is believed that the shape memory functionality of the SMP had been damaged, and thus the corresponding stress recovery ratio is very small for the steel liner at 60% prestrain; see Table 2. At the same prestrain and same programming temperature, the volume reduction of the foam cylinder confined by the nylon liner is 1.85% (at 71° C.) and 0.60% (at 79° C.) lower than this upper bound (54.34%). Therefore, the specimen confined by the nylon liner still has a certain stress recovery ratio. For the rubber liner, its volume reduction is 8.59% (at 71° C.) and 7.65% (at 79° C.) lower than the upper bound. Consequently, the specimen confined by the rubber liner still has a considerable stress recovery ratio at 60% prestrain level; see Table 2. Therefore, the volume reduction during programming must be within a certain limit; otherwise, the polymer will lose its shape memory functionality.

It is noted that during shape recovery, the foam cylinder reduced its radius (from $a_3$ to $a_1$). Because there was no chemical bond between the foam and the liner, it is believed that the liner did not provide resistance to the thinning of the foam cylinder during the shape recovery. In other words, the specimen would recover the same stress without the liner. This suggests that, after 3-D confined programming, the foam can be used as 1-D actuators by using the stress recovery in the height direction without the confinement.

SEM Observation

Hitachi S-3600N VP-Scanning Electron Microscope was used to examine the microstructure change due to programming by different prestrain levels and free-shape recovery. The programming temperature and shape recovery temperature of the samples are 79° C. with steel liner. Comparing FIGS. 7 (a) and (b), it is seen that the programming by 5% prestrain slightly increased the density of the foam, without damage of the microballoons. Comparing FIGS. 7 (a) and (c), it is seen that the microstructure is fully recovered by free recovery, suggesting good shape memory functionality of the foam. Comparing FIG. 7 (b) with FIG. 7 (d), it is seen that densification of the foam occurs with microballoon crushing by the higher prestrain level of 30%. At 60% prestrain level, FIG. 7 (e), it is seen that the foam is solidified, with full crushing of all microballoons. This supports the findings in the stress recovery test and volume change calculations. The 60% prestrain led to significant damage and considerable loss of the shape memory functionality.

Example 2

A Biomimetic Shape Memory Polymer Based Self-Healing Particulate Composite

In this Example, a two-step self-healing approach (close-then-heal (CTH)) that mimics wound repair of human skin was set forth that will heal structural-length damage of thermoset polymers [also see, e.g., Li and Uppu. *Composites Science and Technology* 2010; 70: [1419-1427] The present example provides data on a composite of thermoplastic particles (Copolyester) dispersed in a thermosetting shape memory polymer matrix (Veriflex Polystyrene). In this particulate composite, the confined shape recovery of the thermosetting shape memory matrix was utilized for sealing (closing) cracks and the thermoplastic particles are used for molecular-length scale fusion/ healing.

In one embodiment, 6% by volume of thermoplastic particles was used. Beam specimens were prepared and programmed by compression in the longitudinal direction with 6.7% of prestrain.

Structural-length scale damage was then created by producing a notch in the programmed beam specimens per ASTM D 5043. The notched beam specimens were then tested to fracture.

The fractured specimens were healed per the close-then-heal mechanism and tested again to fracture. This fracture-healing test was implemented for 5 cycles.

The healing efficiency was evaluated per the peak bending load. SEM was used to examine healed cracks at micro-length scale while EDS was used to evaluate molecular-length scale healing. It is found that over 65% of the peak bending load can be repeatedly recovered and the structural-length scale damage (notch) is healed at molecular-length scale.

TABLE 1

Material properties of the confining tubes

| Materials | Coefficient of thermal expansion (/° C.) | Young's modulus (GPa) | Poisson's ratio |
|---|---|---|---|
| Medium carbon steel | $1.08 \times 10^{-5}$ | 210.0 | 0.2 |
| Nylon | $8.20 \times 10^{-5}$ | 3.6 | 0.35 |
| Rubber | $6.90 \times 10^{-4}$ | 0.05 | 0.50 |

TABLE 2

Stress recovery ratio and recovered stress

| Liner type | Prestrain level (%) | Programming temperature 71° C. | | Programming temperature 79° C. | |
|---|---|---|---|---|---|
| | | Stress recovery ratio (%) | Recovered stress (MPa) | Stress recovery ratio (%) | Recovered stress (MPa) |
| Steel | 5 | 84.32 ± 10.18 | 0.37 ± 0.15 | 58.26 ± 2.1 | 0.53 ± 0.01 |
| | 30 | 62.97 ± 11.22 | 2.01 ± 0.34 | 83.45 ± 3.57 | 1.75 ± 0.29 |
| | 60 | 0.48 ± 0.12 | 3.52 ± 1.29 | 1.05 ± 0.14 | 6.33 ± 1.35 |
| Nylon | 5 | 71.17 ± 8.74 | 0.17 ± 0.05 | 55.5 ± 12.94 | 0.28 ± 0.08 |
| | 30 | 58.17 ± 7.40 | 1.75 ± 0.72 | 70.45 ± 5.2 | 1.31 ± 0.15 |
| | 60 | 46.74 ± 1.73 | 26.57 ± 7.27 | 48.19 ± 13.1 | 17.52 ± 1.36 |
| Rubber | 5 | 87.42 ± 2.50 | 0.43 ± 0.15 | 55.55 ± 2.78 | 0.34 ± 0.03 |
| | 30 | 76.75 ± 3.89 | 1.04 ± 0.09 | 73.96 ± 2.54 | 1.20 ± 0.08 |
| | 60 | 71.53 ± 0.45 | 4.50 ± 0.35 | 56.9 ± 5.64 | 1.74 ± 0.24 |

TABLE 3

Foam cylinder radius $a_1$, $a_3$ and volume reduction $\Delta V$ at prestrain level of 60%

| Liner | Programming temperature (71° C.) | | | Programming temperature (79° C.) | | |
|---|---|---|---|---|---|---|
| | Radius of foam cylinder immediately before Step 1 $a_1$ (mm) | Radius of foam cylinder immediately after Step 1 $a_3$ (mm) | Volume reduction $\Delta V$ (%) | Radius of foam cylinder immediately before Step 1 $a_1$ (mm) | Radius of foam cylinder immediately after Step 1 $a_3$ (mm) | Volume reduction $\Delta V$ (%) |
| Rubber | 6.3397 | 7.3832 | 45.75 | 6.2663 | 7.2341 | 46.69 |
| Nylon | 6.3340 | 6.9029 | 52.49 | 6.3293 | 6.8068 | 53.74 |
| Steel | 6.3535 | 6.4971 | 58.17 | 6.3541 | 6.4249 | 59.10 |

Accordingly, this example sets forth a thermosetting SMP-based particulate composite comprising dispersed thermoplastic particles in the SMP matrix in order to realize the CTH self-healing.

Differential scanning calorimetry (DSC) was performed to determine the compatibility between the thermoplastic particle and the SMP matrix. Without being bound by theory, it is believed that a successful thermoset SMP CTH process involves several parameters: (1) the level of volume reduction during shape recovery (prestrain level and external confinement level); (2) the confinement level during shape recovery; (3) the recovery temperature; (4) the content of the thermoplastic particles; (5) a suitable mid-range chemical compatibility between the SMP matrix and the thermoplastic particles; (6) the viscosity and healing temperature of the thermoplastic particles; (7) the diffusion speed under the recovery stress and the time hold for diffusion. Each of these parameters can be varied to alter the outcome of a CTH process.

Dynamic mechanical analysis (DMA) was also performed in order to determine the glass transition temperature and viscoelastic properties of the composite. The composite was subjected to a thermo-mechanical cycle (programming, confined recovery, and free recovery) in order to determine its shape fixing and shape recovery ability. Single edge notched bend (SENB) specimens were prepared per ASTM D 5045 standard to create structural-length damage and tested in three-point bending to fracture. Healing efficiency was assessed by comparing the peak bending load of the healed specimens to that of the original un-notched and undamaged specimens. Healing efficiency was determined for up to five fracture and healing cycles. Scanning electron microscopy (SEM) was used to examine the healed cracks, while energy dispersive spectroscopy (EDS) was used to understand molecular length-scale activity during the healing process.

Accordingly, in the present example, a CP-PSMP composite was developed by dispersing 6% by volume of copolyester particles in a polystyrene shape memory polymer matrix in order to realize and validate a novel biomimetic two-step close-then-heal (CTH) self-healing mechanism for healing structural-length scale damage. Based on the test results, it was found that:

(1) Healing efficiency was 65% and was repeatable.

(2) The two-step CTH process led to molecular-length scale self-healing as evidenced by the EDS test results.

(3) The two-step self-healing was achieved by holding the temperature at 150° C. for 20 minutes. As compared with other self-healing schemes which need hours or days to heal, the present self-healing is much more time efficient.

(4) Because the notched specimens were fractured completely, the two-step self-healing approach utilized in this example is able to heal structural-length scale damage.

Raw Materials and Fabrication Method

The materials used in this example included: Vertex polystyrene shape memory polymer (PSMP) from Corner Stone Research Group Inc. (glass transition temperature determined by DMA [225]: 67.71° C., tensile strength: 23 MPa, and modulus of elasticity: 1.24 GPa at room temperature as provided by the manufacturer); and a thermoplastic polymer identified as copolyester (CP) from Abifor Inc., Switzerland (particle size: ≤80 μm, density: 1.3 g/cm$^3$, glass transition temperature determined by DSC: 17° C. and 70° C., melting range: 114-124° C. and healing temperature range: 125-150° C.).

The Veriflex® PSMP is a two-part resin system. Part A is composed of Styrene, Divinyl benzene and Vinyl neodecanoate. Part B is composed of Benzoyl peroxide. The thermoplastic Copolyester is composed of Isophthalic acid, Terephthalic acid and Butane-1,4-diol.

Differential Scanning Calorimetry (DSC)

Differential scanning calorimetry (TA Instruments, Q100) test was performed in order to investigate the compatibility between the PSMP and CP. The glass transition temperatures of the pure PSMP, pure CP, and their CP-PSMP composite were investigated. The sample size was 6.5 mg and the test was conducted from 0° C. to 130° C. at a ramping rate of 5° C./min. Three effective specimens were tested to obtain an average glass transition temperature value.

Fabrication Method

To produce the composite, shape memory resin was preheated for two hours at 75° C. just before the thickening and curing process began. This was done in order to prevent the denser CP (copolyester) particles from settling to the bottom of the resin. After that, CP particles (6% by volume) were dispersed in a beaker containing the pre-heated resin. The mixture was mixed to uniformity and poured in a steel mold with dimensions of 300 mm×300 mm×12.5 mm. The mold was sealed and the material was cured in an oven as follows: 75° C. for 12 hours, 90° C. for 3 hours and 112° C. for 3 hours. Once the curing procedure was complete, the setup was cooled down and de-molded to obtain the copolyester modified polystyrene shape memory polymer (CP-PSMP) composite.

Dynamic Mechanical Analysis (DMA)

Dynamic mechanical analysis was performed (Rheometic Scientific RSA III) at a frequency of 1 Hz on CP-PSMP specimens in order to determine the glass transition temperature. Rectangular tension specimens with dimensions of 36 mm×11.5 mm×2 mm were used. The temperature was increased at a rate of 5° C./min.

Thermomechanical Behavior

Compression thermomechanical behavior (programming and recovery) of the composite was investigated on composite specimens with dimensions of 25 mm×25 mm×12.5 mm using a MTS QTEST 150 testing machine equipped with a heating furnace (ATS heating chamber) in order to evaluate the effect of CP particles on the shape memory functionality of the CP-PSMP composite.

Figure 8:
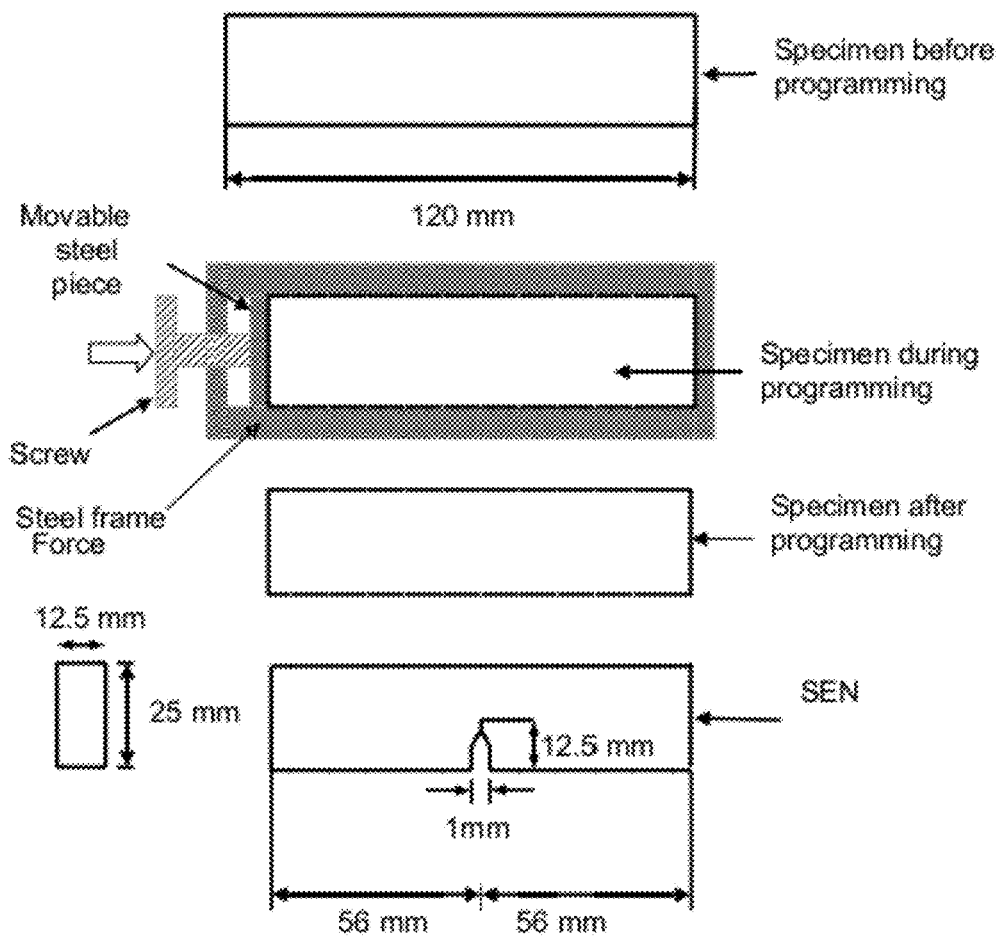
FIG. 8: Schematic of the specimen preparation, programming, and notching process.

Beam Specimen Preparation, Programming, and Structural-Length Scale Damage Creation Beam specimens with dimensions of 120 mm×25 mm×12.5 mm were fabricated by machining the cured composite slab and programmed in compression to 6.7% pre-strain in the length direction in an adjustable metal frame on a CARVER Model 2697 compression molding fixture. FIG. 8 is a schematic depiction of the specimen preparation, programming, and notching process. After programming, single edge notched bend (SENB) specimens were fabricated per ASTM D 5045 standard as shown in FIG. 8. The purpose of using SENB specimens was to artificially create structural-length scale damage.

Three-Point Bending Test

Three-point bending tests were performed on a universal MTS 810 testing system with a span length of 100 mm and at a loading rate of 10 mm/min per ASTM D 5045 standard to determine the load carrying capacity and fracture toughness of the composite using the SENB specimens. The specimens were tested and fractured completely into two halves.

Close (Seal)-then-Heal Self-Healing

Figure 9:
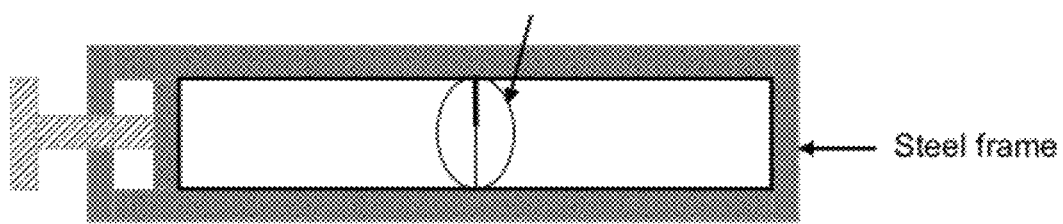
FIG. 9: Schematic of a fractured specimen in a steel frame ready for two-step healing

Following the two-step self-healing approach of the present invention (also see, Li and Uppu [226]), fractured specimens were placed in the adjustable rectangular steel frame as shown in FIG. 9 at room temperature. Once the specimen was fitted into the frame, the frame was placed on the compression molding fixture which was preheated to 150° C. It is noted that the steel frame provided confinement in the length and width directions during heating (in-plane confinement). The top surface of the framed specimen was close to the top heating plate but not in direct contact. This facilitated uniform heating to the specimen without applying confinement in the thickness direction. Therefore, only 2-D in-plane confinement was used during healing. The specimens were kept within the preheated fixture for 20 minutes. During this time period, the temperature within the specimen was gradually increased, first passed the $T_g$ of the PSMP, which caused shape recovery or closing of the fractured surface and the pre-notch, and then caused melting of the CP, and finally came to the healing temperature of the CP (between 125° C. and 150° C.) so that the CP molecules diffused and bonded with the PSMP molecules.

After 20 minutes, the heating plates were turned off and cooled to room temperature. This completed the two-step self-healing scheme. Subsequent healing after fracture was done in a similar manner.

Certain aspects of the invention are indicated by this data: 1) Desired compatibility of the particles and the matrix is indicted to be "in the middle ground" or "partial," as specified/indicated e.g., in the DMA test. 2) Healing temperature data indicated the desirability of heating up to the healing temperature, which is above the melting temperature. This is the first disclosure of this issue. Previously the art has addressed heating to a "melting" temperature. As set forth herein, if one just heats to the melting temperature, ideal healing does not appear to occur. Heating to the healing temperature is very desirable, and is preferred in practicing the invention. In preferred embodiments, the healing temperature of the thermoplastic component should be approximately 20-50° C. lower than the decomposition temperature of the SMP matrix.

SEM Observation

SEM observation was conducted (Hitachi S-3600N scanning electron microscope) in order to (1) verify that the copolyester particles melted during the healing process and (2) visually verify the crack closing by examining a cracked specimen before healing and after healing.

EDS Analysis

In order to verify molecular-length scale healing, energy dispersive spectroscopy (EDS, 15 kV, super ultra-thin window (SUTW)-Sapphire detector, AMPT: 25.6) analysis was conducted using a Hitachi 3600 N scanning electron microscope equipped with an EDAX genesis detector.

The rationale was that if the CP molecules diffused into the PSMP matrix, the chemical composition near the interface will show a certain gradient. In this example, a specially prepared EDS specimen was used. To prepare the EDS specimen, a SENB specimen made of pure PSMP was fractured and a very thin layer of copolyester was placed between the fractured surfaces. Next, the EDS specimen was healed as described above in this example. EDS analysis was conducted at and around the healed interface of the EDS specimen.

Results

DSC Test Results

In order to investigate the compatibility of the two polymers (PSMP and CP) within the composite, an approach to looking at the single glass transition criterion [233] was adopted. Based on this approach, PSMP and CP are compatible if the composite shows a single glass transition temperature which is between the glass transition temperatures of the pure PSMP and CP.

Figure 10:
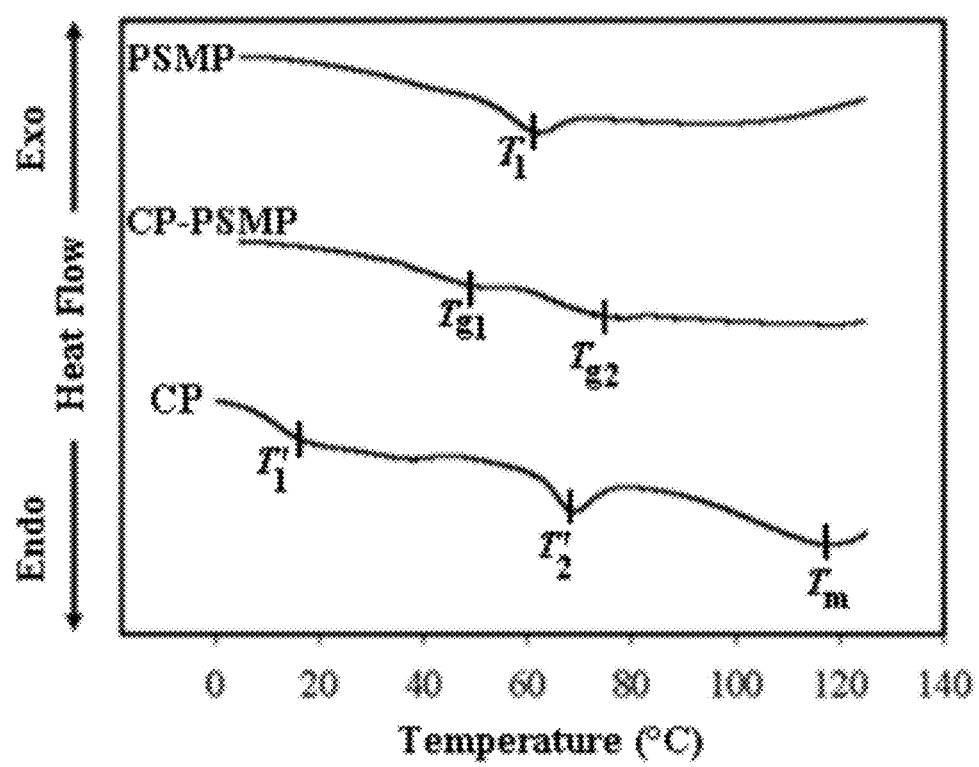
FIG. 10: Typical DSC thermograms of CP, SMP and CP-PSMP

FIG. 10 shows the DSC thermograms of PSMP, CP and CP-PSMP. The PSMP shows a single glass transition temperature ($T_1$=62° C.). The CP, on the other hand, shows two glass transition temperatures ($T_1$'=17° C. and $T_2$'=70° C.) and a melting temperature $T_m$ (118° C.), which is within the melting range of the CP (114-124° C. provided by the manufacturer). The CP used in this example is a copolymer as provided by the manufacturer. Between $T_1$ and $T_1$', a single glass transition temperature $T_{gi}$ (50° C.) is observed for the CP-PSMP composite. This indicates some degree of compatibility between the PSMP and one component of the CP copolymer. The CP-PSMP composite also shows a second glass transition temperature $T_{g2}$=72° C. This is understood to be an indication of the effect of the other component of the CP copolymer. Because the PSMP does not have the corresponding second glass transition temperature, the PSMP does not have compatibility with the second component of the CP copolymer. For thermoplastic copolymers, it is preferred that at least one component should be compatible with the SMP matrix. Therefore, it is concluded that the PSMP and CP had a partial compatibility. However, as will be shown in the DMA test results, the concentration of the second component in the CP copolymer may be very small. Therefore, the PSMP has a certain compatibility with the major component of the CP copolymer.

DMA Test Results

Figure 11:
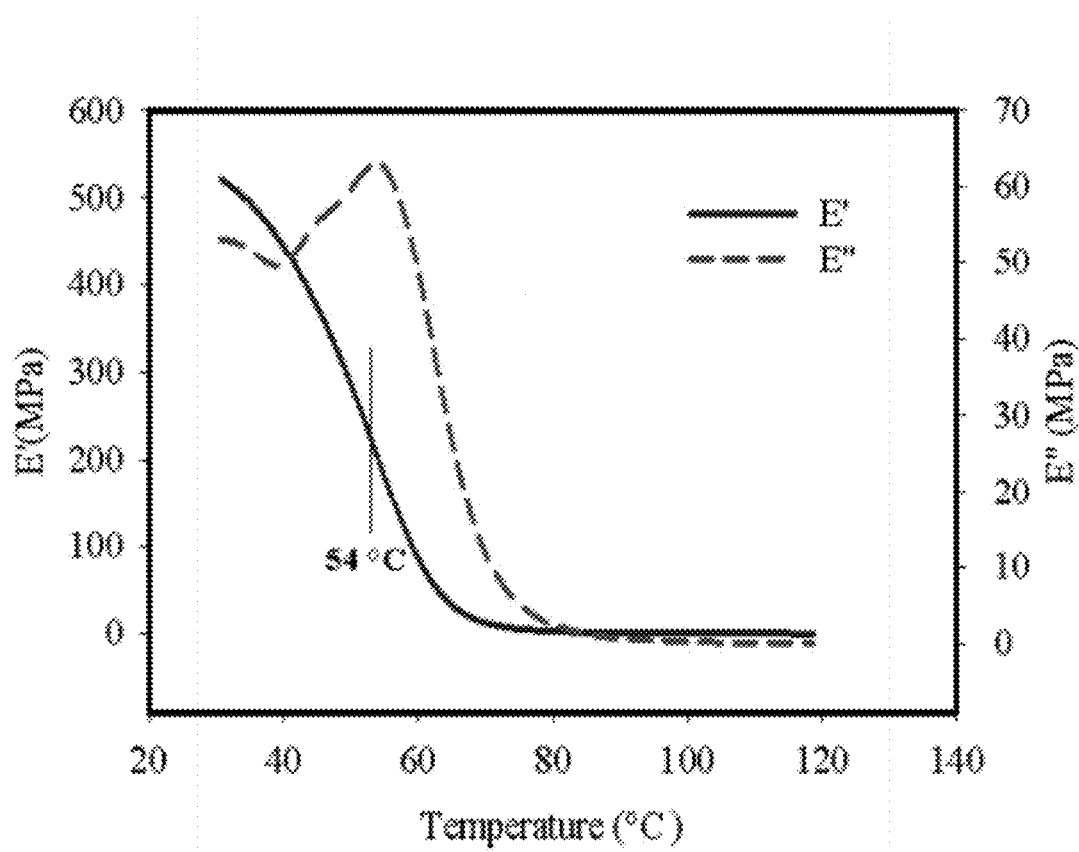
FIG. 11: Storage modulus/loss modulus—temperature plots of CP-PSMP composite

FIG. 11 shows typical storage modulus (E')/loss modulus (E")—temperature plots of the CP-PSMP composite. By taking the $T_g$ as the temperature corresponding to the peak of the loss modulus, it is found that the CP-PSMP composite shows a single $T_g$ at 54'C. No other transition is observed above 54'C, indicating that the component causing $T_{g2}$ (72° C.) that is observed through the DSC test, which is an indication of the existence of the second component in the CP copolymer, may only have a small concentration. In other words, the major component of the CP copolymer has a certain compatibility with the PSMP. It is noted that the $T_g$ (54° C.) from the DMA test is 4° C. higher than $T_{gi}$ (50° C.) from the DSC test. A similar trend was reported in [225]. Based on the $T_g$ (54° C.), the programming temperature was taken as 80° C., which was well above the $T_g$.

Thermomechanical Behavior

Figure 12:
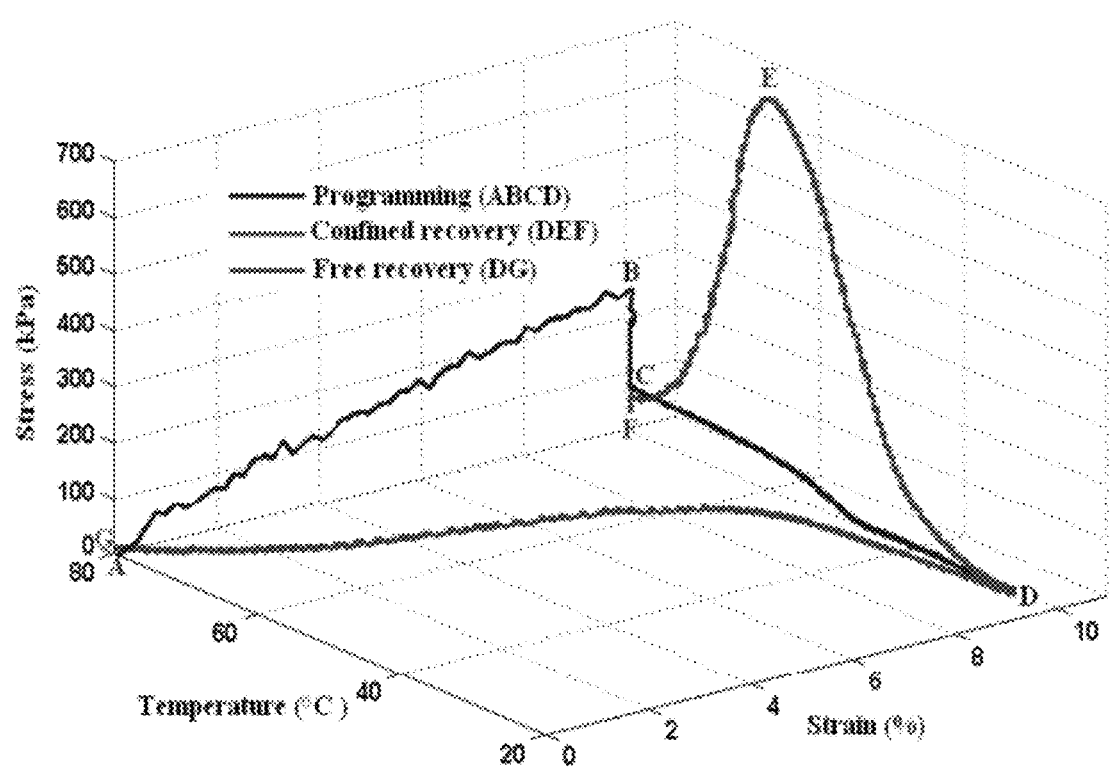
FIG. 12: A typical strain-temperature-stress plot with graphs showing the behavior of CP-PSMP during programming (ABCD), confined recovery (DEF) and free recovery (DG).

FIG. 12 shows a typical 3-D plot of stress, strain, and temperature for this composite (CP-PSMP) with graphs of the programming (ABCD), 1-D confined recovery (DEF) and free recovery (DG) processes. Specimens were heated to 80° C. (at point A), compressed (strain controlled mode) in the thickness direction to 10% pre-strain level (point B, loading rate: 1.3 mm/min), held at 80° C. for one hour to stabilize the stress (point C) and cooled down to room temperature (CD). While confined in the thickness direction, the specimens were heated back to 80° C. at an average rate of 0.5° C./min in order to determine the recovery stress of the composite (DEF). The specimens were held at 80° C. for one hour to stabilize the stress (point F). Free-shape recovery was also conducted. Programmed specimens were re-heated to 80° C. (0.18° C./min) in an oven without applying any stress to determine the free shape recovery ability of the composite by measuring displacement in the thickness direction with change in temperature (DG). A linear variable differential transducer (Cooper Instruments LDT 200 series LVDT) was used to measure the displacement while the temperature was measured and recorded with a thermocouple instrument (Yokogawa Model DC-100). The average programming stress (at point C) was found to be (74±2 kPa) while the average recovery stress (point F) was (45±1 kPa). The shape fixity from the programming curve was found to be 98% while the shape recovery based on the free shape recovery test was 98%, indicating good shape memory functionality of the composite.

Figure 13A:
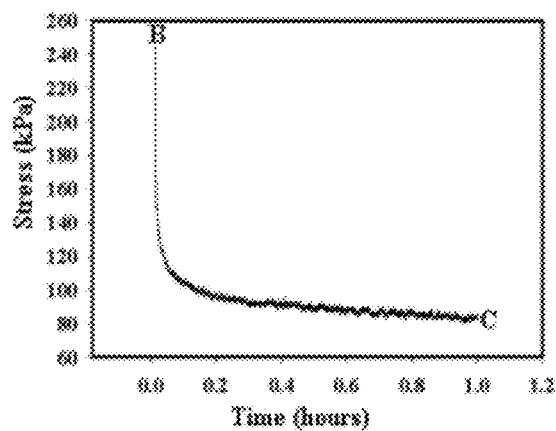
FIG. 13: (a) variation of programming stress with time at 80° C., (b) variation of confined recovery stress with time and (c) variation of free-recovery strain with time.
Figure 13B:
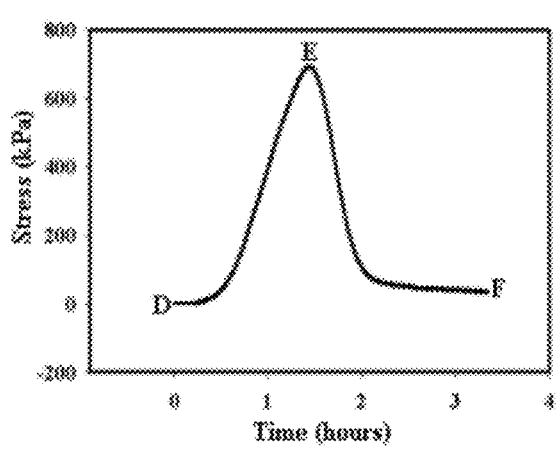
Figure 13C:
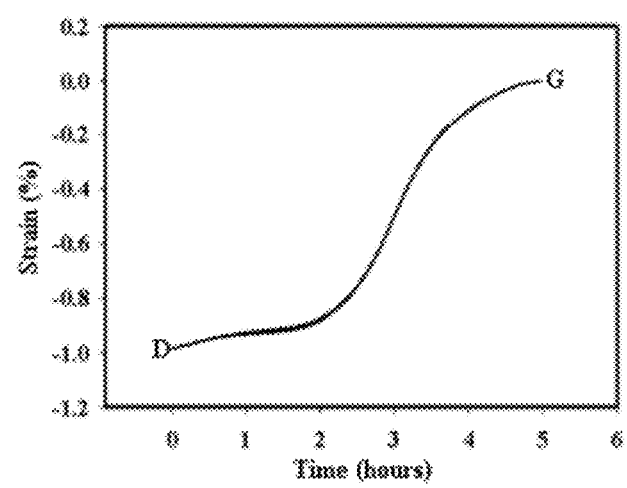

Two dimensional (2-D) plots showing (a) the variation of programming stress with time at 80° C. (BC), (b) the variation of confined recovery stress with time (DEF), and (c) the variation of strain with time during free recovery (DG), are presented in FIG. 13.

Three-Point Bending Test Results

Figure 14A:
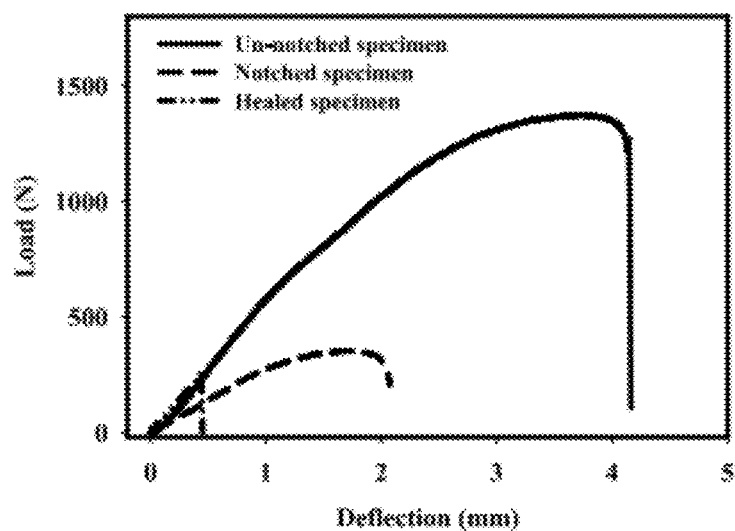
FIG. 14: Typical load-deflection curves of original and healed specimens after the first healing cycle; (a) PSMP, (b) CP-PSMP.
Figure 14B:
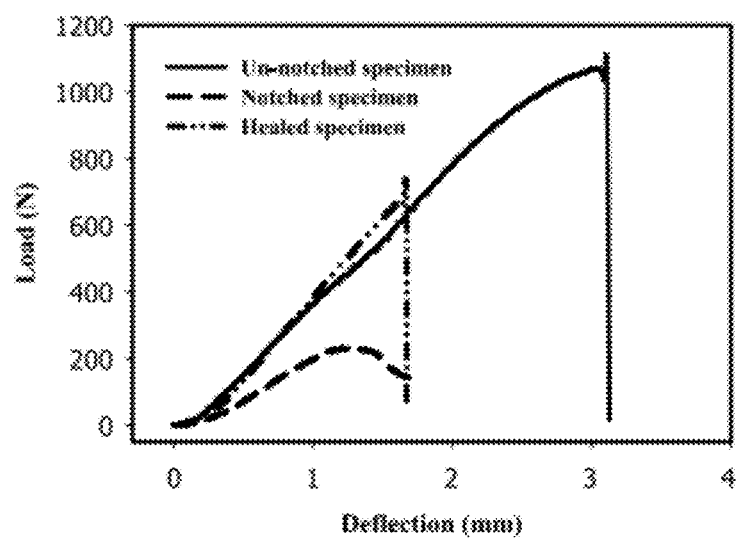

FIG. 14 (a) shows typical load-deflection plots of the original, notched, and healed pure PSMP specimens while (b) shows typical load-deflection plots of the original, notched, and healed CP-PSMP composite specimens after the first fracture-healing cycle.

The peak loads (average of three specimens) of the originally un-notched PSMP and CP-PSMP specimens were 1385±4 N and 1060±3 N respectively. The maximum loads (average of three specimens) of the notched PSMP and notched CP-PSMP specimens were (358±2 N) and (230±2 N) respectively. This indicates that the structural-length scale damage (notch) has significantly reduced the load carrying capacity of both the pure PSMP and the CP-PSMP composite. The maximum loads of the healed PSMP and CP-PSMP specimens were (250±3 N) and (693±3N) respectively.

Several relevant findings were noted:

(1) Using crack sealing by confined shape recovery only (step 1), i.e., "closing" in the CTH nomenclature, in the pure PSMP, the peak bending load of the resulting specimen is lower than the peak bending load of the notched specimen, indicating that the precrack (notch) and newly created crack (complete fracture of the notched beam during bending test) could not be healed by this step alone as shown in FIG. 14 (a). The reason is that the shape recovery can only narrow or close the crack, but not heal it at molecular-length scale. Therefore, under bending load, a very low healing efficiency is obtained. It is to be noted that in previous studies when confined shape recovery was found to recover the lost structural capacity [228, 229] that this healing efficiency was evaluated in terms of compressive strength, which is not very sensitive to the existence of cracks.

(2) With the two-step CTH healing, as shown in FIG. 14 (b), about 65% of the peak bending load was recovered. As compared to the notched specimen, the increase in the peak bending load in the healed specimen is about 200%. It is believed that by changing either the concentration of the thermoplastic particles or the pre-strain level during programming, the healing efficiency could be modulated. Alternative thermoplastic particle concentrations are assessed in Example 3.

Figure 15:
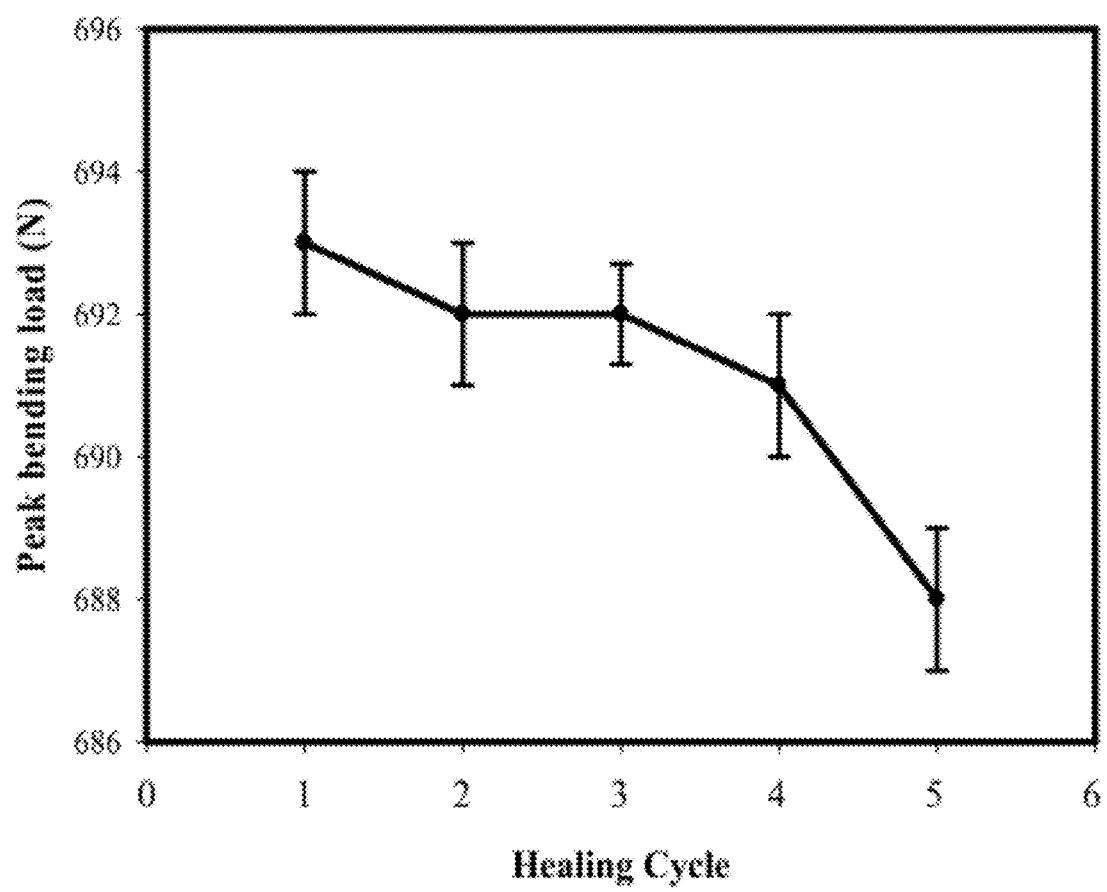
FIG. 15: Variation of effective maximum load with healing cycle.

FIG. 15 shows typical plots of the peak bending load with fracture/healing cycles for the CP-PSMP composite. From FIG. 15, it can be seen that for five fracture/healing cycles, the proposed healing mechanism as tested through CP-PSMP specimens is meaningfully repeatable.

SEM Observation

Figure 16A:
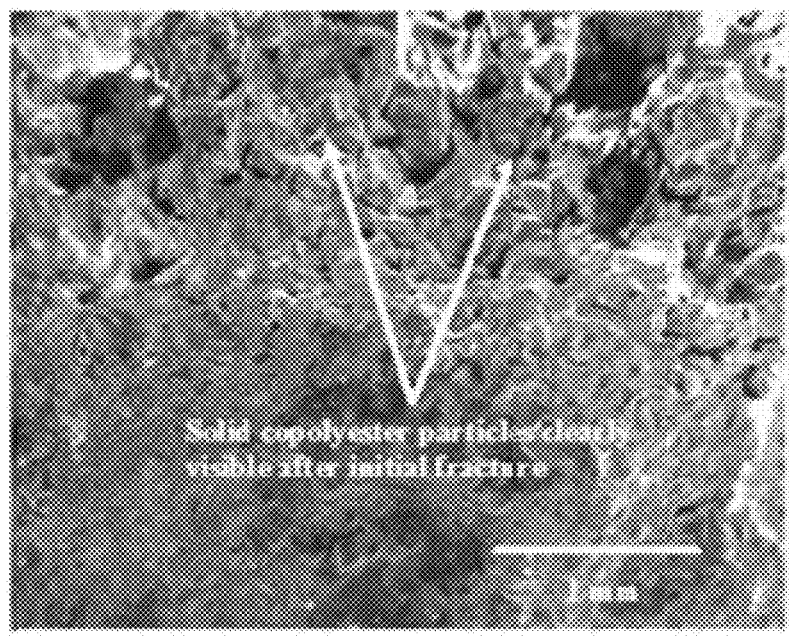
FIG. 16: SEM pictures showing fractured surfaces of a typical specimen after initial fracture (a) and after the first healing cycle (b).
Figure 16B:
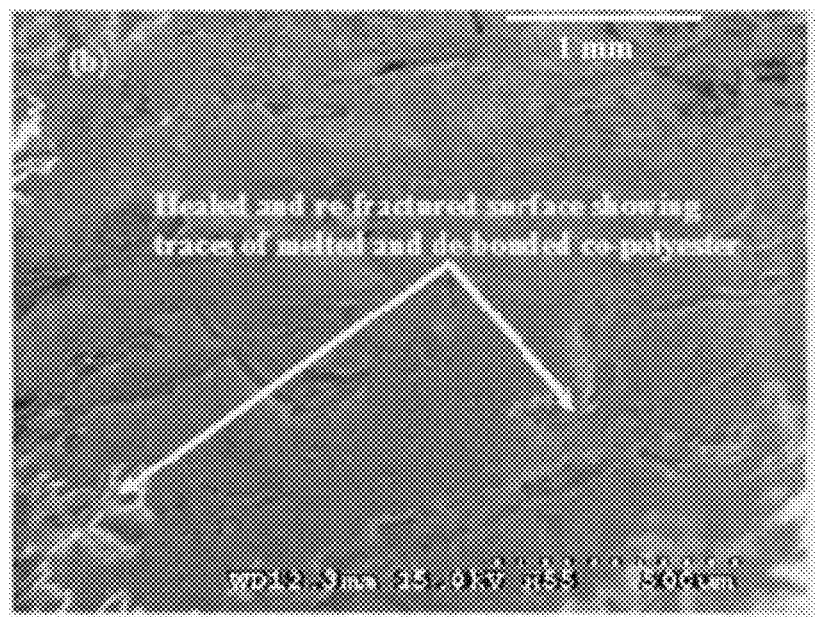

FIG. 16 shows SEM pictures (fractured surface) of a typical specimen (a) after initial fracture and (b) after the first healing cycle. Solid copolyester particles are clearly visible in FIG. 16 (a). In FIG. 16 (b), solid particles are not seen but traces of melted, deformed and debonded copolyester are identified. Also, the surface in FIG. 16 (b) is smoother as compared to that in FIG. 16 (a). This was due to the compressive stress exerted on the surface during the crack sealing process (step one), resulting from the shape memory effect which kept both crack surfaces in intimate contact during the subsequent crack healing process (step two) via the melting, penetration, diffusion and ultimate resolidification of the copolyester across the crack interface.

Figure 17:
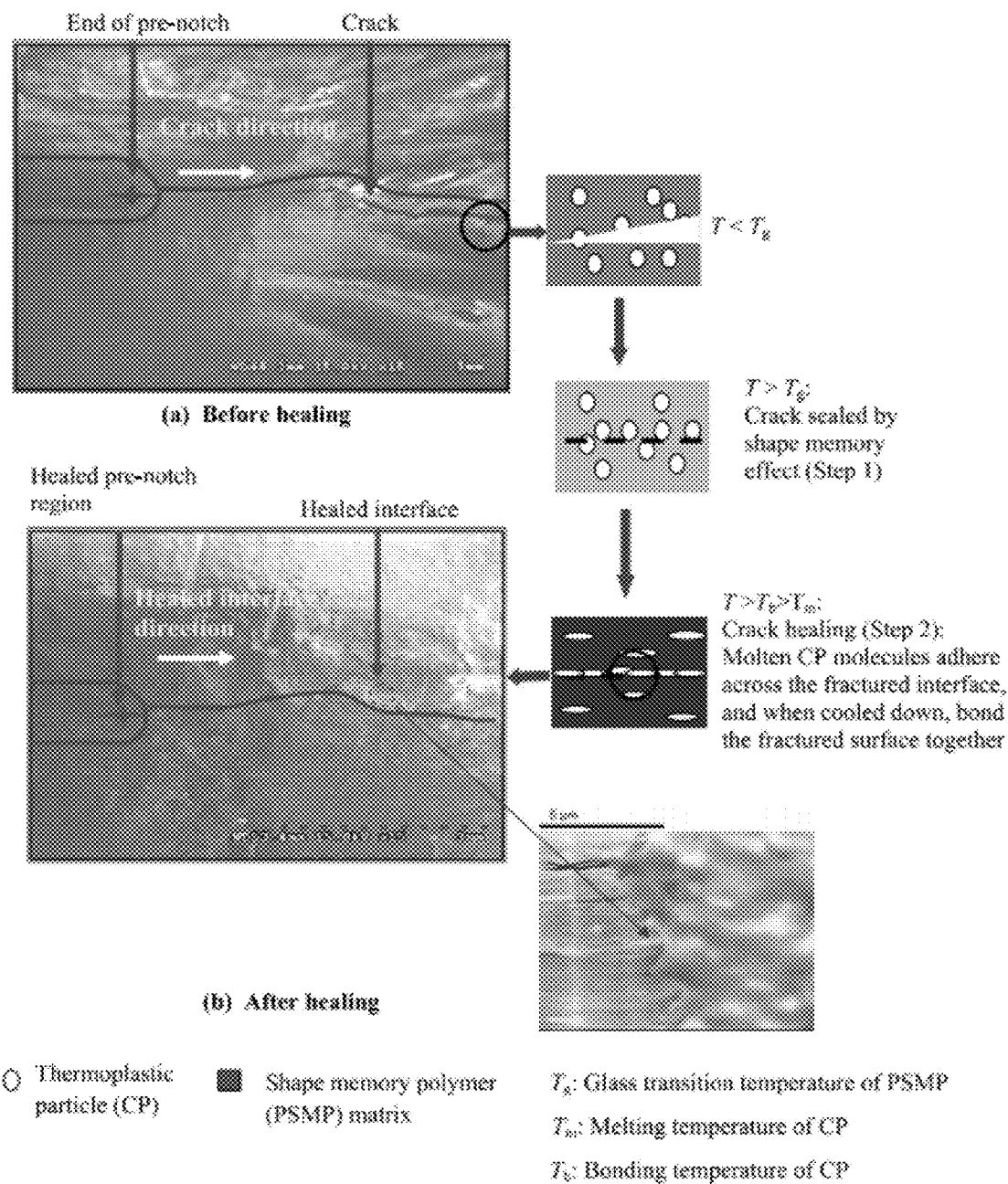
FIG. 17: Top surface view SEM pictures of a typical specimen; (a) after initial fracture and before healing, (b) after healing.

FIG. 17 shows top surface view of SEM pictures of a typical specimen (a) after initial fracture and (b) after healing. In FIG. 17 (a), a crack originating from the end of the pre-notch is clearly visible. In FIG. 17 (b), the notch and the crack disappear after the two-step healing. The zoomed-in SEM picture shows good interfacial bonding.

EDS Analysis

Figure 18A:
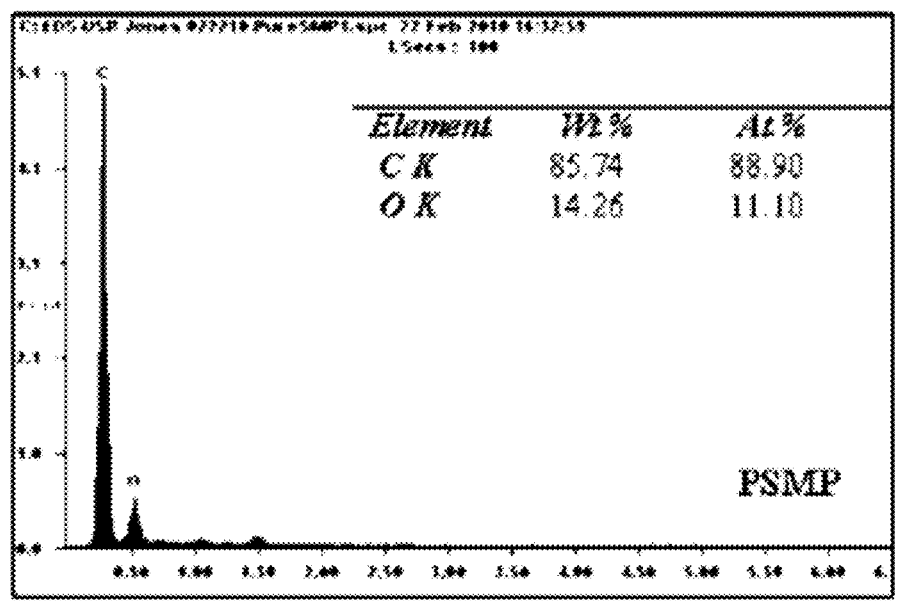
FIG. 18: EDS spectra of (a) pure PSMP and (b) pure CP.
Figure 18B:
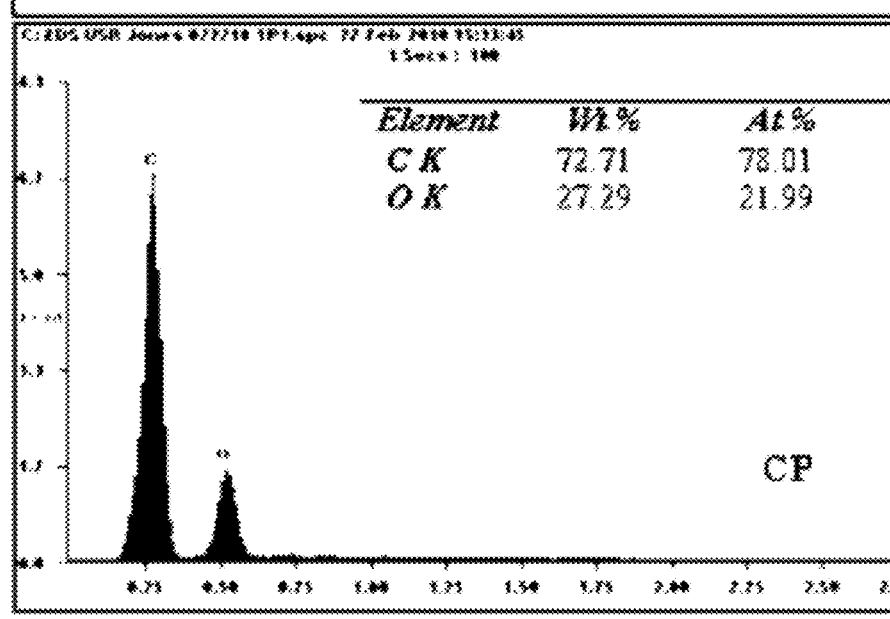

FIG. 18 shows EDS spectra of (a) pure PSMP and (b) pure CP with percentage counts of Carbon and Oxygen. The spectra were obtained to serve as baseline data.

Figure 19A:
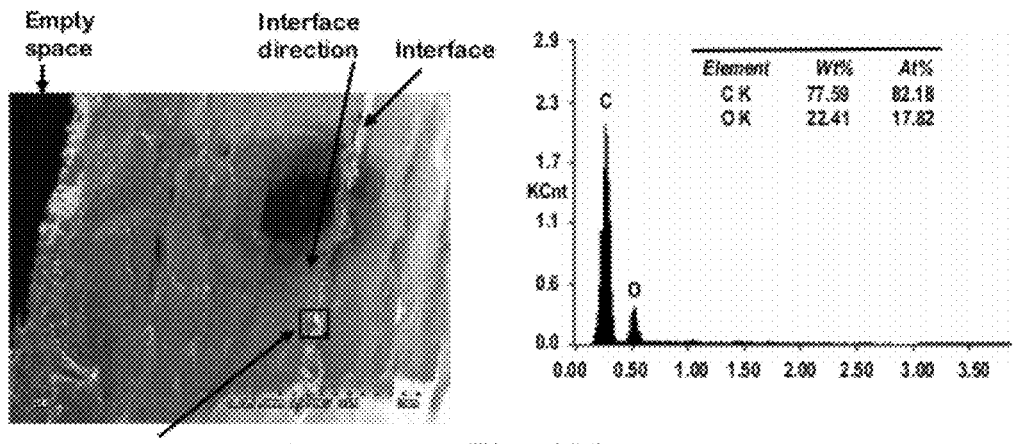
FIG. 19: Top surface view SEM pictures (left) of the EDS specimen showing a healed interface, three analysis points ((a) at the center of the interface, (b) 0.1 mm left of interface and (c) 0.3 mm left of interface) and respective EDS spectra (right).
Figure 19B:
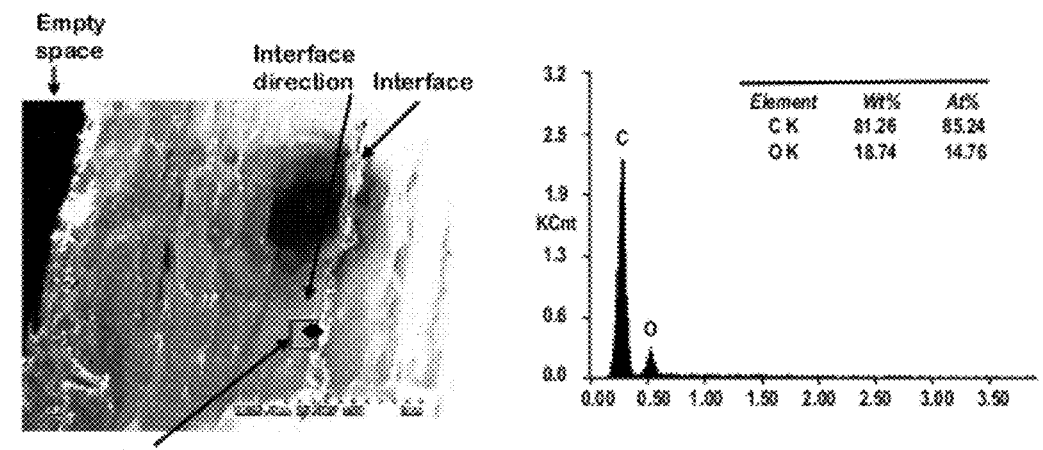
Figure 19C:
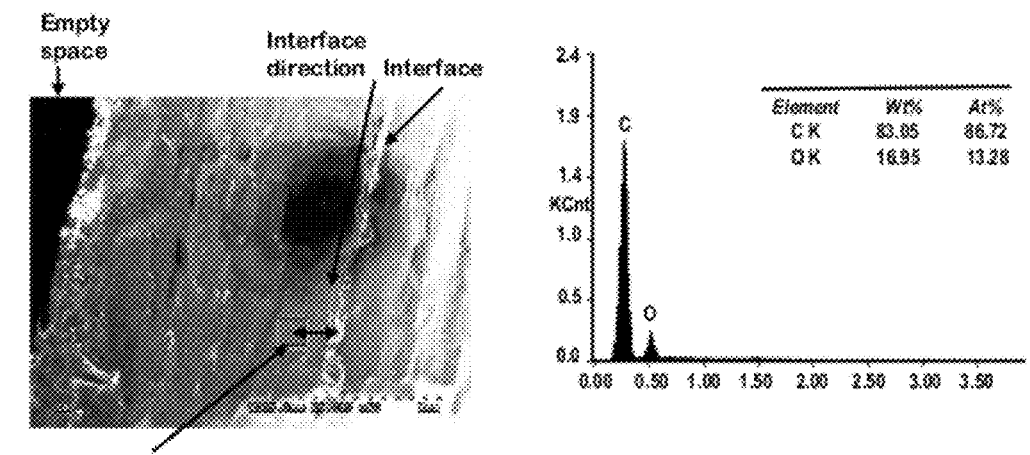

Top surface view SEM pictures showing the healed interface of the EDS specimen are presented in FIG. 19. EDS analysis was performed at three points: directly at the interface, 0.1 mm away from the center of the interface and 0.3 mm away from the center of the interface. EDS spectra corresponding to the analyzed points were recorded as shown in FIG. 19.

Figure 20:
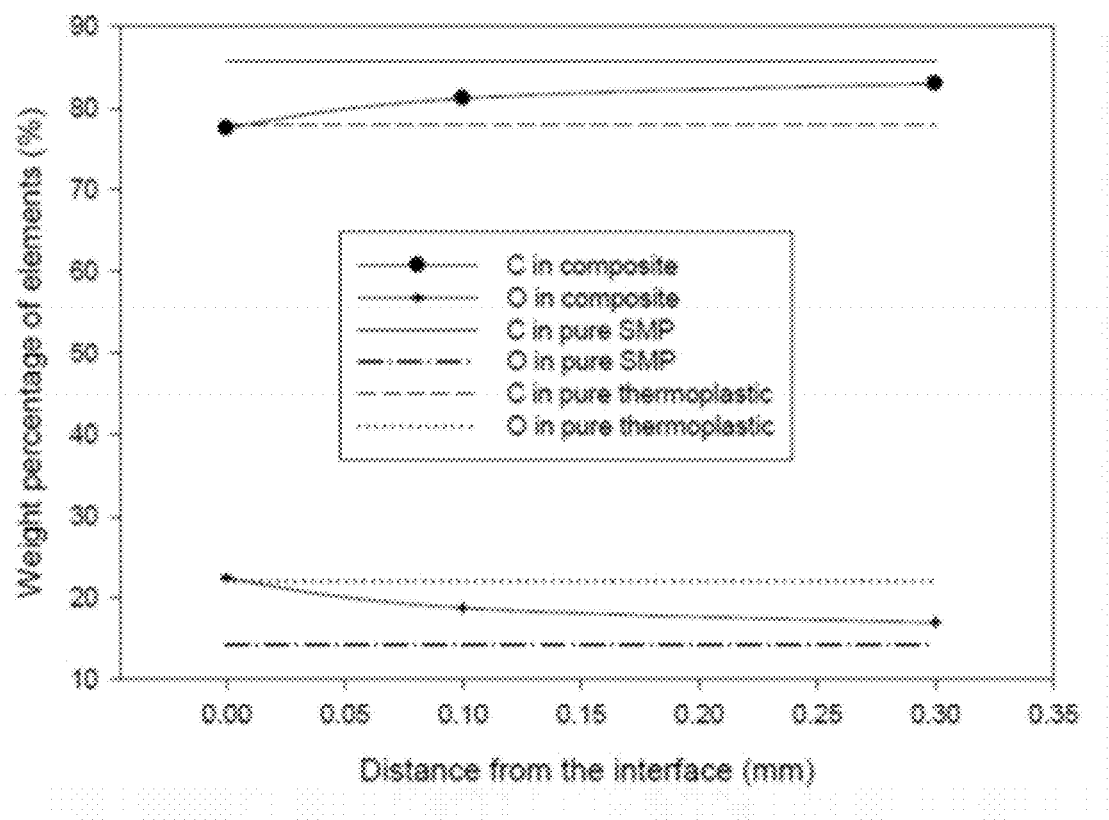
FIG. 20: Variation of component (Oxygen and Carbon) count with distance away from the healed interface.

FIG. 20 shows the variation of carbon and oxygen counts in terms of weight percent with distance away from the interface. It was observed that the carbon count increased away from the interface (pure CP) while the oxygen count reduced in that same direction as the material approached pure PSMP.

From FIG. 18 (b) and FIG. 20, the oxygen and carbon counts at the interface are slightly different from the pure CP. The reason is that the counts obtained from the box immediately above the CP interlayer in the composite specimen were an average from an interaction volume, which includes the CP interlayer and may also include a small portion of the neighboring PSMP matrix. However, the interaction volume did not affect the composition in the box 0.1 mm and box 0.3 mm away from the interface. Based on Potts [232], the width of the interaction volume was about 3.4 µm. This suggests that the interaction volume for the box 0.1 mm and 0.3 mm away from the interface did not include the CP interlayer. In other words, the counts in the two boxes were due to the diffusion of the CP molecules into the PSMP matrix.

Example 3

Damage Healing Ability of A Shape Memory Polymer Based Particulate Composite with Small Thermoplastic Contents The present example provides data that documents the ability of a thermosetting shape memory polymer (SMP) based particulate composite to heal structural-length scale damage with small thermoplastic additive contents through a close-then-heal (CTH) self-healing scheme that was set forth in Example 2 [also see, G. Li and N. Uppu. Shape memory polymer based self-healing syntactic foam: 3-D confined thermomechanical characterization. *Comp Sci Tech*, 70: 1419-1427, (2010).]. An objective of this example was to achieve meaningful healing efficiencies with minimal sacrifice in structural load capacity. By first closing cracks, the gap between two crack surfaces is narrowed and a lesser amount of thermoplastic particles is required to achieve healing versus prior art methods.

The composite of this example was fabricated by dispersing copolyester thermoplastic particles in a thermosetting shape memory polymer matrix. It was found that for small thermoplastic contents of less than 10%, the CTH approach of the present invention healed structural-length scale damage in the thermoset SMP: thermoplastic particulate composite to meaningful extents and with less sacrifice of structural capacity relative to prior at methodologies.

As compared to previous studies [316, 317], the CTH approach of the present invention ensured a similar healing efficiency with much lower thermoplastic content. This example also documented that a composition of the invention (with e.g., a thermoplastic content lower than 6%) achieved considerable damage healing with a lesser sacrifice in toughness and strength relative to prior art approaches.

Based on the results of this example it was found that:

1) For small thermoplastic contents as low as 3%, the close then heal (CTH) approach of the invention healed structural-length scale damage with meaningful damage healing abilities and with less sacrifice of structural load capacity relative to prior approaches. Therefore, the CTH approach of the invention provides for repeatedly healing of macroscopic cracks with a small amount of thermoplastic additives.

2) Because of the ability of confined shape recovery to narrow cracks, larger CP contents may over-saturate the composite and reduce the recovered bending load.

3) The interactions that occurred between the polystyrene shape memory polymer and the copolyester particles are physical rather than chemical.

4) Similar to bending strength and bending stiffness, the fracture toughness of a thermoset SMP matrix/thermoplastic particle composite decreases with increasing copolyester thermoplastic content.

5) Shape recovery rate reduces with increasing copolyester content.

Experimental Protocols

Raw Materials

The materials used in this study included: Veriflex polystyrene shape memory polymer (PSMP) from Corner Stone Research Group Inc. (glass transition temperature determined by DMA [325]: 67.71° C., tensile strength: 23 MPa, and modulus of elasticity: 1.24 GPa at room temperature as provided by the manufacturer); and a thermoplastic polymer identified as copolyester (CP) from Abifor Inc., Switzerland (particle size: ≤80 μm, density: 1.3 g/cm$^3$, glass transition temperature by DSC: 17° C., melting range: 114-124° C., healing temperature range: 125-150° C., and modulus of elasticity: 0.75 GPa). We detailed the chemical compositions of the CP and PSMP polymers in a previous study [329].

Fabrication Procedure

Two groups of the CP-PSMP composite, 3% CP-PSMP and 9% CP-PSMP, were fabricated by respectively dispersing 3% and 9% by volume of CPs in the PSMP matrix. The 6% CP was evaluated by reference to data in Example 2. Besides the difference in the fraction of CP, the fabrication procedure for the composites was the same. After dispersing 3% CP in PSMP, for instance, the resulting CP-PSMP mixture was mixed to uniformity and poured in a steel mold. The mold was then sealed and placed in an oven to cure the composite as follows: 75° C. for 12 h, 90° C. for 3 h and 112° C. for 3 h. After that, the oven was turned off to cool down the cured composite to room temperature. 9% CP content was considered to establish the tendency of healing efficiency change with CP content because 6% CP content had been used in Example 2 (also see [329]).

Dynamic Mechanical Analysis (DMA)

In order to determine the effect of the CP content on glass transition temperature, dynamic mechanical analysis was performed (Rheometic Scientific RSA III) at a frequency of 1 Hz on 3% CP-PSMP and 9% CP-PSMP composite specimens. Rectangular tension specimens with dimensions of 36 mm×11.5 mm×2 mm were used. The temperature was increased at a rate of 5° C./min. The glass transition temperature was used as a guide to determine the programming temperature.

The DMA test also provided information on how the storage modulus and loss modulus of the composite varied with the CP content. The effect of repeated programming on $T_g$ was also studied on a 6% CP-PSMP specimen for up to five programming cycles and was used as a guide to select an appropriate healing temperature during the healing process.

Thermomechanical Behavior

To investigate the effect of the CP content on shape memory functionality, the thermo-mechanical behavior of the composites (3% CP-PSMP and 9% CP-PSMP) was studied. An MTS QTEST 150 testing machine equipped with a heating furnace (ATS heating chamber) was used. The specimen dimensions were 25 mm×25 mm×12.5 mm. A programming temperature of 80° C. was used per the DMA test results.

Beam Specimen Preparation

Beam specimens with dimensions of 120 mm×25 mm×12.5 mm were prepared and programmed in compression to 6.7% pre-strain in the length (longitudinal) direction in an adjustable metal frame on a CARVER Model 2697 compression molding fixture. After that, single edge notched bend (SENB) specimens with notch dimensions of 1 mm wide and 12.5 mm deep were prepared per ASTM D 5045 standard. A schematic explanation of the specimen programming and notching process was as detailed in Example 2 (also see [329]). One reason for using the SENB specimen is that the notch in the specimen served as structural-length scale damage (where two crack surfaces are not in contact). As such, the ability of the CTH scheme to close and heal the crack (notch) can be studied. Another reason is to determine the fracture toughness of the composite. We also investigated the effect of programming pre-strain on healing efficiency on the 9% CP composite. Four additional groups of the 9% CP composite specimens were prepared and programmed to pre-strain levels of 2.7%, 4.7%, 8.7% and 10% respectively. There were three specimens per group.

Three-Point Bending Test

In order to determine the effect of the CP content on fracture toughness of the composite, the SENB specimens were tested in three-point bending on a universal MTS 810 testing system. The span length was 100 mm and the loading rate was 10 mm/min per ASTM D 5045 standard. The specimens were tested and fractured completely into two halves. This test was also used to determine the peak bending loads of the virgin un-notched control specimens and healed specimens in order to determine damage healing ability.

Compression Tests

Compression tests were conducted on specimens with dimensions of 25 mm×25 mm×12.5 mm per ASTM D 365 standard using the MTS 810 testing system (loading rate 10 mm/min) in order to determine the compressive yield strength of the composites. The yield strength is required to determine the fracture toughness of the CP-PSMP composite in terms of critical stress intensity factor ($K_w$).

Indentation Tests

Indentation tests were performed on CP-PSMP specimens (MTS 810, loading rate 10 mm/min) per ASTM D 5045 standard in order to obtain load-displacement plots. The plots were used to determine the fracture toughness of the CP-PSMP composite in terms of critical energy release rate ($G_{IC}$). Un-notched virgin specimens were used.

Healing Procedure

The healing process began by immediately placing fractured specimens in an adjustable rectangular steel frame following the three-point bending test at room temperature with the two fracture surfaces in contact. The frame provided external in-plane confinement during shape recovery. Next the frame was placed on a compression molding fixture which was preheated to 150° C. to begin the two-step CTH healing process. The specimens were left between the heated plates for 20 minutes, first for the pre-notch and crack to be closed, and then for the CP to be melted and diffused into the PSMP matrix. After that, the heating switch of the machine was turned off and the specimens were allowed to cool to room temperature, leading to the formation of a solid bond between the fractured PSMP surfaces by the hardened CP wedge. More details are set forth in Example 2 (also see [329]).

SEM Observation

To better understand the effect of the CP content on healing efficiency, SEM (Hitachi S-3600N scanning electron microscope) was used to examine fracture surfaces of typical 3% CP-PSMP and 9% CP-PSMP specimens.

Fourier Transform Infrared (FTIR) Spectroscopy Analysis

Fourier transform infrared (FTIR) spectra of the 3% CP, 6% CP and 9% CP composites were recorded on a Bruker Tensor 27 single beam instrument at 16 scans with a nominal resolution of 4 cm$^{-1}$. Absorption spectra were saved from 4000 to 700 cm$^{-1}$. FTIR analysis was conducted in order to better understand the nature of interactions between the two polymers.

Results

Dynamic Mechanical Analysis

Figure 21:
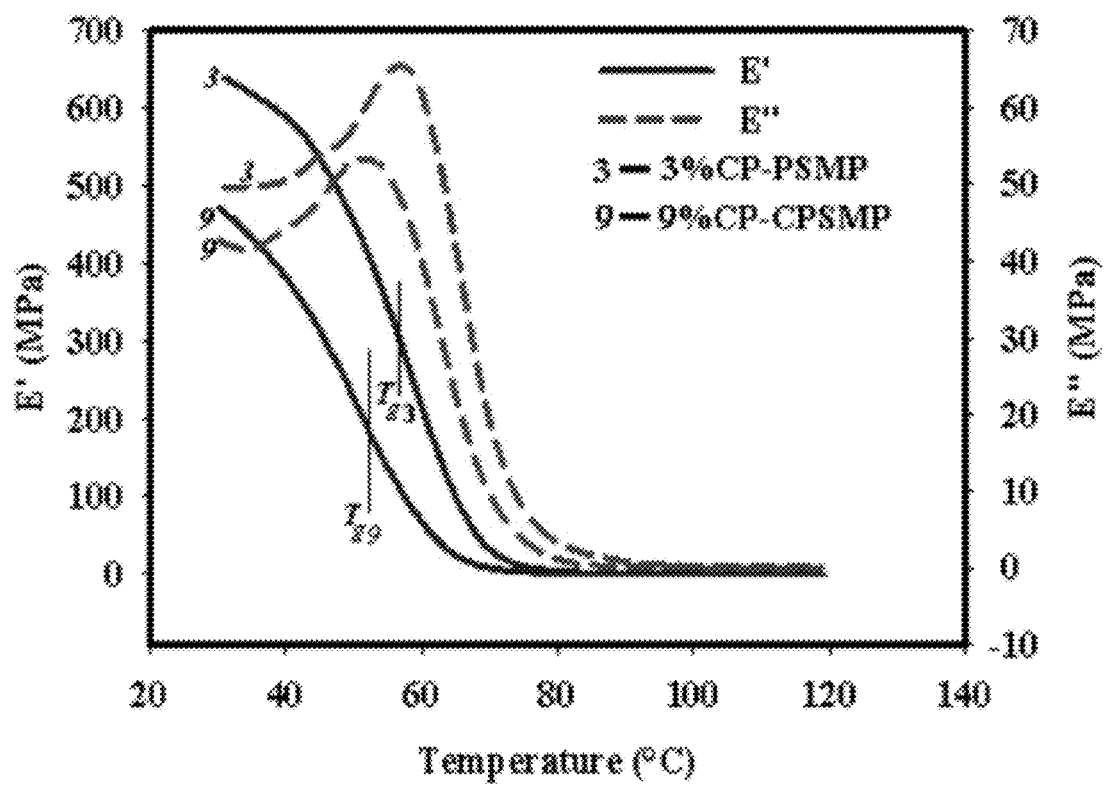
FIG. 21: Typical plots of storage modulus (E') and loss modulus (E") with temperature.

FIG. 21 shows typical plots of storage modulus and loss modulus with temperature for the 3% CP-PSMP and 9% CP-PSMP composites. As shown in Example 2, the CP polymer has some degree of compatibility with the PSMP matrix. The glass transition temperature was taken as the temperature corresponding to the peak of the loss modulus curve. It is seen that the glass transition temperature of the composite reduces with increasing CP content. Based on this result, a programming temperature of 80° C. was selected, which is well above the glass transition temperatures of the composites. From FIG. 21, it can also be seen that at 30° C., the storage modulus decreases with increasing CP content. This is consistent with the rule of mixtures.

Figure 22:
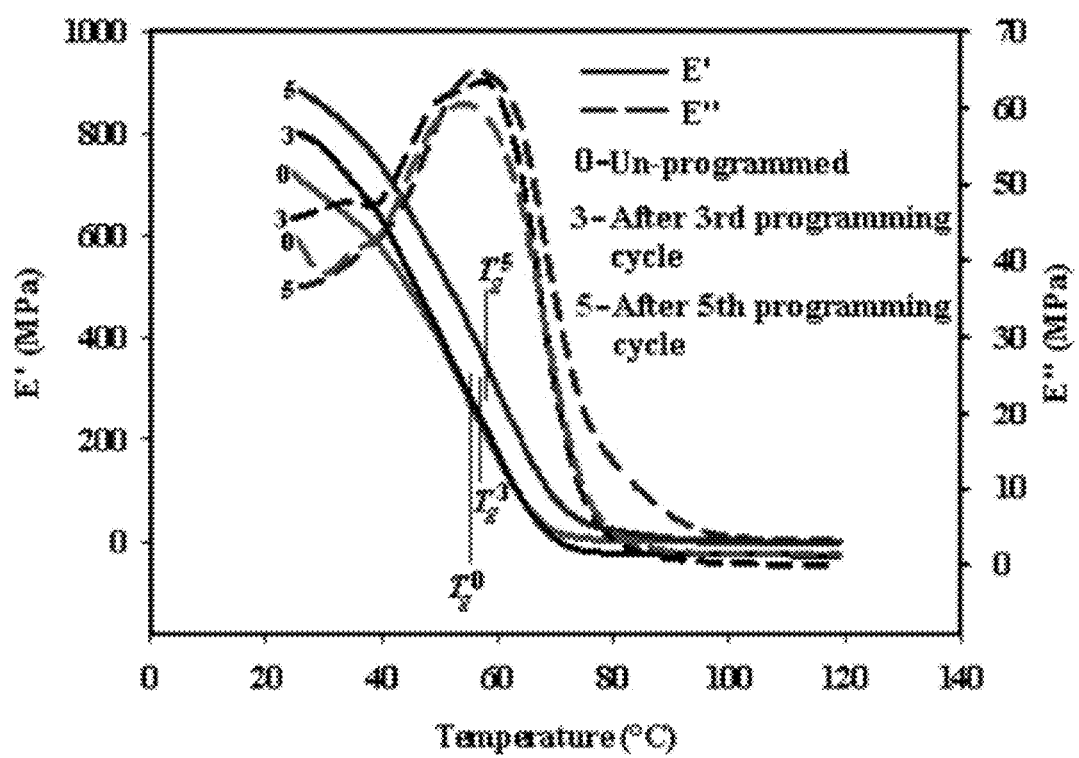
FIG. 22: Typical plots of storage modulus and loss modulus with temperature for a 6% CP-PSMP composite specimen showing variation of Tg with programming cycle.

FIG. 22 shows typical plots of storage modulus and loss modulus with temperature for a 6% CP-PSMP composite specimen with glass transition temperatures $T_g^0$, $T_g^3$ and $T_g^5$ corresponding to the zero (unprogrammed), third and fifth programming cycles, respectively. From the graph, it is seen that the glass transition temperature of the composite increased slightly with programming cycle. The $T_g$ values were respectively $T_g^0=54°$ C., $T_g^3=56°$ C. and $T_g^5=57°$ C. This result shows that for up to five programming cycles, $T_g^5=57°$ C. is still well below the programming temperature of 80° C. Using this result as a guide, we deduce that the increase in $T_g$ for the 3% CP-PSMP and 9% CP-PSMP composites for the first 5 repeated programming cycles is also very small. Thus, the programming temperature of 80° C. was used for all the specimens in this study.

It is noted that, in FIG. 22 (b), the storage modulus increases as the programming cycle increases. Without wishing to be bound by theory, it is believed the reason may be that, with the increase in programming cycles, the composite experienced longer lengths of time at higher temperature, which facilitated diffusion of the CP into the PSMP matrix, leading to better physical entanglement between the CP and PSMP, and thus higher stiffness. Again without being bound by theory, another reason may be that, with repeated programming, the PSMP molecules align more towards the loading direction, leading to increase in stiffness in the loading direction.

Thermo-Mechanical Behavior

Stress Recovery

Figure 23A:
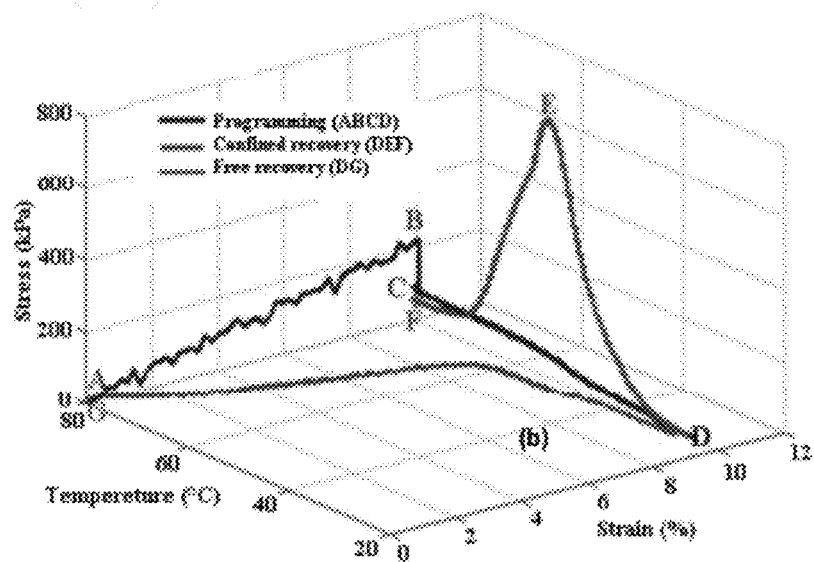
FIG. 23: Typical 3D thermo-mechanical plots of (a) 3% CP-PSMP and (b) 9% CP-PSMP
Figure 23B:
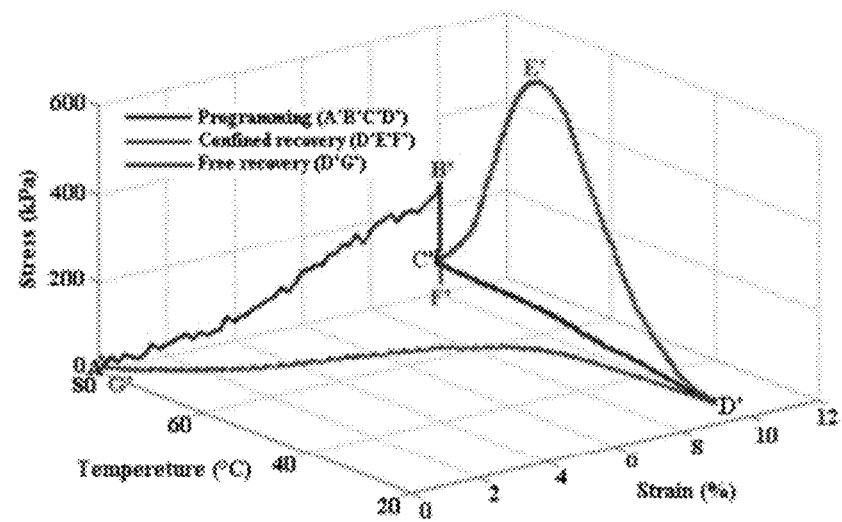

FIG. 23 shows typical 3D thermo-mechanical plots of 3% CP-PSMP and 9% CP-PSMP. The programming, confined recovery and free recovery procedures were as set forth in Example 2 (also see [329]). The stabilized programming stress (SPS) is the stress at point C. The stabilized confined recovery stress (SCRS) is the stress at point F. Stress recovery is defined as the ratio of the SCRS at point F to the SPS at point C. A high value of SCRS is an indication of good capability of closing cracks during confined shape recovery of the damaged composite.

The stress recovery ratio of the composites are 66%, 60%, and 44% when the CP contents are 3%, 6%, and 9%, respectively. Therefore, the stress recovery capability of the CP-PSMP composite reduces with increasing CP content. Since the pressure required to seal cracks and keep crack surfaces in close contact during healing comes from the confined recovery stress, this result indicates that with increasing CP content, the stress exerted to keep the crack surfaces in contact reduces; this is one factor that led to uncertainty regarding the efficacy of the current approach prior to the data herein.

Strain Recovery

Figure 24:
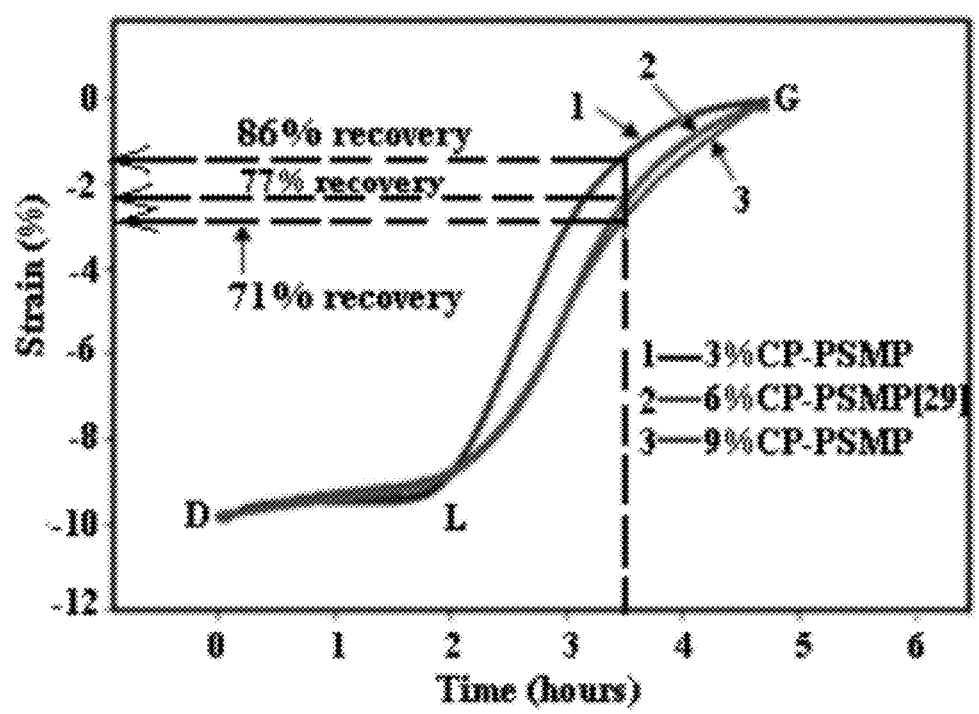
FIG. 24: Typical 2D plots of recovery strain with time.

FIG. 24 shows a 2D plot of the recovery strain with time for the composite with CP contents of 3%, 6% and 9%. The shape recovery (ability for the composite to recover the strain at point D) is larger than 98% for all three groups, indicating that the CP-PSMP composite retained its shape recovery ability and shape memory functionality with these variations in CP content. However, it can be seen that after the "lift off" point L, 3% CP shows a steeper and sharper slope of recovery (higher recovery rate) compared to the other two specimens. This indicates that the speed of recovery or shape recovery rate reduces with increasing CP content. For instance, when the time equals 3.5 hours, the 3% CP composite has already recovered 86% of the strain while the 6% and 9% specimens have only recovered 77% and 71% of the same property, respectively. These findings speak to the fact that there are competing aspects to the compositions comprising a thermosetting SMP matrix and thermoplastic particles; increasing the concentration of the thermoplastic particles, which facilitates the healing of defects on a molecular scale, also dilutes the concentration of the SMP and thus has an adverse effect on the ability to close defects and thereby allow the thermoplastic particles to work. The proper balance between such competing factors may vary, depending upon the use to which a particular composite will be put, and the environment in which it will operate.

Three-Point Bending Test Results and Effect of CP Content on Healing Efficiency

Figure 25A:
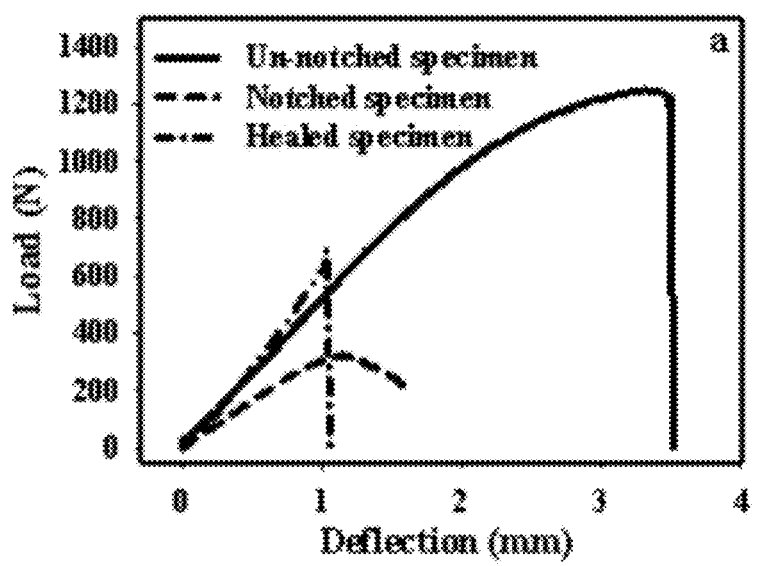
FIG. 25: Typical load deflection curves of (a) 3% CP-PSMP and (b) 9% CP-PSMP.
Figure 25B:
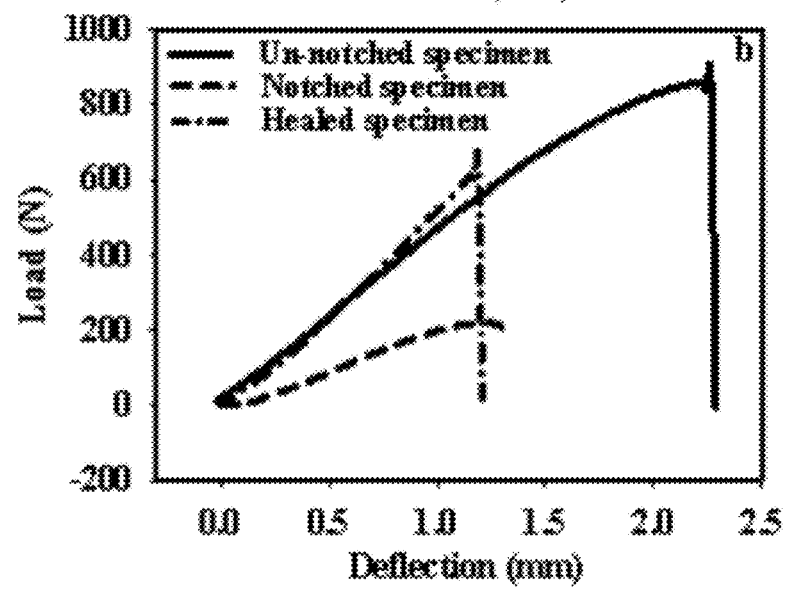
Figure 26:
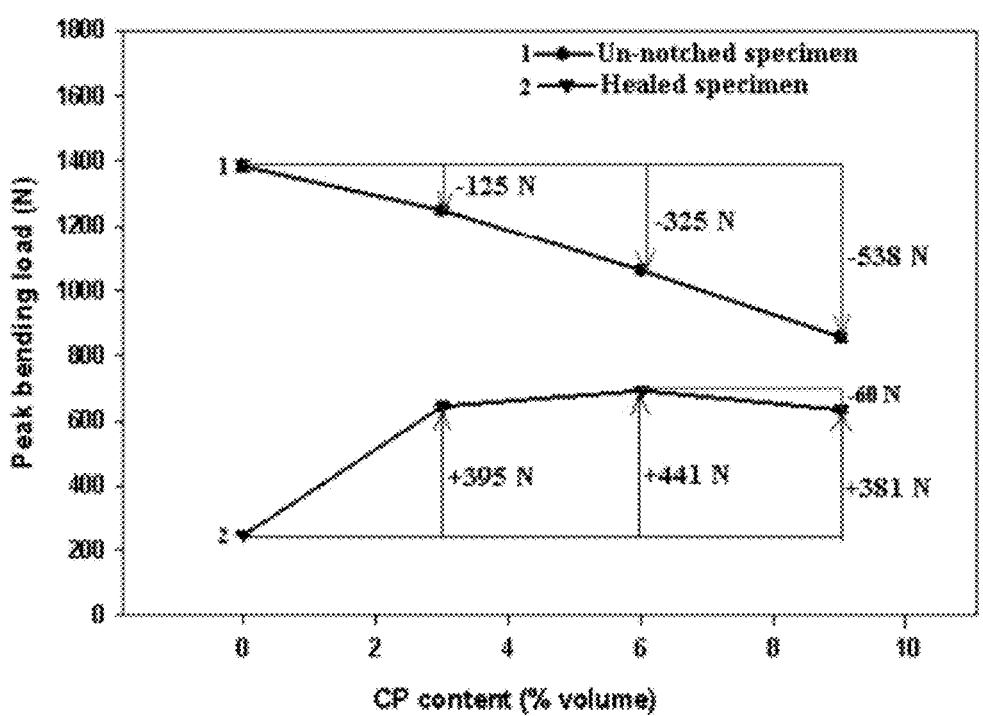
FIG. 26: Variation of the peak bending load with CP content for un-notched virgin specimens and healed specimens.

FIG. 25 shows typical load-deflection curves of (a) 3% CP-PSMP and (b) 9% CP-PSMP. For the 3% CP specimen, the average peak bending loads for the un-notched, notched and healed specimens were respectively 1,260±4N, 321±3N, and 645±2 N. For the 9% CP specimen, the average peak bending load for the corresponding specimens were respectively 847±3N, 220±2N, and 631±3 N. FIG. 26 shows the variation of the peak bending load with CP content for the un-notched and healed specimens. In FIG. 26, the zero mark on the horizontal axis represents the pure PSMP without CP.

The red horizontal line (at 1,400 N) represents the peak load in the un-notched PSMP specimen. The blue horizontal line (at 215 N) represents the peak load in the healed PSMP specimen. Thus for the un-notched specimens, loss in load was determined by subtracting the load of the PSMP specimen from that of the CP-PSMP specimen. For the healed specimens, gain in load was determined by subtracting the load of the healed PSMP specimen from that of the healed CP-PSMP specimen.

From FIG. 25 and FIG. 26, several observations can be made:

(1) By introducing 3% of CP particles into the PSMP matrix, there is a drop in load of 125 N for the un-notched specimen. However, once the specimen is healed, the gain in load is 395 N, which is greater than the drop in load for the un-notched specimen. This is a positive trend since the load gained in the healed 3% CP-PSMP specimen is greater than the load sacrificed in the un-notched specimen.

To be consistent with Example 2, the damage healing ability in this study was obtained by comparing the peak bending load of the healed specimen to that of the original un-notched specimen with the same CP content. It is noted that healing efficiency should be determined per some physical constants of the virgin and healed specimens such as fracture toughness [332, 333]. However, because the notch was also healed in this study, the fracture toughness of the healed specimens could not be determined.

Therefore, the definition used in this study was an arbitrary, nonphysical definition of healing efficiency solely for the purpose of discussing trends in behavioral changes. To avoid confusion with the widely used terminology "healing efficiency," we used "damage healing ability" in this study. Damage healing ability is characterized in terms of the peak bending load as the ratio (percentage) of the peak bending load of the healed specimen to that of the virgin specimen. Based on this definition, the damage healing ability is 51.2% for 3% CP content. Also, the increase in the peak bending load for the healed specimen, as compared to the notched specimen, is 200.1% (FIG. 25).

(2) A further observation from FIG. 25 and FIG. 26 is that at 6% CP content, the total drop in peak load for the un-notched specimen, compared to the pure PSMP matrix is 325 N, with a total gain in load of 441 N after the specimen is healed (FIG. 26). This again is a positive trend. The damage healing ability was 65% and the increase in peak bending load in the healed specimen was over 300% [329].

(3) By further increasing the CP content to 9%, a damage healing ability of 75% was obtained. However, the drop in peak bending load (543 N) is greater than the total gain in load (381 N) after the specimen is healed, indicating a negative trend. Without wishing to be bound by theory, a possible reason is that with 9% of CP, the particles do not have enough space to melt and flow into the narrowed crack, and to diffuse into the PSMP matrix. In other words, the composite is becoming oversaturated with CP. Because the CP has a lower strength than the PSMP matrix, the additional unused CP serves to reduce the strength of the composite, instead of increasing the strength. To further validate this point, larger prestrain levels were used in the programming of the 9% CP composite. The results are discussed in the next section.

Effect of Programming Pre-Strain on Damage Healing Ability

Figure 27:
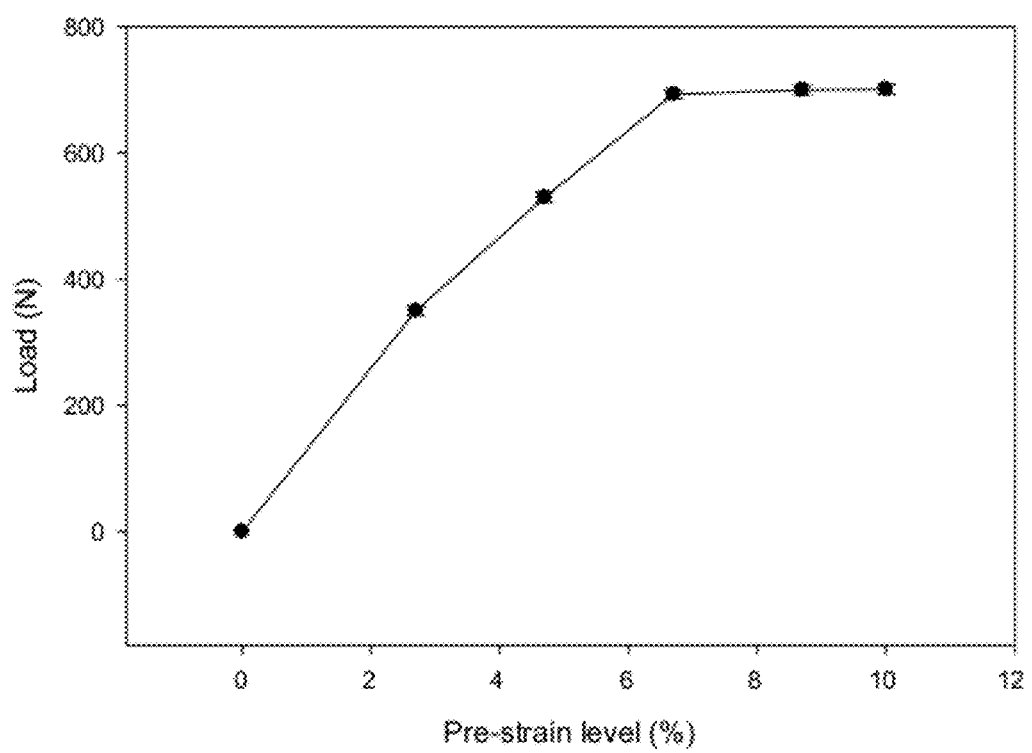
FIG. 27: Effect of pre-strain level on peak bending load of the healed specimens with 9% CP.

FIG. 27 shows plots of peak bending load with programming pre-strain for 9% CP specimens programmed to different pre-strain levels from 2.7% to 10% (For convenience, healing efficiency (peak load) at zero pre-strain is assumed to be zero because the specimen is completely fractured). It is seen that the peak bending load of the healed specimen increases with pre-strain level before leveling off at 6.7% pre-strain. Further increasing the pre-strain (8.7% and 10%) does not increase the peak bending load in the healed specimen. This indicates that further increasing the pre-strain level has no effect on the damage healing ability. The reason is that the prestrain serves two purposes: (a) to close cracks through confined shape recovery and (b) to apply a compressive stress to help diffusion of the thermoplastic particles. Based on the length of 120 mm and notch width of 1 mm of the SENB specimen, it is seen that, if the recovery ratio is 100%, 0.83% prestrain is sufficient to close the 1 mm wide notch (the fractured surfaces come to touch without any contact force). Therefore, the 10% prestrain may not further serve the purpose of closing the crack. However, the recovery stress as shown in FIG. 2 is very small. Because the "theoretical" prestrain of 0.83% cannot apply any compressive stress at the crack surface, diffusion of the thermoplastic should be very slow, leading to lower bonding strength and lower damage healing ability. Thus, increasing the prestrain level up to 6.7% sees a continuous increase in damage healing ability because the recovery stress continuously increases and helps the diffusion of the CP. Further increasing the prestrain does not further increase the damage healing ability because the CP is oversaturated (the narrowed crack can only wick in a certain amount of molten CP and 6.7% prestrain may be the maximum recovery stress needed to help diffuse the CP within the narrowed crack), leading to level-off of the damage healing ability.

SEM Observation

Figure 28A:
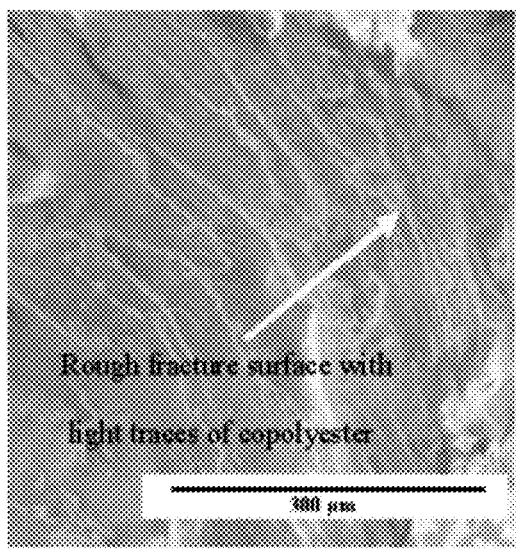
FIG. 28: Typical SEM images with fracture surfaces of (a) a 3% CP specimen and (b) a 9% CP specimen, after healing and refracture.
Figure 28B:
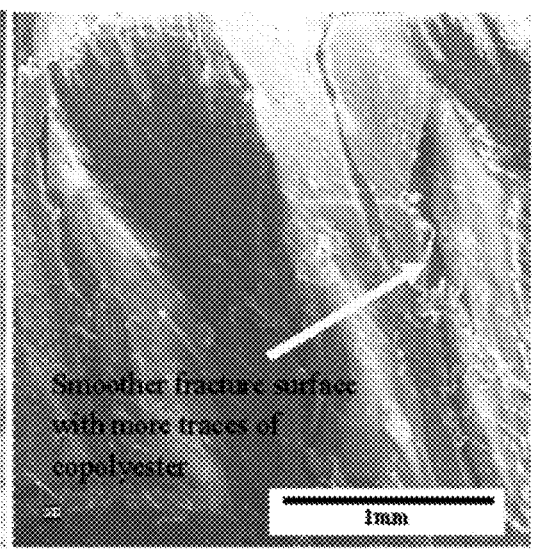

FIG. 28 shows typical SEM images of the fractured surfaces of (a) a 3% CP specimen and (b) a 9% CP specimen, after the first healing and fracture cycle. In FIG. 7 (b), heavy traces of CP were seen on the fractured surface. This explains the drop in peak bending load for the healed 9% CP specimen (as seen in FIG. 26). A thick layer of CP at the crack interface serves as a weak spot and facilitates the re-opening of the healed crack during the bending test. Because the strength of the CP is lower than that of the PSMP, a thick layer of CP would reduce the strength of the composite. To better understand the interfacial interaction between the CP and PSMP, FTIR analysis was used in the next section.

FTIR Analysis

FIG. 29 shows typical FTIR spectra of the PSMP, CP and the particulate composite with 3%, 6% and 9% CP contents. Looking at the spectra of PSMP and CP, between 4000 $cm^{-1}$ and 3000 $cm^{-1}$ wavelength, no significant peaks were observed. However, both PSMP and CP show peaks at 2800 $cm^{-1}$. From 2800 $cm^{-1}$ down to 2000 $cm^{-1}$, CP shows no peak while PSMP shows a small peak at 2400 $cm^{-1}$. Both CP and PSMP show unique patterns from 1700 $cm^{-1}$ down to 1000 $cm^{-1}$. Looking at the spectra of the particulate composites, a superposition of the individual CP and PSMP patterns is seen. For instance, the small peak at 2400 $cm^{-1}$ on the PSMP spectrum (circled in red) is reflected on each of the CP-PSMP spectra. No new and significant peaks were identified on the spectra of the CP-PSMP composite, suggesting that no new functional groups or components were formed. This indicates that no chemical interactions or reactions occurred between the PSMP and CP polymers. Thus, healing is a result of physical interactions between the two polymers and not interactions such as forming of major chemical bonds such as covalent bond or secondary chemical bond such as hydrogen bonds, etc.

Because the available sites for physical entanglement are limited at the narrowed crack, saturated CP levels such as above 9 or 10% content leads to a reduction of recovered peak bending load in the healed specimen.

Effects of CP Content on Healing Repeatability

Figure 30:
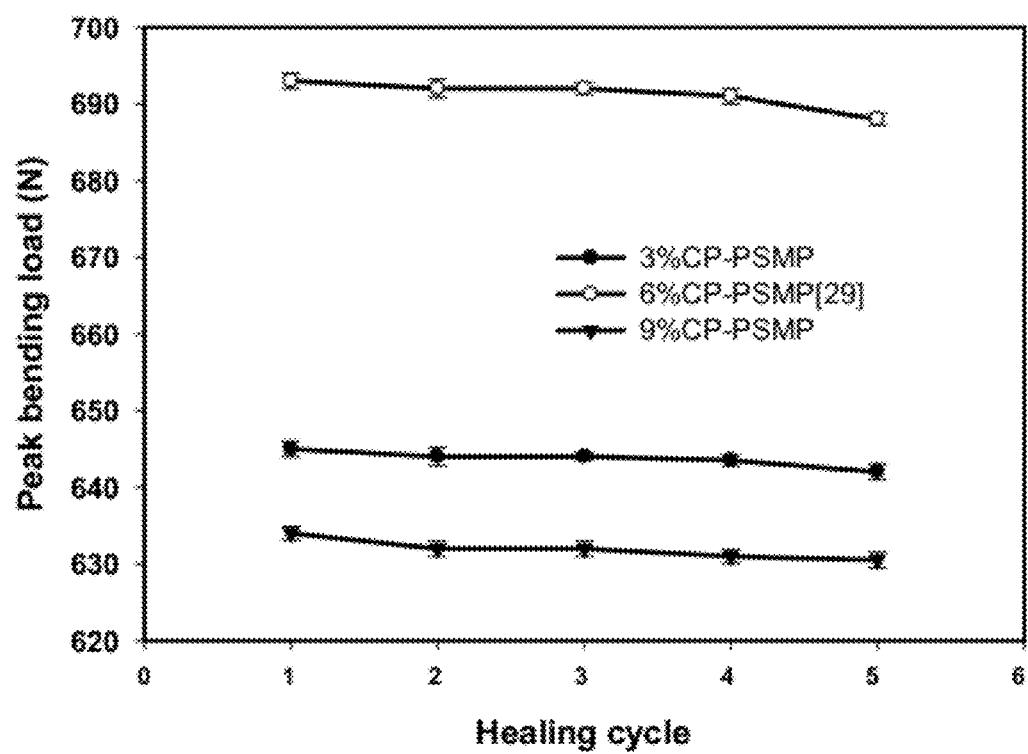
FIG. 30: Average peak bending load with fracture-healing cycles for different CP contents.

FIG. 30 shows graphs of peak bending load (with error bars) with healing cycle for the CP-PSMP composite at different CP contents. For the first five fracture-healing cycles, the reduction in peak bending load was very small for all three groups of the particulate composite, indicating good healing repeatability. This suggests that the concentration of the thermoplastic additive at the healed interface decreased very slowly with healing cycles. The reason for this repeatability is that (a) the programming and shape recovery of the PSMP are physical changes only and (b) the thermoplastic CP can be repeatedly melted and hardened. Of course, if major chemical bonds form at the interface, the bonding force would be higher than the physical entanglement, which may lead to high healing efficiency. However, formation of chemical bond, once it is fractured, may not be able to be bonded together, making repeated healing questionable.

Fracture Toughness

Fracture toughness values of the virgin CP-PSMP composites in terms of critical stress intensity factor ($K_{IC}$) were determined using Equation (1) per ASTM D 5045 standard:

$$K = \left(\frac{P}{BW^{1/2}}\right) f(x) \quad (1)$$

where $(0 < x < 1)$ $$f(x) = (6x^{1/2}) \frac{[1.99 - x(1-x)(2.15 - 3.93x + 2.7x^2)]}{(1+2x)(1-x)^{3/2}}$$

In Eq. (1), a is the total crack length (pre-notch and induced crack), W is the specimen width, B is the specimen thickness, and x is the ratio of a to W. The value of K becomes $K_{IC}$ when the condition in Eq. (2) is satisfied $$a, B, (W-a) > 2.5*(K/\sigma_y)^2 \quad (2)$$

where $\sigma_y$ is the tensile yield strength or 0.7 times the compressive yield strength. Based on the compression test, the average compressive yield strength for the 3% CP, 6% CP and 9% CP specimens were respectively 36±2 MPa, 31±1 MPa, and 28±1 MPa. These formulae can be used to extrapolate to the parameters of a thermoset CTH product that is other than the presently evaluated one.

Figure 31:
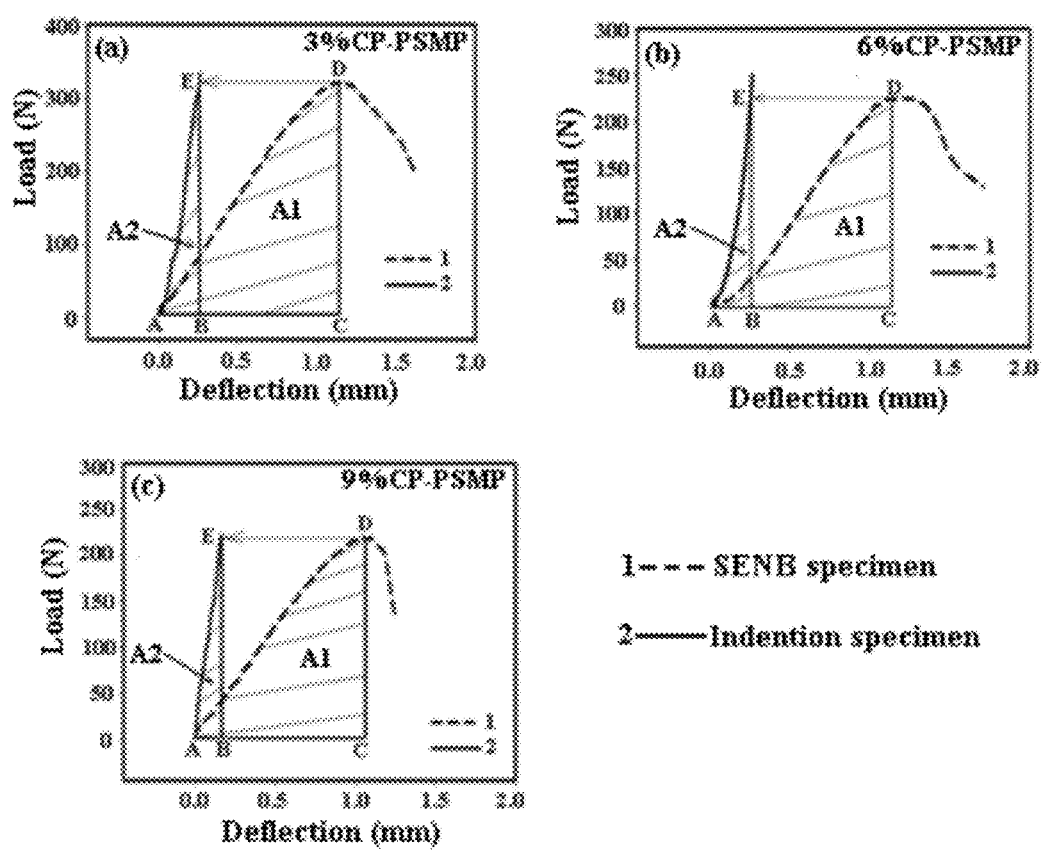
FIG. 31: Load-deflection of SENB specimens and load-indentation of indentation specimens.

Fracture toughness values of the CP-PSMP composites in terms of energy release rate ($G_{IC}$) were determined according to Eq. (3) per the ASTM D 5045 standard:

$$G = \frac{U}{BW\phi} \quad (3)$$

where $\phi$ is a parameter taken as 0.246 for x=0.5, and U is the corrected energy obtained by subtracting area A2 (ABEA) from area A1 (ACDA) in FIG. 31. The area A1 represents the energy required to fracture the SENB specimen during the three-point bending test. In order to correct the effect of system compliance, load pin penetration into the specimen, and compression of the specimen during the bending test, the area A2 below the indentation curve is subtracted from A1 to obtain the corrected energy U.

The $K_{IC}$ and $G_{IC}$ values for 3%, 6% and 9% CP content were respectively 1.73 MPa·m$^{1/2}$ and 1,968 J/m$^2$, 1.24 MPa·m$^{1/2}$ and 1,421 J/m$^2$, and 1.18 MPa·m$^{1/2}$ and 1,267 J/m$^2$. It is seen that the fracture toughness reduces with increasing CP content.

This indicates that even though the CP particles are tougher than and partially compatible with the PSMP matrix, adhesion or physical bonds between the CP particles and the PSMP matrix is not as strong as the chemical bonds in the pure PSMP and pure CP molecules. Therefore, CP particles serve as stress concentration centers in the composite. Thus the notch crack easily propagates along the boundaries between the CP particles and the PSMP matrix, leading to a reduction in the fracture toughness as CP content increases.

Figure 32:
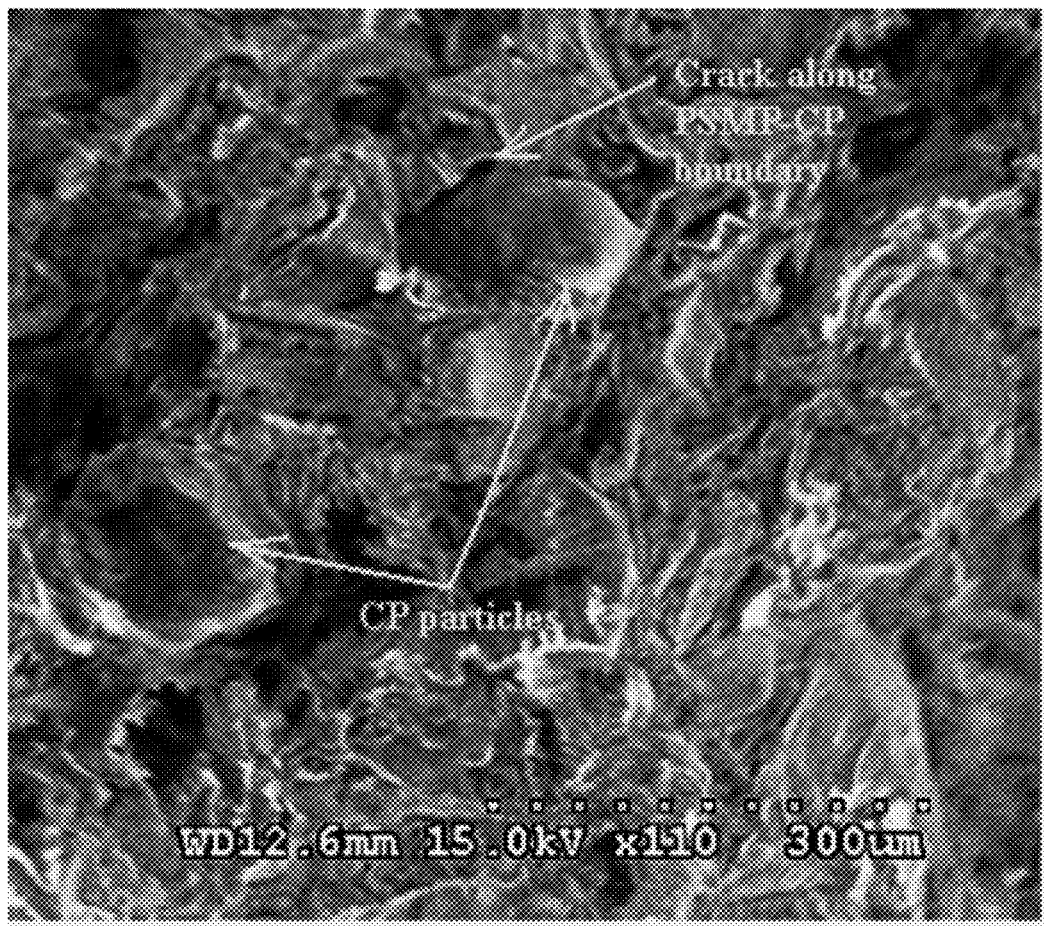
FIG. 32: SEM picture showing the fractured surface of a typical SENB specimen with a crack opening at the PSMP-CP boundary for 9% CP content.

FIG. 32 shows an SEM picture of the fractured surface of a typical SENB specimen. It is seen that a crack propagates along the PSMP-CP particle boundary. Therefore, with CP content higher than needed to fill in the narrowed crack, additional unused particles facilitate fracture of the composite.

Example 4

Self-Healing of Sandwich Structures with Grid Stiffened Shape Memory Polymer Syntactic Foam Core In this example, a new sandwich with an orthogrid stiffened shape memory polymer (SMP) based syntactic foam core is set forth, fabricated, programmed, impacted, healed (sealed), and compression tested, and achieved healing of impact damage repeatedly and almost autonomously. Two prestrain levels (3% and 20%), two impact energy levels (30.0 J and 53.3 J), and two recovery (healing) conditions (2-D confined and 3-D confined) were employed in this example. Up to seven impact/healing cycles were conducted. Macroscopic and microscopic damage/healing observation and analyses were implemented. Residual strength was evaluated using an anti-buckling compression test fixture.

It was found that the healing efficiency was over 100% for almost all the impact/healing cycles; programming using 20% prestrain led to higher residual strength than that with 3% prestrain; 3-D confined recovery resulted in higher residual strength than 2-D confined recovery; and as the impact energy increased, the healing efficiency slightly decreased.

Based on the systematic test program on the grid stiffened SMP based syntactic foam cored sandwich, the following conclusions were made:

(1) In terms of compressive strength, the developed sandwich can heal structural-length scale damage such as impact damage repeatedly, efficiently, and almost autonomously. The only external addition is of heat. Thus, the combination of grid skeleton and SMP based foam is ideal for impact mitigations.

(2) As impact energy increased, the healing efficiency decreased for the first four rounds of impact/healing cycles. For impact/healing up to seventh cycle, the healing efficiency was almost the same, regardless of the impact energy (30.0 J and 53.3 J).

(3) The prestrain level during programming had a significant effect on the impact response and healing efficiency of the smart sandwich. Programming by 20% prestrain consistently showed a higher impact tolerance and higher CAI strength than that by 3% prestrain.

(4) The healing efficiency depended on the external confinement provided to the damaged specimen during the shape recovery process. Based on the prestrain levels used in this example, the stronger the external confinement, the higher the healing efficiency.

(5) For the foam cored sandwich, programming itself increased the in-plane compressive strength of the sandwich.

(6) The cluster analysis results also indicated that good healing efficiency was achieved in the sandwich structures by employing the 3-D confined shape recovery process.

Specimen Preparation and Experimentation

Raw Materials

The smart syntactic foam was fabricated by dispersing 40% by volume of glass microballoons (Potters Industries Q-cel 6014: bulk density of 0.08 g/cm$^3$, effective density of 0.14 g/cm$^3$, particle diameter range of 5-200 μm, average diameter of 85 μm, and crushing strength of 1.72 MPa) into a shape memory polymer (Veriflex, CRG industries) with a $T_g$ of 62° C. Glass fiber rovings (Saint Gobain) were used for weaving the ribs of the grid skeleton and a woven roving fabric 7725 (Fiber Glast) was used as the top and bottom skin or face sheet.

Smart Sandwich Fabrication and Specimen Preparation

The glass fibers were dry woven to fabricate the grid skeleton. Initially pins were nailed on a board such that the space between the nails was 25.4 mm, which corresponded to the length and width of the bay area. After nailing down the pins, a layer of Teflon™ polytetrafluoroethylene sheet was put on the board and then a layer of the woven roving fabric 7725 was laid on top of it. Then the fiber roving was dry wound around the pins in an orthogonal fashion. No resin was used along with the fiber for the weaving process. Once the dry weaving process was over, the smart foam was poured into the bay areas and the top skin was placed. Then a sheet of Teflon™ polytetrafluoroethylene was placed on the top skin and the whole system was vacuum bagged. The vacuum system produced a compressive pressure on the top skin. Hence the top skin was pressed against the grid skeleton filled with the smart foam, and eventually resulted in proper wetting of the grid skeleton and the skin by the foam. This ensured that the skin, the grid skeleton, and the foam in the bay became an integrated structure. The vacuum was run for about 15 minutes to remove air bubbles in the system. The whole system was then co-cured in an industrial oven using a curing cycle at 79.4° C. for 24 hours, 107.2° C. for 3 hours and 121.1° C. for 6 hours. Once the sandwich panel was cured, it was cut into 152.4 mm×101.6 mm×12.7mm specimens for conducting compression after impact tests. A total of 17 different groups of specimens depending on the prestrain levels of programming, types of confined recovery, impact energy levels, and impact/healing cycles were prepared. Each group contained at least 5 effective specimens. The total number of effective specimens was 105. The nomenclature used for each group of specimens is summarized in Table 4.

Figures 33A, 33B:
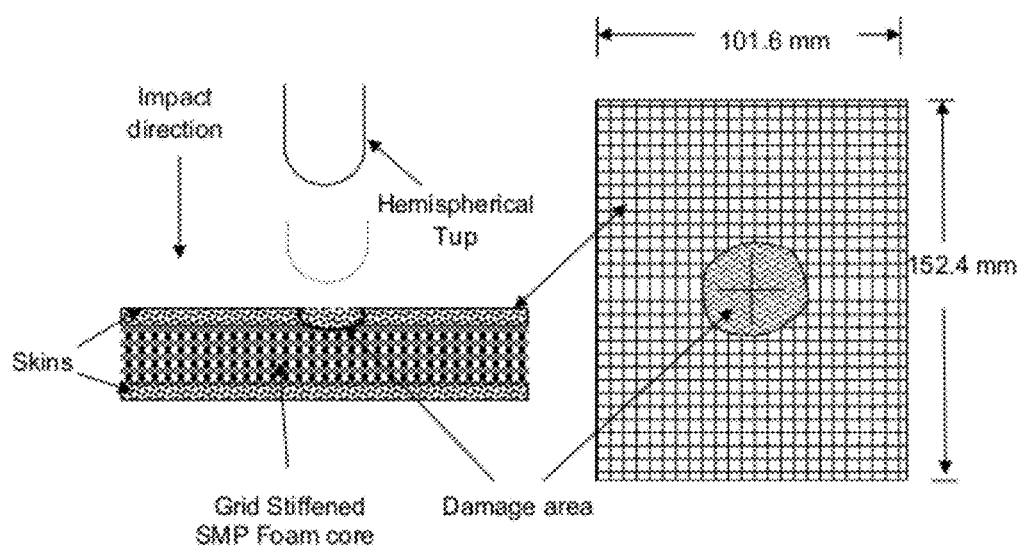
FIG. 33: (a) Side view showing impact in transverse direction and (b) top view of impact area.

A schematic of the sample showing the impact location and semi-spherical impact tup and the sample dimensions is depicted in FIG. 33.

Thermomechanical Programming

In order to make the sandwich "smart," it was subjected to a thermomechanical programming cycle. A compression molding fixture (CARVER Model 2697 compression molding fixture) with a top platen and a bottom platen was employed for the programming process. The top platen was fixed and the bottom platen was moved with the help of a lever. The top and bottom platens were able to be heated separately with different control knobs. The specimen was first inserted between the two platens. Then the platens were heated until the temperature reached 79.4° C. (above the $T_g$ of the SMP-62° C.). Once the temperature in the specimen became uniform, it was compressed to the designed displacement (depending on the prestrain levels) by moving the bottom platen up.

The displacement was measured by an LVDT (Cooper Instruments LDT 200 series) system, which had a stroke length of about 3 inches attached to the top platen and measured the movement of the bottom platen. The displacement was recorded on a Data Chart 2000 series data acquisition system. The recorded data was post-processed to an ASCII file for analyzing the data. Once the specimen was compressed at 79.4° C. to the designed prestrain level, the heating was stopped and the platens were allowed to cool to room temperature while maintaining the prestrain constant (strain controlled programming). Once room temperature was reached, the platens were released and the strain-controlled programming was completed. In this example, two prestrain levels, 3% and 20%, were used to program the specimens. A purpose was to investigate how the prestrain levels affect the healing efficiency. Also, these two strain levels resided on the linear elastic region and plateau region of the foam, respectively [421, 422].

Low Velocity Impact

Except for control specimens, low velocity impact tests were performed on each programmed specimen at the same impact location (center of the specimen) repeatedly using an Instron Dynatup 8250 HV drop tower machine. The tup nose was semi-spherical with a radius of 12.7 mm. The impact velocity was respectively 3 m/s and 4 m/s with a hammer weight of 6.64 kg, leading to impact energy of 30.0 J and 53.3 J. The test was conducted per ASTM D 2444 at room temperature. For each impact, at least five effective specimens were tested and the load and energy curves were obtained. The maximum impact force, maximum deflection, and impact duration were directly obtained from the load and energy curves. The initiation energy and propagation energy were calculated based on these curves. Impact energy corresponding to the maximum impact force is defined as initiation energy. Propagation energy is defined as the difference between maximum impact energy and initiation energy. These definitions have been used previously [412, 413, 421].

It has been proposed that initiation energy is basically a measurement of the capacity for the target to transfer energy elastically, and higher initiation energy usually means a higher load carrying capacity; on the other hand, propagation energy represents the energy absorbed by the target for creating and propagating gross damage.

Impact Response in Terms of Wave Propagation

Low velocity impact response or quasi-static impact response is a boundary controlled impact response in which the flexural and shear waves generated due to impact have sufficient time to reach the boundary and be reflected back many times. This type of impact results in less damage and hence is a preferred type of impact in composite structures due to the fact that the peak load, deflection and the strain are more or less in phase [412, 413].

To validate that the orthogrid stiffened foam cored sandwich responds to impact quasi-statically, the wave propagation within the bay directly under impact during the impact event was investigated. One strain gage was attached along one of the boundary ribs of the bay directly under impact and the other diagonally on one of the nodes of the selected bay. The strain gages were in turn connected to a strain gage conditioner (Vishay Micro-measurements). The strain gage conditioner was programmed such that 1 mV of voltage was equivalent to 1με. The signal from the strain gage conditioner was amplified with the help of an oscilloscope and the oscilloscope was in turn connected to a laptop computer which monitored both strain gage channels using a Wavestar software package. The data were saved and analyzed as an ASCII file.

Impact Response in Terms of Temperature Rising

Impact energy is dissipated in terms of energy transfer (elastic strain energy and kinetic energy), energy absorption (through damage and plastic deformation), temperature rising, and sound waves. Usually, energy transfer and energy absorption constitutes the majority of energy dissipation. In some cases with perforation, energy absorption through temperature rise is considerable. As for the energy dissipation through sound, the amount of energy consumed is generally minimal It is noticed that the energy transfer and energy absorption can be obtained through the energy curves in terms of initiation energy and propagation energy. The temperature rise in the specimen was obtained by an RAZ-IR infrared camera immediately before and after impact.

Shape Recovery or Healing

After each impact, one set of 5 specimens was brought to an oven for 2-D confined shape recovery at a temperature of 121.1° C. for 3 h. As discussed previously, 2-D confinement of the foam in the bay area came from the in-plane constraint by the grid skeleton.

Another set of 5 specimens was healed in a 3-D constrained way. This was performed in the same compression molding equipment with both the top and bottom platens heated to the required temperature and both of them were in contact with the specimen, thereby preventing free recovery. I.e., the platens provided transverse confinement to the specimen. Together with the in-plane 2-D confinement by the grid skeleton, this setup ensured that the specimen recovered in a 3-D confined way. The same process of impact and healing cycle was continued for 7 rounds.

Compression after Impact Test

Compression after impact (CAI) test was conducted to evaluate the residual strength after impact and the healing efficiency after confined shape recovery. Previous studies [412] have shown that the compressive strength of sandwich structures after low velocity impact decreased considerably when compared with the un-impacted specimen. The remaining compressive strength of the specimen after impact is called residual strength. Specimens without programming and programmed specimens without impact were also tested as control. The testing was conducted using an MTS Q TEST 150 machine and the fixture used was a "Boeing Compression after Impact Compression Test Fixture" per BSS7260 standard. Strain controlled testing was conducted at room temperature with a strain rate of $8.5 \times 10^{-3}$/min.

Damage/Healing Inspection

Ultrasonic C-scan was performed on all specimens before impact, after impact and after healing for each impact-healing cycle using a 2.5 MHz transducer. An UltraPac inspection machine from Physical Acoustics Laboratory was used in conjunction with UltraWin software to acquire the C-scan images, and identify damage and the healing level achieved. Post processing of the C-scan images was performed by conducting cluster analysis to quantify the damage caused due to each impact cycle. Clustering is an algorithm and a software supported process, in which a set of data is organized in groups that have strong similarities [425]. The cluster analysis utility of the Ultrawin 2.68 software was used in order to determine the area of the damage caused after each impact cycle. In order to evaluate the healing efficiency achieved, digital photographs of the sandwich structure after impact and after healing were also taken.

Results

Impact Response

Low Energy Impact (30.0 J).

Figure 34A:
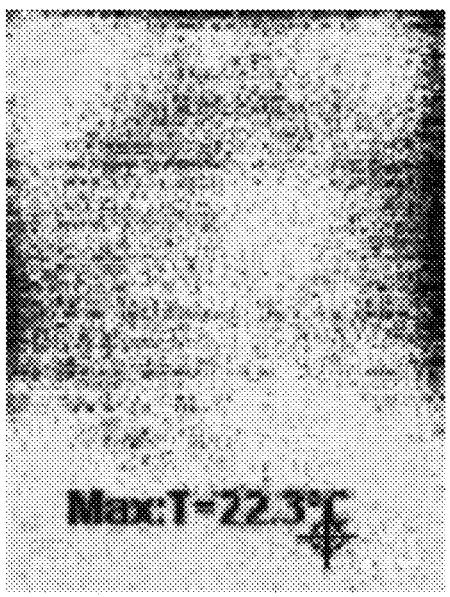
FIG. 34: Infrared image showing temperature profile of smart sandwich specimen under impact energy of 30 J (a) immediately before impact and (b) immediately after impact.
Figure 34B:
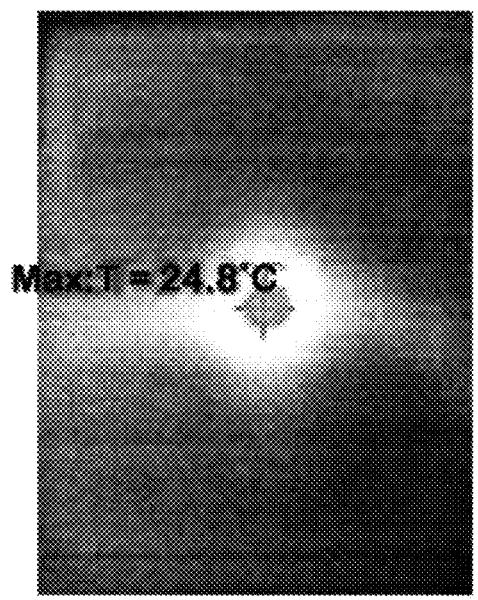

The temperature profile immediately before and after impact of the smart sandwich specimen is shown in FIGS. 34 (a) and (b), respectively. It is seen that, with an incident energy of 30.0 J, the maximum temperature rise was only 2.5° C. This temperature is not sufficient to trigger the shape recovery in the smart polymer because the temperature immediately after impact (24.8° C.) is still much lower than the glass transition temperature of the SMP (62° C.), suggesting that the orthogrid stiffened smart foam under impact is still in its glassy state.

Figure 35A:
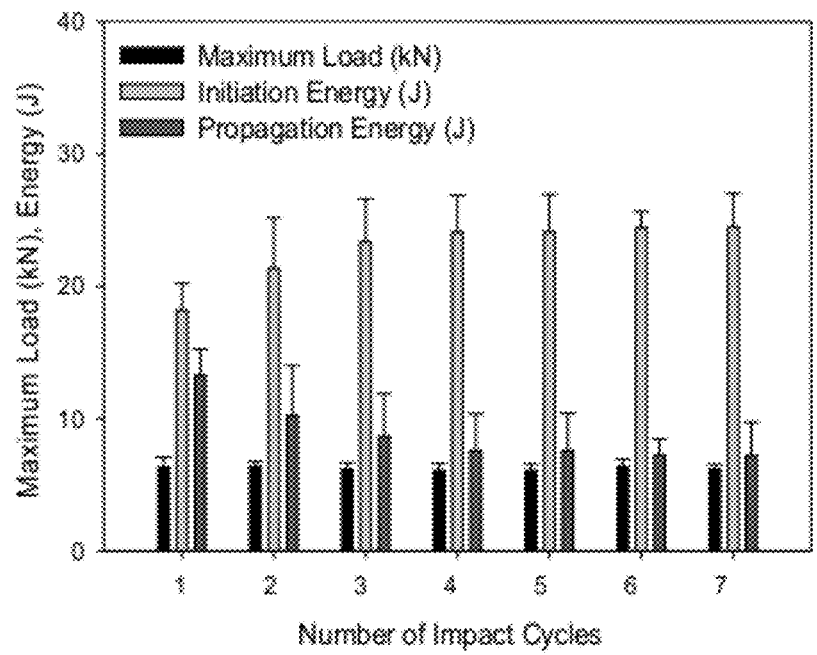
FIG. 35: Effect of programming strain levels on the impact responses.

FIGS. 35 (a) and (b) shows the effect of 7 rounds of impact and 6 rounds of healing on the maximum load, initiation energy and propagation energy obtained from the LVI tests for 3% and 20% prestrain programmed specimens, respectively. The error bar represents standard deviation. The effect of different levels of prestrain programming can be visualized. From FIG. 35 (a), the maximum impact load for the 3% programmed specimen is almost constant (within experimental error) after 7 rounds of impact. This suggests that the recovery process (both 2-D and 3-D confined) employed was able to effectively heal the damage induced due to each cycle of impact. On the other hand, the initiation energy increased until the 4$^{th}$ round of impact and then was almost constant until the 7$^{th}$ round of impact. The propagation energy follows exactly the opposite trend when compared with the initiation energy. This shows that the foam under impact becomes denser and denser for the first four rounds of impact-healing cycles and thus more energy is transferred elastically; from round 5 to round 7, the foam cannot be further condensed and the initiation energy is stabilized. For propagation energy, the rate of densification of the foam (such as crushing of the microballoons) become smaller and smaller from round 1 to round 4, leading to continuous reduction in the absorbed energy (propagation energy). From round 5 to round 7, no more microballoon crushing and microcracking were possible and thus the absorbed energy is stabilized.

Figure 35B:
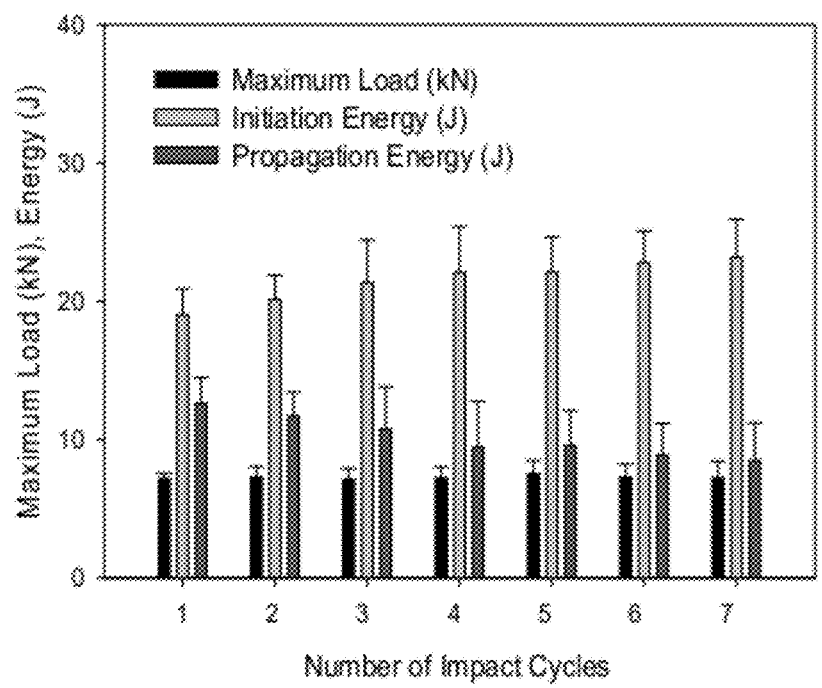

The impact behavior for the 20% prestrained specimen followed a similar trend (FIG. 35(b)). However, it was found that the maximum impact load for the 20% prestrained specimen (7.27 kN) is about 17% higher than its 3% counterpart (6.22 kN). This suggests that the increase in the prestrain level during programming made the foam denser and hence stiffer, leading to an increase in the load carrying capacity of the sandwich structure.

High Energy Impact (53.3 J)

Figures 36A, 36B:
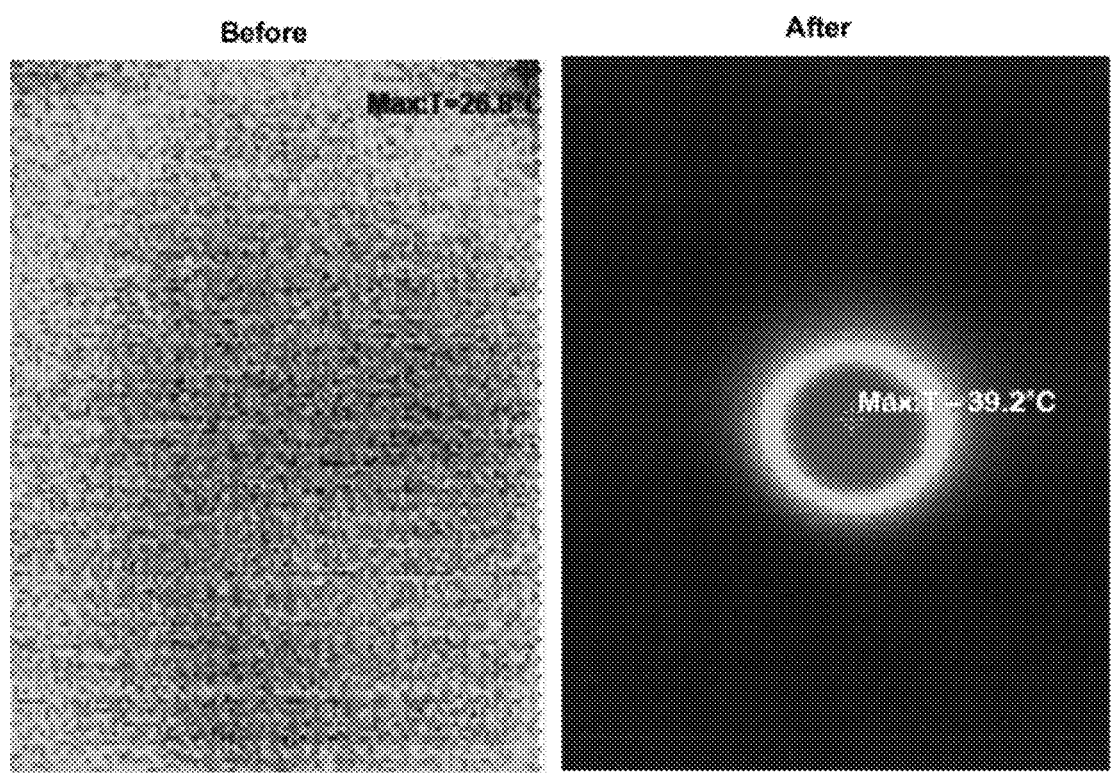
FIG. 36: Infrared image showing temperature profile of smart sandwich specimen under impact energy of 53.3 J (a) immediately before impact and (b) immediately after impact.

In order to evaluate the effect of impact energy or the degree of damage on the self-healing efficiency a higher impact energy (53.3 J) was also used. The temperature profile immediately before and after impact of the smart sandwich specimen is shown in FIGS. 36 (a) and (b), respectively. For the impact at 53.3 J, the temperature rise was about 12.4° C. This increase in temperature was higher than that for the one impacted at the lower energy of 30 J. This clearly shows that the higher the energy, the higher the temperature generated due to impact. However, this is still not enough to cause a shape recovery of the SMP foam because the temperature immediately after impact (39.2° C.) is still below the $T_g$ of the foam (62° C.).

Since it was found that specimens programmed by 20% prestrain and recovered under 3-D confinement had better healing efficiency than specimens programmed by 3% prestrain and recovered under 2-D confinement, only specimens programmed by 20% prestrain and recovered under 3-D confinement were tested by the higher energy impact.

Figure 37:
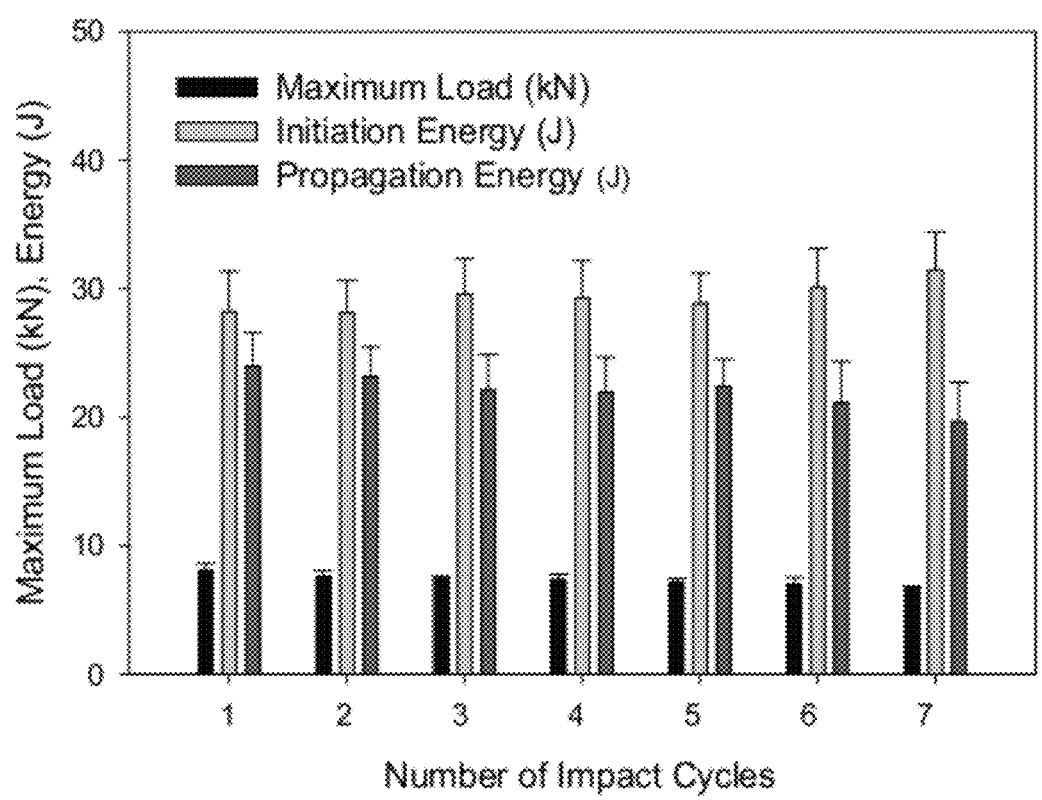
FIG. 37: Effect of 7 rounds of impact-healing cycles on the maximum impact load (kN), initiation energy (J), and propagation energy (J).

FIG. 37 shows the effect of higher energy impact on the maximum impact load, initiation energy and propagation energy. From FIG. 37, it is seen that the maximum impact force and propagation energy continuously decrease and the initiation energy continuously increases as the impact-healing cycle increases. It can be visualized that the maximum impact force reduced from 8.11 kN for the first impact cycle to 6.71 kN for the $7^{th}$ impact cycle. This reflects a decrease in the load bearing capacity by about 17%. Also, the initiation energy was almost constant and the propagation energy decreased slightly as the impact/healing cycle increased.

The continuous reduction in propagation energy and increase in initiation energy indicated that more and more materials are involved in responding to impact as impact-healing cycle increases. This indicated that the amount of damaged materials under high impact energy become larger and larger and thus unrecoverable damage such as crushing of microballoons also becomes larger and larger. As a result, it was expected that strength recovery rate will become smaller and smaller. These findings were further validated in the results for Damage/healing inspection, below.

Wave Propagation During Impact.

Figure 38:
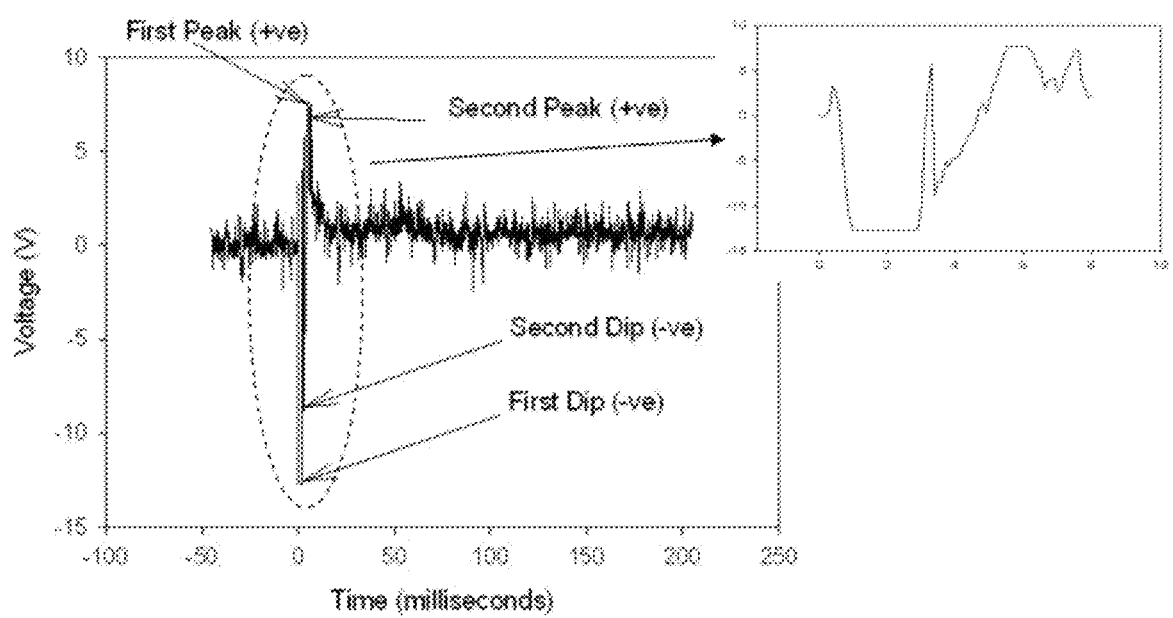
FIG. 38: Wave propagation in the boundary rib of the bay directly under impact

FIG. 38 shows the wave propagation along the boundary rib of the bay. The waveform from the strain gage attached diagonally on the node did not show any change during the impact event, possibly due to the debonding of the strain gage from the sandwich under impact. Therefore, the data from the second strain channel are not shown here. From the impact data, the impact duration was about 4.7 milliseconds for this gauged specimen. The wave propagation during the impact can be easily identified by the voltage/strain peaks for the first 4.7 milliseconds. It was found that there are two crests and two troughs during this time period, which suggested that the impact wave reached and was reflected by the boundary of the bay directly under impact twice. Therefore, the impact response of the bay directly under impact is boundary controlled and it is quasi-static.

Compression after Impact (CAI)

The foam used in this example was the same as that studied by Li and Nettles [422]. From [422], it is found that the stress-strain plot for the foam compressed at room temperature can be divided into three distinct regions as shown in FIG. 5 of [422]. The first region is the linear elastic region which follows Hooke's law. This is followed by a stress plateau region (post yielding densification), where the crushing and bending of microballoons in the syntactic foam initiate and progress. The third region is the final consolidation region. The compressive yield strength for the SMP foam compressed at room temperature is around 20 MPa, the modulus of elasticity is about 430 MPa, and the strain at the end of the plateau region is about 40%, which is similar to conventional polymer based syntactic foams [408-410]. On the other hand, the SMP foam compressed at 79° C. possesses very low yield strength at about 664 kPa and modulus of elasticity about 18.20 MPa. Also a clearly defined plateau region which is found at room temperature disappears. This reduction in yield strength and disappearance in the plateau region can be attributed to the rubbery behavior of the SMP foam above its glass transition temperature (62° C.).

Low Energy Impact (30.0 J).

Figure 39A:
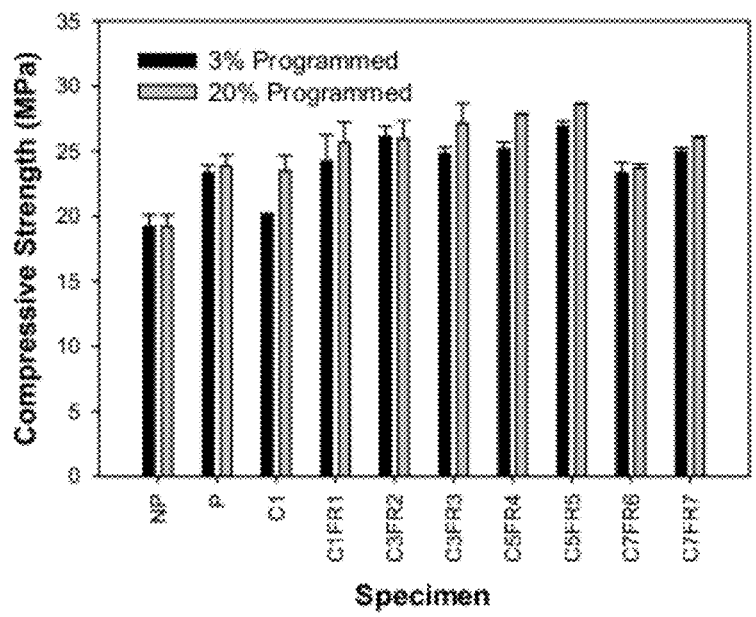
FIG. 39: Effect of programming and recovery methods on the compressive strength of the sandwich structure.
Figure 39B:
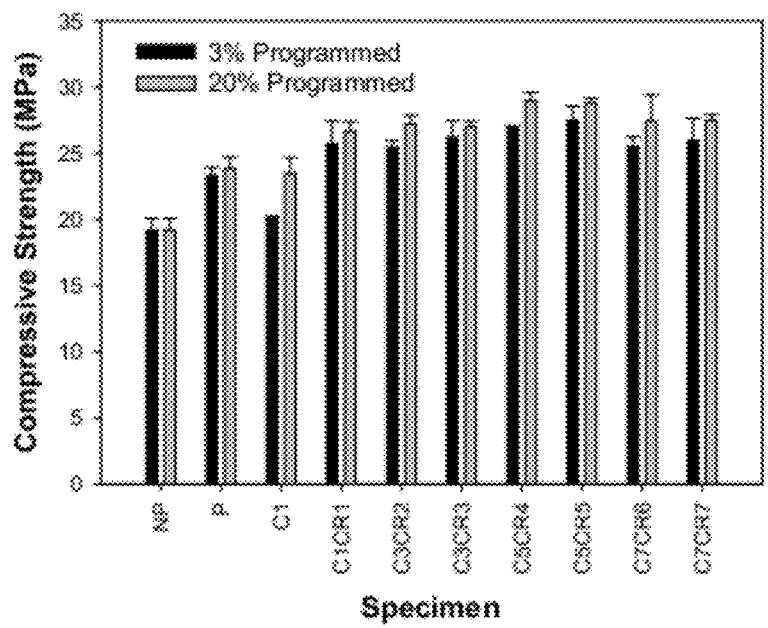

FIGS. 39 (a) and (b) shows the effect of the prestrain levels during programming and the confinement levels during shape recovery on the CAI strength. From FIG. 39, the following observations were made:

(1) Programming itself increased the compressive strength of the sandwich when comparing specimens not programmed (NP) with specimens programmed (P). This is due to the densification of the specimens by the strain-controlled programming (2) Impact reduced the CAI strength of all the specimens due to the creation of impact damage.

(3) Specimens programmed by 20% prestrain consistently showed a higher CAI strength than those programmed by 3% prestrain, regardless of the impact/healing cycles. Again, this is because 20% prestrain made the specimen denser and thus stiffer and stronger, and more effectively sealed the internal damage during confined shape recovery.

(4) Specimens healed under 3-D confinement consistently showed a higher CAI strength than those healed under 2-D confinement, again regardless of the impact/healing cycles (Table 5). This is because 3-D confinement resisted the growth in the specimen volume more effectively during the shape recovery process; consequently, the crack within the specimen was narrowed or closed more effectively.

(5) In this example, healing efficiency is defined as the ratio of the compressive strength of specimens after each healing (specimens C1, C1FR1, C1CR1, C2FR1, C2CR2, etc.) to the compressive strength of the control specimen (specimen P) without impact but with programming. For each impact/healing cycle, the CAI strength shows some increases as compared to the control specimens without impact and without programming (P and NP). This fact is desired as it makes the healing efficiency go over 100%. Without being bound by theory, this may be due to the adjustment of the microstructure during the impact/healing cycles and residual stress relaxation during high temperature shape recovery, which can be validated by the C-scan results later.

High Energy Impact (53.3 J).

Figure 40:
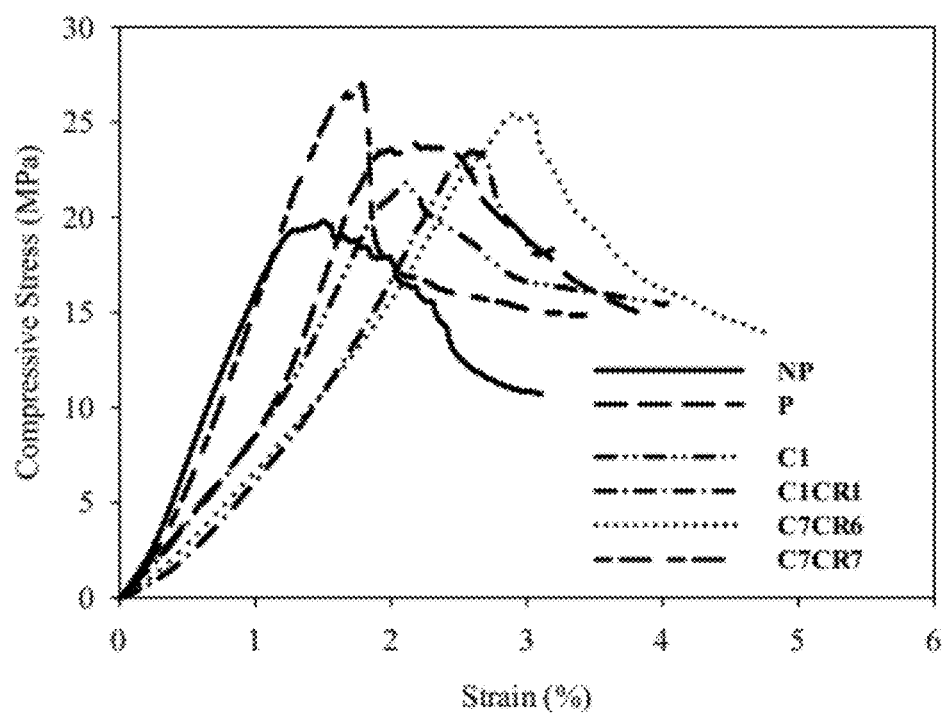
FIG. 40: Compressive stress-strain plots for different specimens without programming, with programming, with impact, and with healing (constrained recovery).

High impact energy resulted in more damage in the sandwich specimens. The typical compressive stress-strain behaviors for the grid stiffened specimens which were impacted at the higher energy of 53.3 J, are shown in FIG. 40. It is seen that programming enhanced the compressive strength of the grid sandwich structure by 17% (compare specimen NP and specimen P). Further, impact resulted in a reduction in the compressive strength by about 8% (specimen C1), but it was still above the specimen that was not programmed (specimen NP). Again, healing resulted in a full recovery of the compressive strength back to the programmed specimen (P).

Figure 41:
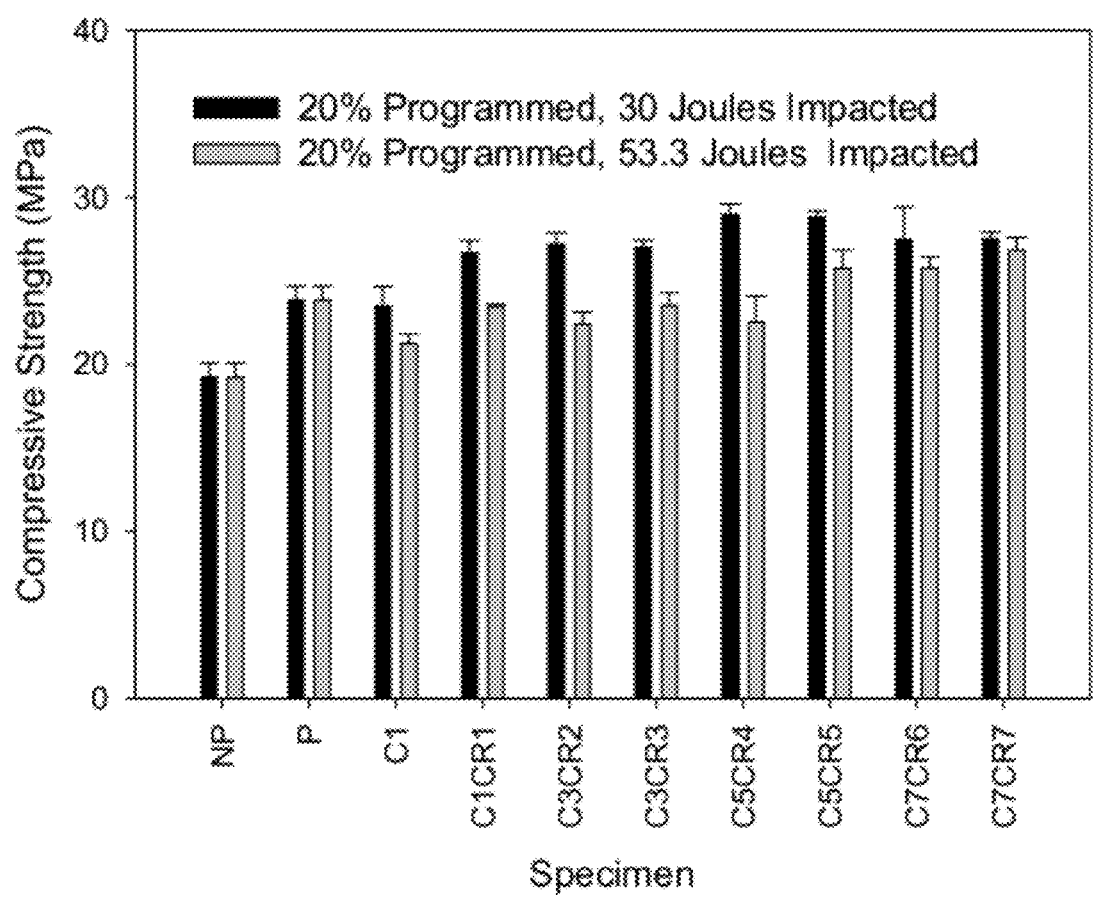
FIG. 41: Effect of impact energy on the CAI strength of the sandwich structure.

FIG. 41 depicts the variation of residual compressive strength with impact-healing cycles at different impact energies (30 J and 53.3 J). From FIG. 41, the CAI strength of the specimens impacted by 53.3 J of energy was consistently lower than that impacted by 30.0 J of energy. However, it is interesting to note that as the impact/healing cycle increased, the difference between the two types of specimens became smaller. Actually, at the $7^{th}$ round of impact/healing cycle, the CAI strength of the two types of specimens was very close. This is because the CAI strength peaked at the $4^{th}$ impact-healing cycle for 30.0 J impact energy, while the CAI strength continuously increases up to the $7^{th}$ cycle for the 53.3 J impact energy, although at a decreasing rate. This was consistent with the change in initiation energy. While the strength of the specimens after healing was slightly lower than that of the programmed control specimens (P) without impact and without healing for the first four impact/healing cycles, the strength of the healed specimens becomes slightly higher than that of the control specimens during the $5^{th}$, $6^{th}$, and $7^{th}$ impact/healing cycle, which is in agreement with the strength of the healed specimens impacted by the lower energy (30.0 J). Thus, even though the higher energy impact resulted in more damage, the confined recovery was able to recover and enhance the strength of the sandwich.

Damage/Healing Inspection

Figure 42:
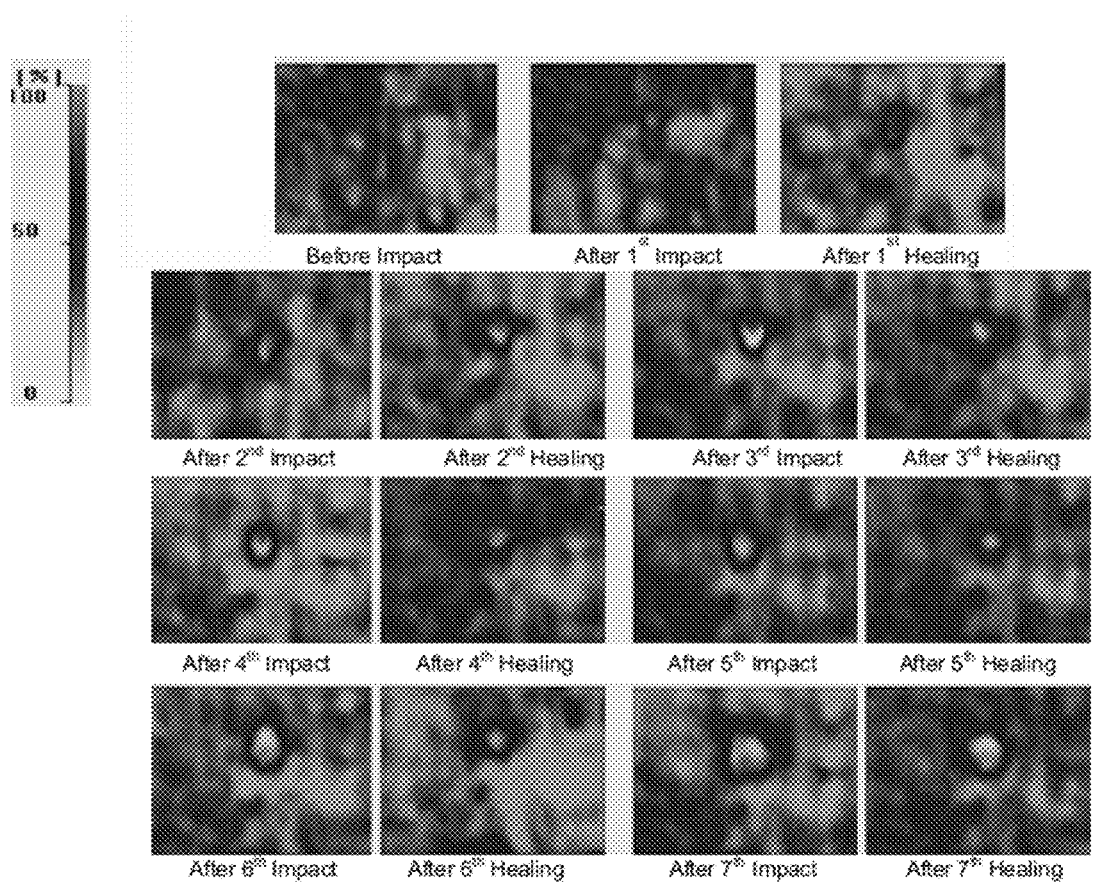
FIG. 42: Effect of impact energy on the CAI strength of the sandwich structure.

Ultrasonic C-scan images of the sandwich structure impacted at 53.3 Joules were captured in order to investigate the impact damage and also to visualize the healing efficiency achieved. C-scan was conducted on 2 different specimens: one was a 2-D confined specimen and the other was a 3-D confined specimen, to compare the healing efficiency achieved by employing 2 different routes of recovery. FIG. 42 shows the C-scan images of the 2-D confined specimen before impact, after $1^{st}$ impact, after $1^{st}$ healing, until after $7^{th}$ impact and $7^{th}$ healing; and FIG. 43 shows the corresponding C-scan images for the 3-D confined specimen.

The pulse-echo C-scan images measured different levels of signal returning to the receiver, due to attenuation of the ultrasonic signal by damage. From FIG. 42, it is seen that the damage area increased as impact cycle increased. Also, after the 2-D confined recovery, the damage was not fully.

Figure 43:
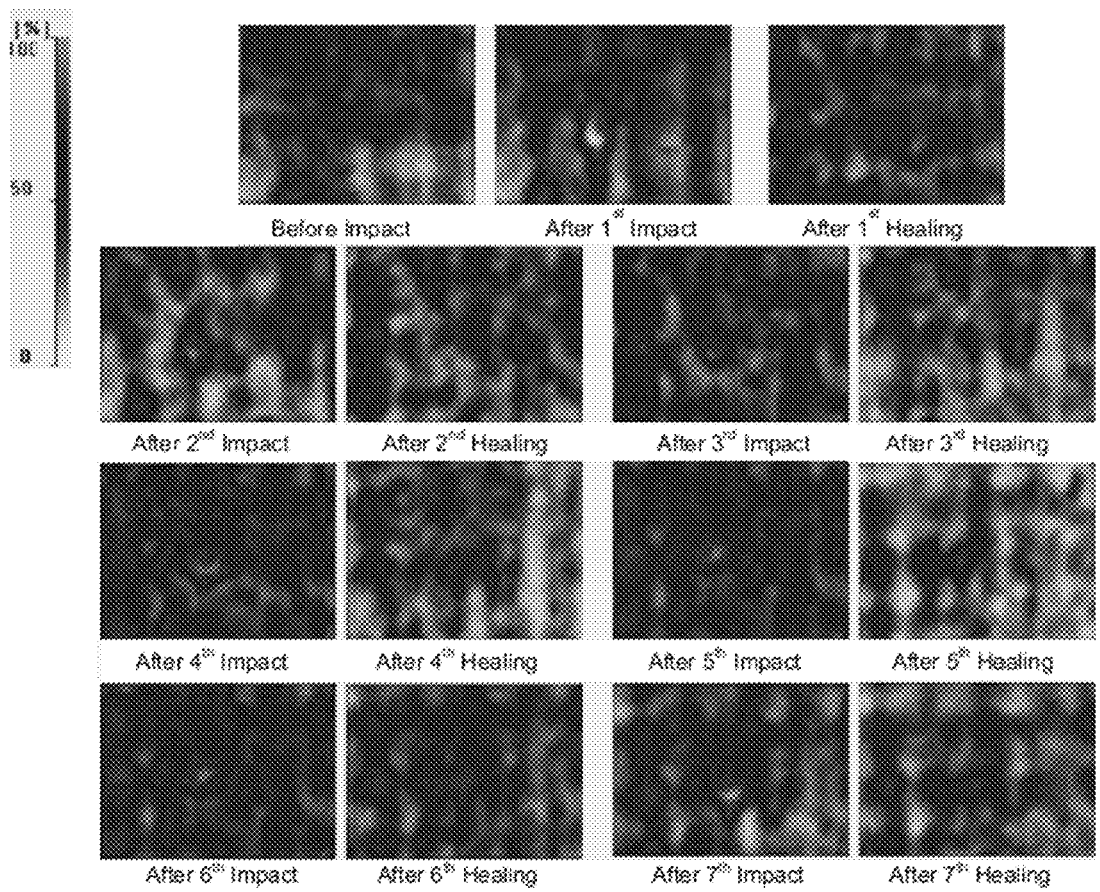
FIG. 43: C-scan images of the sandwich specimen (101.6×152.4 mm2) after each impact and 3-D confined recovery.

From FIG. 43, the impact damage after each impact was effectively healed by the 3-D confined shape recovery. Also, the measurements suggested that the sandwich actually became stronger after each healing. This is in agreement with the impact response and the CAI strength test results.

A cluster analysis procedure was employed to evaluate the damage surface area of the sandwich specimen after the $7^{th}$ round of impact. The damaged area obtained from cluster analysis of the C-scan image after each impact cycle is summarized in Table 6 for 2-D confined healing and 3-D confined healing, respectively.

From Table 6, it can be seen that the damage area increased with the impact cycles until the $3^{rd}$ impact cycle (287.10 mm$^2$) After the $4^{th}$ healing cycle, the damage area (232.26 mm$^2$) decreased, indicating healing has been achieved to a small extent. But later on the damage area kept increasing until the $7^{th}$ cycle (590.97 mm$^2$) This showed that the 2-D confined recovery process was not able to heal the damage completely.

For 3-D confined recovery, it can be seen that as the number of impact cycles increased the damage reduction until the $6^{th}$ cycle. This shows that the damage consequent to impact was effectively healed to a large extent until the $6^{th}$ cycle. After the $7^{th}$ impact cycle, the damage tended to increase (185.16 mm$^2$) However, the damage area was still smaller than that after the first impact without healing (203.23 mm$^2$).

The above observations were consistent with visual inspection. After the $7^{th}$ round of impact and healing cycle, optical images of the impacted/healed areas were captured. It was clearly visualized that the damaged skin of the 3-D confined specimen was almost 100% healed, while the 2-D confined specimen did not fully recover the impact damage on the surface of the sandwich.

CITATIONS

[1] Blaiszik B J, Sottos N R, White S R. Composites Science and Technology 2008; 68:978-986.
[2] Pang J W C and Bond I P. Composites Science and Technology 2005; 65:1791-1799.
[3] Williams H R, Trask R S, Bond I P. Composites Science and Technology 2008, 68:3171-3177.
[4] Varley R J and van der Zwaag S. Acta Materialia 2008; 56: 5737-5750.
[5] Plaisted T A and Nemat-Nasser S. Acta Materialia 2007; 55:5684-5696
[6] Zako M and Takano N. Journal of Intelligent Material Systems and Structures 1999; 10:836-41.
[7] Li G and John M. Composites Science and Technology 2008; 68: 3337-3343.
[8] Li G and Chakka V S. Composites Part A: Applied Science and Manufacturing 2010; 41: 177-184.
[9] Li G and Muthyala V D. Composites Science and Technology 2008; 68:2078-2084.
[10] Li G and Maricherla D. Journal of Composite Materials 2007; 41:1803-1824.
[11] W Xu and G Li. International Journal of Solids and Structures 2010; 47:1306-1316.
[12] Li G, Li Y, Metcalf J B, and Pang S S. ASCE Journal of Materials in Civil Engineering 1999; 11: 236-241.
[13] Nettles D. Thermomechanical characterization of a shape memory polymer based syntactic foam. M.S. Thesis, Louisiana State University, (2009).
[14] Nji J and Li G. Composites Part A: Applied Science and Manufacturing 2008; 39: 1404-1411.
[201] Jud K, Kausch H H. Polymer Bulletin 1979; 1:697-707.
[202] Keller M W, White S R, Sottos N R. Polymer 2008; 49: 3136-3145.
[203] Prager S, Tirrell M. *J Chem Phys* 1981; 75:5194-8.
[204] De Gennes P G. *J Chem Phys* 1971; 55:572-9.
[205] Doi M, Edwards S F. *J Chem Soc: Faradays Trans 2* 1978; 74:1789-1801.
[206] Kim Y H, Wool R P. *Macromolecules* 1983; 16:1115-1120.
[207] Kausch H H, Jud K. *Rubber Process Appl* 1982; 2:265-268.
[208] Wool P R, O'Connor K M. *Polym Eng Sci* 1981; 21:970-977.
[209] McGarel O J, Wool R P. *J Polym Sci Part B—Polym Phys* 1987; 25: 2541-2560.
[210] Yang F, Pitchumani R. *Macromolecules* 2002; 35:3213-3224.
[211] Chung C M, Roh Y S, Cho S Y, Kim J G. *Chem Mater* 2004; 16:3982-3984.
[212] Yuan Y C, Rong M Z, Zhang M Q, Yang G C. *Polymer* 2009; 50:5771-5781.
[213] Takeda K, Tanahashi M, Unno H. *Sci Tech Adv Mater* 2003; 4:435-444.
[214] Kalista S J, Ward T C. *J R Soc Interface* 2007; 4:405-411.
[215] Chipara M, Wooley K. *Mater Res Soc Symp* 2005; 851:127-132
[216] Wool R P, O'Connor K M. *J Appl Phys* 1981; 52:5953-5963.
[217] Wu D Y, Meure S, Solomon D. *Prog Polym Sci* 2008; 33:479-522
[218] Kirkby E L, Michaud V J, Månson J A E, Sottos N R, White S R. *Polymer* 2009; 50: 5533-5538.
[219] Blaiszik B J, Caruso M M, McIlroy D A, Moore J S, White S R, Sottos N R. *Polymer* 2009; 50: 990-997.
[220] Brown E N, White S R, Sottos N R. *Compos Sci Technolo* 2005; 65:2474-2480.
[221] Brown E N, White S R, Sottos N R. *J Mater Sci* 2006; 41:6266-6273.
[222] Zako M, Takano N. *J Intell Mater Syst Struct* 1999; 10:836-841.

[223] Chen X, Wudl F, Mal A K, Shen H, Nutt S R. *Macromolecules* 2003; 36:1802-1807.

[224] Varley R J, Shen S, van der Zwaag S. *Polymer* 2010; 51: 679-686.

[225] Li G and Nettles D. *Polymer* 2010; 51:755-762.

[226] Li G and Uppu N. *Comp Sci Tech* 2010; 70: 1419-1427.

[227] Nji J and Li G. *Smart Mater Struct* 2010; 19: paper No. 035007.

[228] Li G and John M. *Comp Sci Tech* 2008; 6:3337-3343.

[229] John M and Li G. *Smart Mater Struct* 2010; 19: paper No. 075031.

[230] Li G and Muthyala V D. *Comp Sci Tech* 2008; 68:2078-2084.

[231] Li G and Chakka V S. *Compos A: Appl Sci Manuf* 2010; 41:1:177-184.

[232] Potts P J. *Hand book of silicate rock analysis* 1987, Hardcover, Springer London, Limited, ISBN 0216917948 (0-2,6-91794-8).

[233] Petrovic-Djakov D M, Filipovic J M, Vrhovac L j P, Velickovic J S. *J Therm Anal* 1993; 40:741-746.

[301] Yuan Y C, Yin T, Rong M Z, and Zhang M Q. Self healing in polymers and polymer composites. Concepts, realization and outlook: A review. Express Polym Lett 2008, 2(4): 238-250.

[302] Li G and Muthyala V D. Impact Characterization of Sandwich Structures with an Integrated Orthogrid Stiffened Syntactic Foam Core. *Comp Sci Tech* 2008, 68(9): 2078-2084.

[303] Jud K, and Kausch H H. Load transfer through chain molecules after interpenetration at interfaces, Polym Bull 1979, 1: 697-707.

[304] Blaiszik B J, Kramer S L B, Olugebefola B C, Moore J S, Sottos N R, and White S R. Self-Healing Polymers and Composites. Annu. Rev Mater Res 2010, 40: 179-211.

[305] Wu D Y, Meure S, and Solomon D. Self-healing polymeric materials: A review of recent developments. Prog Polym Sci 2008, 33: 479-522.

[306] White S R, Sottos N R, Geubelle P H, Moore J S, Kessler M R, Sriram S R, Brown E N, and Viswanathan S. Autonomic healing of polymer composites. Nature 2001, 409(6822):794-797.

[307] Keller M W, White S R, and Sottos N R. Torsion fatigue response of self-healing poly (dimethylsiloxane) elastomers. Polymer 2008, 49(13-14): 3136-3145.

[308] Blaiszik B J, Sottos N R, and White S R. Nanocapsules for self-healing materials. Comp Sci Tech 2008, 68(3-4): 978-986.

[309] Brown E N, White S R, and Sottos N R. Microcapsule induced toughening in a self-healing polymer composite. J Mater Sci 2004, 39(5):1703-1710.

[310] Pang J W C and Bond I P. A hollow fibre reinforced polymer composite encompassing self-healing and enhanced damage visibility. Comp Sci Tech 2005, 65: 1791-1799.

[311] Williams H R, Trask R S, Knights A C, Williams E R, and Bond I P. Biomimetic reliability strategies for self-healing vascular networks in engineering materials. J Royal Soc Interf 2008, 5(24): 735-747.

[310] Dry C M. Procedures developed for self-repair of polymer matrix composite materials. Compos Struct 1996, 35(3): 263-269.

[313] Toohey K S, Sottos N R, Lewis J A, Moore J S, and White S R. Self-healing materials with microvascular networks. Nat Mater 2007, 6(8): 581-585.

[314] Chen X X, Dam M A, Ono K, Mal A, Shen H, Nutt S R, Sheran K, and Wudl F. A thermally remendable cross-linked polymeric material. Science 2002, 295 (5560):1698-1702.

[315] Plaisted T A, Nemat-Nasser S. Quantitative evaluation of fracture, healing and rehealing of a reversibly cross-linked polymer, Acta Mater 2007, 55(17): 5684-5696.

[316] Zako M, Takano N. Intelligent material systems using epoxy particles to repair microcracks and delamination damage in GFRP. J. Intell Mater Syst Struct 1999, 10(10): 836-841.

[317] Hayes S A, Jones F R, Marshiya K, Zhang W. A self-healing thermosetting composite material. Composites A 2007, 38(4): 1116-1120.

[318] Kalista S J, Ward T C, Oyetunji Z. Self-healing of poly(ethylene-comethacrylic acid) copolymers following projectile puncture. Mech Adv Mater Struct 2007, 14(5): 391-397.

[319] Varley R J, van der Zwaag S. Towards an understanding of thermally activated self-healing of an ionomer system during ballistic penetration. Acta Mater 2008, 56(19): 5737-5750.

[320] Wool R, O'Connor K. Theory of crack healing in polymers. J Appl Phys 1981, 52(10): 5953-5963.

[321] McGarel J O, Wool R P. Craze growth and healing in polystyrene. J Polym Sci B 1987, 25(12): 2541-2560.

[322] Cordier P, Tournilhac F, Soulie-Ziakovic C, Leibler L. Self-healing and thermoreversible rubber from supramolecular assembly. Nature 2008, 451(7181): 977-980.

[323] Montarnal D, Tournilhac F, Hidalgo M, Couturier J, Leible L. Versatile one-pot synthesis of supramolecular plastics and self-healing rubbers. J Am Chem Soc 2009, 131(23): 7966-7967.

[324] Kirkby E L, Michaud V J, Månson J-AE, Sottos N R, White S R. Performance of self-healing epoxy with microencapsulated healing agent and shape memory alloy wires. Polymer 2009, 50: 5533-5538.

[325] Li G and Nettles D. Thermomechanical characterization of a shape memory polymer based self-repairing syntactic foam. Polymer 2010, 51: 755-762.

[326] Xu W and Li G. Constitutive Modeling of Shape Memory Polymer Based Self-healing Syntactic Foam. Int J Solids Struct 2010, 47(9): 1306-1316.

[327] Li G and Uppu N. Shape memory polymer based self-healing syntactic foam: 3-D confined thermomechanical characterization. Comp Sci Tech 2010, 70: 1419-1427.

[328] Nji J and Li G. A self-healing 3D woven fabric reinforced shape memory polymer composite for impact Mitigation. Smart Mater Struct 2010, 19(3): paper No. 035007.

[329] Nji J and Li G. A Biomimic Shape Memory Polymer Based Self-Healing Particulate Composite. Polymer 2010, 51(25):6021-6029.

[330] John M and Li G. Self-Healing of Sandwich Structures with Grid Stiffened Shape Memory Polymer Syntactic Foam Core. Smart Mater and Struct 2010, 19(7): paper No. 075013.

[331] Li G and John M. A self-healing smart syntactic foam under multiple impacts. Comp Sci Tech 2008, 68: 3337-3343.

[332] Brown E N, Sottos N R, and White S R. Fracture testing of a self-healing polymer composite. Experim Mech 2002, 42: 372-379.

[333] Brown E N. Use of the tapered double-cantilever beam geometry for fracture toughness measurements and its

[400]. application to the quantification of self-healing. The J. Strain Analy. Eng. Design 2011, 46: 167-186.
[401]. Vialle G, Di Prima M, Hocking E, Gall K, Garmestani H, Sanderson T, and Arzberger S C 2009. Remote activation of nanomagnetite reinforced shape memory polymer foam. Smart Materials and Structures, 18:115014 (1-10).
[402]. Griffith G 2002. Carbon foam: a next-generation structural material. Industrial Heating, 69: 47-52.
[403]. Evans A G, Hutchinson J W and Ashby M F 1998. Multifunctionality of cellular metal systems. Progress in Materials Science, 43: 171-221.
[404]. Van Vuure A W 1997. Composite panels based on woven sandwich-fabric performs. Ph.D. Thesis, Katholieke Universiteit Leuven, Belgium.
[405]. Hosur M V, Abdullah M and Jeelani S 2005. Manufacturing and low-velocity impact characterization of foam filled 3-D integrated core sandwich composites with hybrid face sheets. Composite Structures, 69: 167-81.
[406]. Bardella L and Genna F 2001. On the elastic behavior of syntactic foams. International Journal of Solids and Structures, 38: 7235-60.
[407]. Hasebe R S and Sun C T 2000. Performance of sandwich structures with composite reinforced core. Journal of Sandwich Structures and Materials, 2: 75-100.
[408]. Nji J and Li G 2008. A CaO enhanced rubberized syntactic foam. Composites Part A: Applied Science and Manufacturing, 39:1404-1411.
[409]. Li G and Nji J 2007. Development of rubberized syntactic foam Composites Part A—Applied Science and Manufacturing, 38: 1483-1492.
[410]. Li G and John M 2008. A crumb rubber modified syntactic foam. Materials Science and Engineering A, 474: 390-399.
[411]. Li G and Muthyala V D 2008. A cement based syntactic foam. Materials Science and Engineering A, 478: 77-86.
[412]. Li G and Muthyala V D 2008. Impact characterization of sandwich structures with an integrated orthogrid stiffened syntactic foam core. Composites Science and Technology, 68: 2078-84.
[413]. Li G and Chakka V S 2010. Isogrid stiffened syntactic foam cored sandwich structure under low velocity impact. Composites Part A: Applied Science and Manufacturing, 41: 177-184.
[414]. Gould P 2003. Self-help for ailing structures. Materials Today, 6: 44-49.
[415]. Beiermann B A, Keller M W, and Sottos N R 2009. Self-healing flexible laminates for resealing of puncture damage. Smart Materials and Structures, 18: 085001 (1-7).
[416]. Trask R S and Bond I P 2006. Biomimetic self-healing of advanced composite structures using hollow glass fibres. Smart Materials and Structures, 15: 704-710.
[417]. Williams H R, Trask R S, and Bond I P 2007. Self-healing composite sandwich structures. Smart Materials and Structures, 16: 1198-1207.
[418]. Varley R J and van der Zwaag S 2008. Towards an understanding of thermally activated self-healing of an ionomer system during ballistic penetration. Acta Materialia, 56: 5737-50.
[419]. Liu Y L and Chen Y W 2007. Thermally reversible cross-linked polyamides with high toughness and self-repairing ability from maleimide and furan-functionalized aromatic polyamides. Macromolecular Chemistry and Physics, 208: 224-32.
[420]. Zako M and Takano N 1999. Intelligent material systems using epoxy particles to repair microcracks and delamination damage in GFRP. Journal of Intelligent Material Systems and Structures, 10: 836-41.
[421]. Li G and John M 2008, A self-healing smart syntactic foam under multiple impacts. Composites Science and Technology, 68: 3337-43. [paper 7]
[422]. Li G and Nettles D 2009. Thermomechanical characterization of a shape memory polymer based self-repairing syntactic foam. Polymer, 51: 755-62.
[423]. J Nji and G Li 2010. A self-healing 3D woven fabric reinforced shape memory polymer composite for impact mitigation. Smart Materials and Structures, 19: 035007 (1-9).
[424]. W Xu and G Li 2010. Constitutive modeling of shape memory polymer based self-healing syntactic foam. International Journal of Solids and Structures, 47(9): 1306-16.
[425]. Hasiotis T, Badogiannis E and Tsouvalis N G 2007. Application of Ultrasonic C-Scan Techniques for Tracing Defects in Laminated Composite Materials. Proc. 4th Int. Conf. on NDT (Greece).
[426]. Tey S J, Huang W M and Sokolwski W M 2001. Influence of long term storage in cold hibernation on strain recovery and recovery stress of polyurethane shape memory polymer foam. Smart Materials and Structures, 10(2): 321-25.
[427]. Huang W M, LeeCW and Teo H P 2006. Thermomechanical behavior of a polyurethane shape memory polymer foam. Journal of Intelligent Material Systems and Structure, 17: 753-60.

All documents, including patents or published applications, journal papers, and other documents either cited in this specification, or relied upon for priority, are fully incorporated by reference herein. In the event of an otherwise irreconcilable conflict, the present specification shall control.

The invention claimed is:

1. A composite which comprises:
   i) a thermoset shape memory polymer matrix, and,
   ii) a thermoplastic polymer dispersed throughout said matrix, and,
   iii) microballoons.

2. The composite of claim 1, wherein said thermoplastic polymer comprises particles of said thermoplastic polymer.

3. The composite of claim 1, wherein the melting temperature of said thermoplastic polymer is lower than the decomposition temperature of the thermoset matrix.

4. The composite of claim 1, wherein said thermoset shape memory polymer is an epoxy.

5. The composite of claim 1, wherein said thermoplastic polymer comprises 25% or less of the volume of the composite.

6. The composite of claim 1, further comprising that the composite is programmed to a volume less than a native volume of the composite.

7. A product prepared in accordance with claim 6 wherein the programming step comprises programming at a temperature above the glass transition temperature of said composite.

8. A composite which comprises:
   i) a polystyrene thermoset shape memory polymer matrix, and,
   ii) a thermoplastic polymer dispersed throughout said matrix.

9. A method for preparing programmed shape memory polymer composite:

A) mixing a matrix of a thermoset shape memory polymer with a thermoplastic polymer and microballoons, whereby a composite is formed; and, B) programming the entire composite to a volume less than a native expanded volume of said composite.

10. The method of claim 9 wherein the programming step comprises programming at a temperature above the glass transition temperature of said composite.

11. The method of claim 9 wherein the programming step comprises two-dimensional programming.

12. The method of claim 11 wherein the programming step comprises three-dimensional programming.

13. The method of claim 9 wherein the mixing step comprises mixing a thermoset shape memory polymer which is an epoxy.

14. The method of claim 9 wherein the mixing step comprises mixing a thermoplastic polymer which comprises 25% or less of the volume of the resulting composite.

15. The method of claim 9 wherein the mixing step comprises mixing a thermoplastic polymer which is in fibrous form, whereby thermoplastic polymer fibers become dispersed throughout said matrix.

16. The method of claim 9 wherein the mixing step comprises mixing a thermoplastic polymer which is in particles, whereby the thermoplastic polymer particles become dispersed throughout said matrix.

17. A method for preparing a programmed shape memory polymer composite:
A) mixing a matrix of a polystyrene thermoset shape memory polymer with a thermoplastic polymer, whereby a composite is formed; and,
B) programming the entire composite to a volume less than a native expanded volume of said composite.

18. A programmed shape memory polymer composite produced by a process comprising:
A) mixing a polystyrene thermoset shape memory polymer matrix with a thermoplastic polymer, whereby a composite is formed having a native volume; and
B) programming the entire composite to a volume less than the native volume of said composite.

19. A programmed shape memory polymer composite produced by a process comprising:
A) mixing a thermoset shape memory polymer matrix with a thermoplastic polymer and microballoons, whereby a composite is formed having a native volume; and
B) programming the entire composite to a volume less than the native volume of said composite.

20. A product prepared in accordance with claim 19 wherein the mixing step comprises mixing a thermoplastic polymer which is in particles, whereby the thermoplastic polymer particles become dispersed throughout said thermoset polymer matrix.

21. A product prepared in accordance with claim 19 wherein the programming step comprises two dimensional programming.

22. A product prepared in accordance with claim 19, wherein the programming step comprises programming at a temperature above the glass transition temperature of said composite.

23. A product prepared in accordance with claim 19, wherein the mixing step comprises mixing a thermoset shape memory polymer which is an epoxy.

24. A product prepared in accordance with claim 19, wherein the mixing step comprises mixing a thermoplastic polymer which comprises 25% or less of the native volume of the resulting composite.

* * * * *